United States Patent [19]
Williams

[11] Patent Number: 5,850,548
[45] Date of Patent: Dec. 15, 1998

[54] SYSTEM AND METHODS FOR VISUAL PROGRAMMING BASED ON A HIGH-LEVEL HIERARCHICAL DATA FLOW MODEL

[75] Inventor: David Mark Williams, Santa Cruz, Calif.

[73] Assignee: Borland International, Inc., Scotts Valley, Calif.

[21] Appl. No.: 338,301

[22] Filed: Nov. 14, 1994

[51] Int. Cl.[6] .................................................. G06F 9/44
[52] U.S. Cl. ........................... 395/701; 395/702; 395/961
[58] Field of Search ................................... 395/701, 702, 395/703, 333, 334, 335, 339, 961, 967

[56] References Cited

U.S. PATENT DOCUMENTS

| | | | |
|---|---|---|---|
| 4,710,763 | 12/1987 | Franke et al. | 340/723 |
| 4,733,354 | 3/1988 | Potter et al. | 364/415 |
| 4,821,211 | 4/1989 | Torres | 364/521 |
| 4,831,580 | 5/1989 | Yamada | 364/900 |
| 4,860,204 | 8/1989 | Gendron et al. | 364/300 |
| 4,866,634 | 9/1989 | Reboh et al. | 364/513 |
| 4,912,669 | 3/1990 | Iwamoto et al. | 364/900 |
| 4,956,773 | 9/1990 | Saito et al. | 364/200 |
| 4,982,344 | 1/1991 | Jordan | 364/521 |
| 4,984,180 | 1/1991 | Wada et al. | 364/518 |
| 5,008,810 | 4/1991 | Kessel et al. | 364/200 |
| 5,047,960 | 9/1991 | Sloan | 364/523 |
| 5,091,868 | 2/1992 | Pickens et al. | 395/148 |
| 5,151,984 | 9/1992 | Newman et al. | 395/500 |
| 5,179,652 | 1/1993 | Rozmanith et al. | 395/155 |
| 5,208,907 | 5/1993 | Shelton et al. | 395/149 |
| 5,247,651 | 9/1993 | Clarisse | 395/500 |
| 5,487,141 | 1/1996 | Cain et al. | 395/135 |

FOREIGN PATENT DOCUMENTS 0 211 151 A2  2/1987  European Pat. Off. ........ G06F 15/20

OTHER PUBLICATIONS

Gehani, N., *High Level Form Definition in Office Information Systems*, The Computer Journal, vol. 26, No. 1, Feb. 1983, pp. 52–59.

Butterworth, M., *Forms Definition Methods*, 5th Annual Conference on Computers and Communication, Mar. 1986, pp. 708–712.

Shu, Nan C., *Visual Programming*, Van Nostrand Reinhold Company, 1988, pp. 16–31, 142–147, 150–151, 202–209, 222–229, 234–237, 264–283.

Miyao et al., *Visualized and Modeless Programming Environment for Form Manipulation Language*, IEEE, 1989, pp. 99–104.

Smith, David N., *Visual Programming in the Interface Construction Set*, IEEE, 1988, pp. 109–120.

DeMaria, Rusel & Fontane, George, *Working With dBase Mac*, Brady Books, 1988, pp. 94–134, 135, 155–183.

Pezold, C., *Dynamic Data Exchange (DDE)—Chapter 17*, Programming Windows, Second Edition, Microsoft Press, 1990, pp. 809–840.

Linthicum, D., *Defending OOP with VisualAge*, DBMS, Aug. 1994, pp. 22, 24, 75.

(List continued on next page.)

*Primary Examiner*—Alvin E. Oberley
*Assistant Examiner*—Kakali Chaki
*Attorney, Agent, or Firm*—John A. Smart

[57] ABSTRACT

A computer system having a Visual Development Environment (VDE) is described. The Visual Development Environment includes an interface having a Component Inspector, Component Manager, Component Library, and one or more visual editors. In operation, a user constructs a program by selecting one or more components from the Library, which displays components in a tabbed palette. Using a visual editor of the system, the user may drill-down into the internals of a component, for modifying its logic. Once the functionality of a component is completed, the user may proceed to connect together various components via the component "ports", which allow access to properties of the component. Components of the system may be nested within other components to an arbitrary level.

20 Claims, 53 Drawing Sheets

OTHER PUBLICATIONS

Linthicum, D., *RADical Development,* PC Magazine, Nov. 8, 1994, pp. 153–157, 162, 168, 170, 174, 176, 183–184, 188–193, 195, 198, 203–205, 209–210.

Varhol, Peter, *Visual Programming's Many Faces,* BYTE, Jul. 1994, pp. 187–188.

Merriam, Rud, *Drag & Drop,* Windows Tech Journal, Jan. 1992, pp. 79–80.

Mandelkern, D., *Visual Programming,* Object Magazine, Sep.–Oct. 1992, pp. 39–43.

Shepard et al., *A Visual Software Process Language,* Communications of the ACM, vol. 35, No. 4, Apr. 1992, pp. 37–44.

```
CLASS _ICLASS EDIT : PUBLIC HELPERAUTO, PUBLIC ICONTROLSERVER                    1000
{
  PUBLIC:
    // CONSTRUCTOR / DESTRUCTOR
    EDIT| IOBJECT *SYSTEMP );
    VIRTUAL ~EDIT();        1010                         1020

// ICONTROLSERVER STUFF
    VIRTUAL VOID CLIENTSET ( ICONTROLCLIENT *CLIENTP, HINSTANCE INSTANCE, HWND
  PARENTWINDOW, INT CONTROLID, IOBJECT *WINDOWP );
    VIRTUAL VOID CREATEDSET ( BOOL CREATED );
    VIRTUAL VOID VISIBLESET ( BOOL VISIBLE );
    VIRTUAL VOID DESIGNINGSET( BOOL DESIGNING );
    VIRTUAL VOID DIMENSIONSSET ( INT X, INT Y, INT DX, INT DY );
    VIRTUAL VOID DIMENSIONSGET ( INT *X, INT *Y, INT *DX, INT *DY );
    VIRTUAL VOID STATEGET ( BOOL *CREATED, BOOL *VISIBLE, BOOL *DESIGNING );

// HELPERAUTO STUFF
    STATIC  SYMBOL SYMBOLS [];                  1025
    SYMBOL *GETSYMBOLS () CONST {RETURN SYMBOLS; }

VOID NAMESET( CHAR *VALUE )
      {NAME = VALUE; }
    CHAR *NAMEGET( )
      {RETURN( (CHAR *)NAME.C_STR() ); }
    VOID TEXTSET( CHAR *VALUE );
    CHAR *TEXTGET( );
    VOID SELECTIONSET( CHAR *VALUE );
    CHAR *SELECTIONGET( );
    VOID XSET( INT VALUE ){X = VALUE; WINDOWMOVEEXTERNAL( X, Y, DX, DY ); }
    INT  XGET( ){RETURN( X ); }
    VOID YSET( INT VALUE ){Y = VALUE; WINDOWMOVEEXTERNAL( X, Y, DX, DY ); }
    INT  YGET( ){RETURN( Y ); }
    VOID DXSET( INT VALUE ){DX = VALUE; WINDOWMOVEEXTERNAL( X, Y, DX, DY ); }
    INT  DXGET( ){RETURN( DX ); }
    VOID DYSET( INT VALUE ){DY = VALUE; WINDOWMOVEEXTERNAL( X, Y, DX, DY ); }
    INT  DYGET( ) {RETURN( DY ); }
    IOBJECT *FONTGET(){RETURN ( IOBJECT * ) FONT; }
    VOID FONTSET( IOBJECT *VAL );
    VOID  SCROLLHSET( IOBJECT * );
    IOBJECT *SCROLLHGET( );
    VOID  SCROLLVSET( IOBJECT * );
    IOBJECT *SCROLLVGET( );

// DELEGATION TO PARENT HELPERS
    ICONTROLCLIENT *CONTROLCLIENTGET()
      {RETURN CLIENTP; }
    INT CONTROLIDGET()
```

FIG. 10A

```
   {RETURN CONTROLID; }

// WINDOWS METHODS
  WNDPROC WINPROCORIGGET( VOID );
    LRESULT EDITWINDOWMESSAGE( HWND HWND, UINT IMSG, WPARAM WPARAM,
LPARAM LPARAM );

MESSAGES_DECLARE()

PRIVATE:
  // OLYMPUS
  IOBJECT *SYSTEMP;

// IOBJECT
  LONG REFS;

// ICONTROL
  ICONTROLCLIENT *CLIENTP;
  HINSTANCE INSTANCE;
  HWND PARENT;
  INT  CONTROLID;
  BOOL DESIGNING;
  BOOL VISIBLE;
  BOOL CREATED;

// EVENTS
  VOID PROPERTYCHANGED( INT ARGC, ... );
  VOID EVENTRAISE( BIID ID );

// WINDOWS
  HWND HWINDOW;
  INT X, Y, DX, DY;
  VOID WINDOWCREATE( VOID );
  VOID WINDOWDESTROY( VOID );
  VOID WINDOWMOVEEXTERNAL( INT X, INT Y, INT DX, INT DY );
  WNDPROC  WINPROCORIG;

// MISC VALUES
  STRING TEXT;
  STRING SELECTION;
  STRING NAME;
  BOOLEAN *SCROLLH;
  BOOLEAN *SCROLLV;

// FONT STUFF
  VOID FONTCREATE();
  FONTVALUE *FONT;
  HFONT HFONT;
 };
```

*FIG. 10B*

```
CLASS _ICLASS IAUTO {                                          1100
PUBLIC:
  /*
   * BROWSING
   */
  VIRTUAL BOLEFOUND _IFUNC LOOKUP (PAUTOSYM SYM, WORD TYPE, LPCSTR NAME,
                                  BLCID LOCALE) = 0;
  VIRTUAL BOLEFOUND _IFUNC LOOKUPID(PAUTOSYM SYM, BIID ID, OMID OMID,
BLCID LOCALE) = 0;
  VIRTUAL UINT    _IFUNC COUNT  (PAUTOSYM SYM, AUTOSYMTYPE TYPE) = 0;
  VIRTUAL UINT    _IFUNC SCAN   (PAUTOSYM SYM, PAUTOSYM TBL, AUTOSYMTYPE TYPE,
     BLCID LOCALE) = 0;
  /*
   * INVOCATION
   */
  VIRTUAL RETCODE _IFUNC DISPATCH(BIID ID, PAUTOARG ARGS, UINT ARGC,
     AUTOSYMTYPE TYPE) = 0;
  VIRTUAL UINT    _IFUNC PROPERTYREAD (PAUTOARG VALTBL, PAUTOSYM SYMTBL,
     UINT COUNT) = 0;
  VIRTUAL UINT    _IFUNC PROPERTYWRITE(PAUTOARG VALTBL, PAUTOSYM SYMTBL,
     UINT COUNT) = 0;
  VIRTUAL UINT    _IFUNC PROPERTYREAD (PAUTOARG VALTBL, PBIID  IDTBL,
     UINT COUNT) = 0;
  VIRTUAL UINT    _IFUNC PROPERTYWRITE(PAUTOARG VALTBL, PBIID  IDTBL,
     UINT COUNT) = 0;
```

FIG. 11

```
CLASS ICONTROLSERVER                                           1200
{
  PUBLIC:
    VIRTUAL VOID CLIENTSET( ICONTROLCLIENT *CLIENTP, HINSTANCE INSTANCE,
HWND PARENTWINDOW, INT CONTROLID, IOBJECT *CONTAINERP ) = 0;
    VIRTUAL VOID CREATEDSET( BOOL CREATED ) = 0;
    VIRTUAL VOID VISIBLESET( BOOL VISIBLE ) = 0;
    VIRTUAL VOID DESIGNINGSET( BOOL DESIGNING ) = 0;
    VIRTUAL VOID DIMENSIONSSET( INT X, INT Y, INT DX, INT DY ) = 0;
    VIRTUAL VOID DIMENSIONSGET( INT *X, INT *Y, INT *DX, INT *DY ) = 0;
    VIRTUAL VOID STATEGET( BOOL *CREATED, BOOL *VISIBLE, BOOL *DESIGNING
) = 0;
};
```

FIG. 12

```
SYMBOL EDIT::SYMBOLS[ ] =                                              1300
{
  // EXPOSE THE INTERFACES
  INTERFACE<EDIT,IAUTO>( "IAUTO", IID( IAUTO ), OMIDBOM ),      ←── 1310
  INTERFACE<EDIT,ICONTROLSERVER>( "ICONTROLSERVER", IID( ICONTROLSERVER ), OMIDBOM
),
  // EXPOSE THE CLASS SIGNATURE (SO THAT THE OBJECT CAN BE TYPED)
  CLASSSIGNATURE<EDIT>( "EDIT" ),    ←── 1320
  // EXPOSE PROPERTIES (ACCESSIBLE VIA GET/SET MEMBER FUNCTIONS):
  PROPERTYREFLEX<EDIT,CHAR *>( "NAME", EDIT::NAMEGET, EDIT::NAMESET,
EDIT::EVENTRAISE ),
  PROPERTYREFLEX<EDIT,INT>( "X", EDIT::XGET, EDIT::XSET,
EDIT::EVENTRAISE ),                                           1330
  PROPERTYREFLEX<EDIT,INT>( "Y", EDIT::YGET, EDIT::YSET,
EDIT::EVENTRAISE ),
  PROPERTYREFLEX<EDIT,INT>( "WIDTH", EDIT::DXGET, EDIT::DXSET,
EDIT::EVENTRAISE ),
  PROPERTYREFLEX<EDIT,INT>( "HEIGHT", EDIT::DYGET, EDIT::DYSET,
EDIT::EVENTRAISE ),
  PROPERTYREFLEX<EDIT,CHAR *>( "TEXT", EDIT::TEXTGET, EDIT::TEXTSET, EDIT::EVENTRAISE ),
  PROPERTYREFLEX<EDIT,CHAR *>( "SELECTION", EDIT::SELECTIONGET, EDIT::SELECTIONSET,
EDIT::EVENTRAISE ),
  PROPERTYREFLEX<EDIT,IOBJECT *>( "FONT", EDIT::FONTGET, EDIT::FONTSET, EDIT::EVENTRAISE
),
  PROPERTYREFLEX<EDIT,IOBJECT *>( "SCROLLH", EDIT::SCROLLHGET, EDIT::SCROLLHSET,
EDIT::EVENTRAISE ),
  PROPERTYREFLEX<EDIT,IOBJECT *>( "SCROLLV", EDIT::SCROLLVGET, EDIT::SCROLLVSET,
EDIT::EVENTRAISE ),
  // END OF CLASS SPECIFICATION:
  SYMBOL( 0, 0 )
};
```

*FIG. 13*

```
CLASS _ICLASS IOBJECT {
  PUBLIC:             ╭─1401                                    1400

VIRTUAL RETCODE _IFUNC INTERFACEGET(PINTERFACE FAR*,BIID IID,OMID OMID=OMIDBOM)=0;

/* SHOULD RETURN POINTER TO THE INTERFACE, (AND CLASS INFO).
   * SHOULD NOT BUMP THE REFCOUNT.
   * IID IS A VALID INTERFACE ID IN THE GIVEN OBJECT MODEL, OMID.
   */           ╭─1405
  VIRTUAL LONG _IFUNC REFCOUNT(LONG=0L)=0;

/* +1 INCREMENTS, 1 DECREMENTS, 0 (BY DEFAULT) JUST RETURNS REFCOUNT.
   * SHOULD DELETE OBJECT WHEN REFCOUNT GOES TO 0.
   */
    //...
};
```

*FIG. 14*

```
EDIT::EDIT( IOBJECT *SYSTEMP ) : HELPERAUTO( "EDIT" )                        1500
{
  SYSTEMP = SYSTEMP;

// SET THE FONT UP
  FONT = NEW FONTVALUE;
  FONT>LOGFONT.LFHEIGHT          = 14;
  FONT>LOGFONT.LFWIDTH           = 0;
  FONT>LOGFONT.LFESCAPEMENT      = 0;
  FONT>LOGFONT.LFWEIGHT          = FW_NORMAL;
  FONT>LOGFONT.LFITALIC          = FALSE;
  FONT>LOGFONT.LFUNDERLINE       = FALSE;
  FONT>LOGFONT.LFSTRIKEOUT       = FALSE;
  FONT>LOGFONT.LFCHARSET         = ANSI_CHARSET;
  FONT>LOGFONT.LFOUTPRECISION    = OUT_DEFAULT_PRECIS;
  FONT>LOGFONT.LFCLIPPRECISION   = CLIP_DEFAULT_PRECIS;
  FONT>LOGFONT.LFQUALITY         = DEFAULT_QUALITY;
  FONT>LOGFONT.LFPITCHANDFAMILY  = FF_DONTCARE;
  STRCPY( FONT>LOGFONT.LFFACENAME, "ARIAL" );

REFS = 1;

MESSAGES_INITIALIZE( SYSTEMP, "EDIT" );

// SET THE INITIAL STATE
  DESIGNING = FALSE;
  VISIBLE = TRUE;
  CREATED = FALSE;
  X = Y = 0;
  DX = 150; DY = 20;
  HFONT = NULL;

SCROLLH = NEW BOOLEAN( FALSE );
  SCROLLV = NEW BOOLEAN( FALSE );
}
```

*FIG. 15*

```
EDIT::~EDIT()                           1600
{
  IF ( HWINDOW )
    WINDOWDESTROY();
  FONT->REFCOUNT( -1 );

DELETE SCROLLH;
  DELETE SCROLLV;
}
```

*FIG. 16*

```
// ICONTROLSERVER STUFF      ← 1701                                    1700
VOID
EDIT::CLIENTSET( ICONTROLCLIENT *CLIENTP, HINSTANCE INSTANCE,
HWND PARENTWINDOW, INT CONTROLID, IOBJECT * )
{
 CLIENTP = CLIENTP;
 INSTANCE = INSTANCE;
 PARENT = PARENTWINDOW;
 CONTROLID = CONTROLID;
}
                             ← 1705
VOID
EDIT::CREATEDSET( BOOL CREATED )
{
 IF ( CREATED != CREATED )
 {
  IF ( CREATED )
    WINDOWCREATE();
  ELSE
    WINDOWDESTROY();

CREATED = CREATED;
 }
}
                             ← 1710
VOID
EDIT::VISIBLESET( BOOL VISIBLE )
{
 VISIBLE = VISIBLE;
}
                             ← 1715
VOID
EDIT::DESIGNINGSET( BOOL DESIGNING )
{
 DESIGNING = DESIGNING;
}
                             ← 1720
VOID
EDIT::DIMENSIONSSET( INT X, INT Y, INT DX, INT DY )
{
 X = X; Y = Y; DX = DX; DY = DY;
 IF ( CREATED )
```

FIG. 17

```
// ICONTROLSERVER STUFF         1701                                    1700
VOID
EDIT::CLIENTSET( ICONTROLCLIENT *CLIENTP, HINSTANCE INSTANCE,
HWND PARENTWINDOW, INT CONTROLID, IOBJECT * )
{
  CLIENTP = CLIENTP;
  INSTANCE = INSTANCE;
  PARENT = PARENTWINDOW;
  CONTROLID = CONTROLID;
}
                                1705
VOID
EDIT::CREATEDSET( BOOL CREATED )
{
  IF ( CREATED != CREATED )
  {
    IF ( CREATED )
      WINDOWCREATE();
    ELSE
      WINDOWDESTROY();

CREATED = CREATED;
  }
}
                                1710
VOID
EDIT::VISIBLESET( BOOL VISIBLE )
{
  VISIBLE = VISIBLE;
}
                                1715
VOID
EDIT::DESIGNINGSET( BOOL DESIGNING )
{
  DESIGNING = DESIGNING;
}
                                1720
VOID
EDIT::DIMENSIONSSET( INT X, INT Y, INT DX, INT DY )
{
  X = X; Y = Y; DX = DX; DY = DY;
  IF ( CREATED )
```

*FIG. 17A*

```
{
  INVALIDATERECT( HWINDOW, NULL, FALSE );
  UPDATEWINDOW( HWINDOW );
  MOVEWINDOW( HWINDOW, X, Y, DX, DY, TRUE );
}
// FLAG THE VALUES AS HAVING BEEN CHANGED
PROPERTYCHANGED( 4, "X", "Y", "WIDTH", "HEIGHT" );
}
VOID                              ┌─ 1725
EDIT::DIMENSIONSGET( INT *X, INT *Y, INT *DX, INT *DY )
{
  *X = X; *Y = Y; *DX = DX; *DY = DY;
}
VOID                              ┌─ 1730
EDIT::STATEGET( BOOL *CREATED, BOOL *VISIBLE, BOOL *DESIGNING )
{
  *CREATED = CREATED;
  *VISIBLE = VISIBLE;
  *DESIGNING = DESIGNING;
}
```

FIG. 17B

```
// EVENT NOTIFICATION                                  1800
//
                          ┌─ 1801
VOID
EDIT::PROPERTYCHANGED( INT ARGC, ... )
{
  VA_LIST STACK;
  VA_START( STACK, ARGC );
  SYMBOL SMB;
  WHILE( ARGC )
    IF( LOOKUP( &SMB, TD_PROPERTY, VA_ARG( STACK, CHAR * ), 0 ) )
      EVENTRAISE( SMB.VALUE );
  VA_END( STACK );
}
                          ┌─ 1802
VOID
EDIT::EVENTRAISE( BIID ID )
{
  IOLYMPUSEVENTMANAGER *MANAGER;
  IF( SYSTEMP && SYSTEMP>INTERFACEGET( ( VOID ** )&MANAGER, IID(
  IOLYMPUSEVENTMANAGER ) ) )
    MANAGER>EVENTFIRE( THIS, ID, 0, 0 );
}
```

FIG. 18

```
EDIT::WINPROCORIGGET( VOID )
{
  RETURN WINPROCORIG;
}
LRESULT
EDIT::EDITWINDOWMESSAGE( HWND HWND, UINT IMSG, WPARAM WPARAM, LPARAM
LPARAM )
{
  SWITCH ( IMSG )
  {
    CASE WM_CHAR:
      PROPERTYCHANGED( 1, "TEXT" );
      BREAK;
  }
  RETURN 0;
}

// WNDPROC SUBCLASS                          1910
LRESULT FAR PASCAL _EXPORT
EDITWNDPROC( HWND HWND, UINT IMSG, WPARAM WPARAM, LPARAM LPARAM )
{
  LONG RETURNVALUE = 0;

// RETRIEVE THE SAVED OBJECT FROM THE OBJLO AND OBJHI PROPERTIES
  // THE EXTRA BYTES WE WOULD NORMALLY USE ARE USED BY THE CONTROL
  UNSIGNED INT LO = (UNSIGNED INT)GETPROP( HWND, "OBJLO" );
  UNSIGNED INT HI = (UNSIGNED INT)GETPROP( HWND, "OBJHI" );
  UNSIGNED LONG ADDR = ( (UNSIGNED LONG)HI << 16 ) + (UNSIGNED LONG)LO;
  EDIT *OBJ = (EDIT *)ADDR;

// BEHAVIOUR IS DIFFERENT IF DESIGNING
  BOOL DUMMY;
  BOOL DESIGNING = FALSE;
  // ASK THE OBJECT
  IF ( OBJ )
    OBJ>STATEGET( &DUMMY, &DUMMY, &DESIGNING );

// IF DESIGN MODE
  IF ( DESIGNING )
  {
    // SEND THE MESSAGE TO THE PARENT IF IT WANTS IT OK, IF NOT PROCESS IT
    IF ( (OBJ>CONTROLCLIENTGET())>CONTROLMESSAGE( OBJ>CONTROLIDGET(), HWND,
IMSG, WPARAM, LPARAM ) != 0 )
    {
      RETURN CALLWINDOWPROC( OBJ>WINPROCORIGGET(), HWND, IMSG, WPARAM,
LPARAM );
    }
  }
```

*FIG. 19A*

```
ELSE
{
  // NOT DESIGN MODE CATCH ANY WEIRD MESSAGES AND PASS ON
  SWITCH ( IMSG )
  {
    CASE WM_CHAR:
      IF ( OBJ )
      {
        LRESULT RET = CALLWINDOWPROC( OBJ>WINPROCORIGGET(), HWND, IMSG, WPARAM, LPARAM );
        OBJ>EDITWINDOWMESSAGE( HWND, IMSG, WPARAM, LPARAM );
        RETURN RET;
      }
      ELSE
        RETURN DEFWINDOWPROC( HWND, IMSG, WPARAM, LPARAM );
      BREAK;
    CASE WM_USER + 0X100:  // LET'S NOT KEEP THIS MUCH LONGER, EH?
      BREAK;
    DEFAULT:
      IF ( OBJ )
        RETURN CALLWINDOWPROC( OBJ>WINPROCORIGGET(), HWND, IMSG, WPARAM, LPARAM );
      ELSE
        RETURN DEFWINDOWPROC( HWND, IMSG, WPARAM, LPARAM );
  }
 }
 RETURN RETURNVALUE;
}
                                    ─── 1920
VOID
EDIT::WINDOWCREATE( VOID )
{
  DWORD STYLE = ( ( (BOOL)(*SCROLLV) ) ? WS_VSCROLL : 0 ) |
                ( ( (BOOL)(*SCROLLH) ) ? WS_HSCROLL : 0 );

HWINDOW = CREATEWINDOW( "EDIT",
                          NULL,
                          WS_CHILD | WS_VISIBLE | WS_BORDER | ES_AUTOHSCROLL |
ES_AUTOVSCROLL | ES_MULTILINE | ES_WANTRETURN | STYLE,
                          X, Y, DX, DY,
                          PARENT,
                          (HMENU)CONTROLID,
                          INSTANCE,
                          NULL );

IF ( HWINDOW )
  {
    // REMEMBER THE OBJECT
    SETPROP( HWINDOW, "OBJLO", (HANDLE)(((DWORD)THIS)&0XFFFFL) );
    SETPROP( HWINDOW, "OBJHI", (HANDLE)(((DWORD)THIS)>>16) );
    // SUBCLASS THE WNDPROC
    WINPROCORIG = (WNDPROC)SETWINDOWLONG( HWINDOW, GWL_WNDPROC, (LONG)EDITWNDPROC );
    // CREATE THE FONT
    FONTCREATE();
    // SET THE TEXT
    TEXTSET( (CHAR *)TEXT.C_STR() );
  }
}
```

FIG. 19B

```
                                        1930
VOID
EDIT::WINDOWDESTROY( VOID )
{
  IF ( HWINDOW != NULL )
  {
    DESTROYWINDOW( HWINDOW );
    DELETEOBJECT( HFONT );
    HWINDOW = NULL;
  }
}

VOID
EDIT::WINDOWMOVEEXTERNAL( INT X, INT Y, INT DX, INT DY )
{
  MOVEWINDOW( HWINDOW, X, Y, DX, DY, TRUE );
  IF ( DESIGNING )
    CLIENTP>DIMENSIONSSET( CONTROLID, X, Y, DX, DY );
}

VOID
EDIT::FONTSET( IOBJECT * )
{
  FONTCREATE();
}

VOID
EDIT::FONTCREATE()
{
  IF ( HFONT )
  {
    SENDMESSAGE( HWINDOW, WM_SETFONT, 0, 0 );
    DELETEOBJECT( HFONT );
  }
  HFONT = CREATEFONTINDIRECT( &FONT>LOGFONT );
  SENDMESSAGE( HWINDOW, WM_SETFONT, (WORD)HFONT, 1L );
}

VOID
EDIT::TEXTSET( CHAR *VALUE )
{
  SETWINDOWTEXT( HWINDOW, VALUE );
  TEXT = VALUE;
}

CHAR *
EDIT::TEXTGET( )
{
  INT LEN = GETWINDOWTEXTLENGTH( HWINDOW );
  CHAR *BUFFER = NEW CHAR[ LEN + 1 ];
  GETWINDOWTEXT( HWINDOW, BUFFER, LEN+1 );
  TEXT = BUFFER;
  DELETE BUFFER;
  RETURN( (CHAR *)TEXT.C_STR() );
}
```

*FIG. 19C*

```
VOID
EDIT::SELECTIONSET( CHAR *VALUE )
{
// DIS DUDN'T FUK'N WORK

/*
 SELECTION = VALUE;

INT LEN = GETWINDOWTEXTLENGTH( HWINDOW );
 CHAR *BUFFER = NEW CHAR[ LEN+1 ];
 GETWINDOWTEXT( HWINDOW, BUFFER, LEN+1 );
 TEXT = BUFFER;
 DELETE BUFFER;

LONG SELSTARTEND = SENDMESSAGE( HWINDOW, EM_GETSEL, 0, 0L );
 INT SELECTIONSTART = LOWORD( SELSTARTEND );
 INT SELECTIONEND = HIWORD( SELSTARTEND );
 INT SELECTIONLENGTH = SELECTIONEND SELECTIONSTART;

TEXT.REMOVE( SELECTIONSTART, SELECTIONLENGTH );
 TEXT.INSERT( SELECTIONSTART, VALUE );
 SELECTIONLENGTH = SELECTION.LENGTH();
 SELECTIONEND = SELECTIONSTART + SELECTIONLENGTH;

SETWINDOWTEXT( HWINDOW, TEXT.C_STR() );
 SENDMESSAGE( HWINDOW, EM_SETSEL, SELECTIONSTART, (LONG)SELECTIONEND );

M( "SELECTIONSET T %S S %S [%D,%D]", TEXT.C_STR(), SELECTION.C_STR(),
                    SELECTIONSTART, SELECTIONEND );
*/
}

CHAR *
EDIT::SELECTIONGET( )
{
 INT LEN = GETWINDOWTEXTLENGTH( HWINDOW );
 CHAR *BUFFER = NEW CHAR[ LEN + 1 ];
 GETWINDOWTEXT( HWINDOW, BUFFER, LEN+1 );

LONG SELSTARTEND = SENDMESSAGE( HWINDOW, EM_GETSEL, 0, 0L );
 INT SELECTIONSTART = LOWORD( SELSTARTEND );
 INT SELECTIONEND = HIWORD( SELSTARTEND );
 INT SELECTIONLENGTH = SELECTIONEND SELECTIONSTART;

BUFFER[ SELECTIONEND ] = 0;
 SELECTION = &BUFFER[ SELECTIONSTART ];

DELETE BUFFER;
 RETURN( (CHAR *)SELECTION.C_STR() );
}

VOID
EDIT::SCROLLHSET( IOBJECT * )
{
 IF ( CREATED )
 {
  CREATEDSET( FALSE );
  CREATEDSET( TRUE );
  SETWINDOWTEXT( HWINDOW, ( CHAR * )TEXT.C_STR() );
 }
}
```

FIG. 19D

```
IOBJECT *
EDIT::SCROLLHGET()
{
  RETURN SCROLLH;
}

VOID
EDIT::SCROLLVSET( IOBJECT * )
{
  IF ( CREATED )
  {
    CREATEDSET( FALSE );
    CREATEDSET( TRUE );
    SETWINDOWTEXT( HWINDOW, ( CHAR * )TEXT.C_STR() );
  }
}

IOBJECT *
EDIT::SCROLLVGET()
{
  RETURN SCROLLV;
}
```

FIG. 19E

```
CLASS SUPERCOMPONENT:
  PUBLIC IAUTO,                                                    2000
  PUBLIC IAUTOMETA,
  PUBLIC IOBJECT,
  PUBLIC OLYAUTOHANDLE,
  PUBLIC IDESKTOPCOMPONENT,
  PUBLIC IREFERENT,
  PUBLIC IOLYMPUSEVENTSINK,
  PUBLIC IOLYMPUSCLIENT,
  PUBLIC ISUPERCOMPONENTOWNER,
  PUBLIC ISUPERCOMPONENT
{
  PUBLIC:                                       ⟵ 2001
    // CTOR/DTOR
    SUPERCOMPONENT( IOBJECT *SYSTEMP );

//
    // IOBJECT STUFF                            ⟵ 2010
    //
    VIRTUAL RETCODE _IFUNC INTERFACEGET(PINTERFACE FAR *,BIID IID,OMID
  OMID=OMIDBOM)                  ⟵ 2015
      = 0;
    VIRTUAL LONG   _IFUNC REFCOUNT( LONG DELTA=0L) = 0;

// ACCESS TO LUCY PARTS
    OPERATOR SAUTOHANDLE *(){ RETURN THIS; }
    OPERATOR SAUTOFACTORY *(){ RETURN THIS; }

//
    // IAUTO METHODS                            ⟵ 2020
    //
    VIRTUAL BOLEFOUND _IFUNC LOOKUP( PAUTOSYM SYM, WORD TYPE, LPCSTR NAME,
      BLCID LOCALE) = 0;
    VIRTUAL BOLEFOUND _IFUNC LOOKUPID( PAUTOSYM SYM, BIID ID, OMID OMID,
      BLCID LOCALE) = 0;
    VIRTUAL UINT    _IFUNC COUNT( PAUTOSYM SYM, AUTOSYMTYPE TYPE) = 0;
    VIRTUAL UINT    _IFUNC SCAN( PAUTOSYM SYM, PAUTOSYM TBL, AUTOSYMTYPE TYPE,
      BLCID LOCALE) = 0;
    VIRTUAL RETCODE _IFUNC DISPATCH( BIID ID, PAUTOARG ARGS, UINT ARGC,
      AUTOSYMTYPE TYPE) = 0;
    VIRTUAL UINT    _IFUNC PROPERTYREAD( PAUTOARG VALTBL, PAUTOSYM SYMTBL,
      UINT COUNT) = 0;
    VIRTUAL UINT    _IFUNC PROPERTYWRITE( PAUTOARG VALTBL, PAUTOSYM SYMTBL,
      UINT COUNT) = 0;
    VIRTUAL UINT    _IFUNC PROPERTYREAD( PAUTOARG VALTBL, PBIID IDTBL,
      UINT COUNT) = 0;
    VIRTUAL UINT    _IFUNC PROPERTYWRITE( PAUTOARG VALTBL, PBIID IDTBL,
      UINT COUNT) = 0;
```

FIG. 20A

```
VIRTUAL BOLEHANDLERID _IFUNC ATTACH( PIOBJECT PHANDLER, BIID ON,BIID CALL) = 0;
VIRTUAL VOID    _IFUNC DETACH( BOLEHANDLERID) = 0;
VIRTUAL BOOL    _IFUNC HASHANDLER( BIID ON) = 0;
//..

//
// IOLYMPUSEVENTSINK         ⟵ 2030
//
RETCODE EVENTNOTIFY( IOBJECT *SOURCE, BIID TYPE, CAUTOVALUE *ARGS, INT ARGC )
   = 0;

//
// ISUPERCOMPONENT           ⟵ 2040
//
VOID OWNERSET( ISUPERCOMPONENTOWNER *OWNER );
VOID REPARENTED( ) = 0;
VOID COMPONENTCREATES( IOBJECT *COMPONENT );
VOID OPEN() = 0;
VOID CLOSE() {};
                             ⟵ 2050
//
// ISUPERCOMPONENTOWNER
//
BOOL SUPERCOMPONENTCHECK()
   { RETURN TRUE; }
VOID ACTIVESUPERCOMPONENT( ISUPERCOMPONENT * );
VOID COMPONENTPROPERTYADD( IOBJECT *COMPONENTP, CHAR *NAME, PROPID ID ) = 0;
VOID COMPONENTPROPERTYDELETE( IOBJECT *COMPONENTP, PROPID ID ) = 0;
VOID COMPONENTPROPERTYNAMEUPDATE( IOBJECT *COMPONENTP, PROPID ID, CHAR
*NAME )
   = 0;
VOID CONTAINERADD( IOBJECT *COMPONENTP );
VOID CONTAINERDELETE( IOBJECT *COMPONENTP );
VOID CONTAINEEADD( IOBJECT *COMPONENTP );
VOID CONTAINEEDELETE( IOBJECT *COMPONENTP );

PROTECTED:
  // POINTER TO THE OWNER OF THIS SUPER COMPONENT
  ISUPERCOMPONENTOWNER *SUPERCOMPONENTOWNERP;

VIRTUAL VOID COMPONENTADD( IOBJECT *COMPONENTP ) { }

PRIVATE:
  BOOL ROOTNODE;

// CONTAINERS
  CONTAINERLIST CONTAINERS;
};
```

*FIG. 20B*

```
CLASS ISUPERCOMPONENT                                          2100
{
  PUBLIC:                         ┌─ 2101
   // OWNERSHIP                  ↙
   VIRTUAL VOID OWNERSET( ISUPERCOMPONENTOWNER * ) = 0;
   VIRTUAL VOID REPARENTED( ) = 0;
                          ↖
   // SUB COMPONENT METHODS  ─ 2105
   VIRTUAL VOID COMPONENTCREATES( IOBJECT *COMPONENT ) = 0;
   //    VOID COMPONENTDELETE( IOBJECT *COMPONENT ) = 0;
   //    VOID COMPONENTSELECT( IOBJECT *COMPONENT ) = 0;
   //    VOID COMPONENTDESELECT( IOBJECT *COMPONENT ) = 0;
   //    VOID COMPONENTDESELECTALL( IOBJECT *COMPONENT ) = 0;

// EDITING
   VIRTUAL VOID OPEN() = 0;
   VIRTUAL VOID CLOSE() = 0;

// CONTAINMENT

// NAVIGATION

// DEBUG

// PERSISTANCE
};
```

FIG. 21

```
CLASS ISUPERCOMPONENTOWNER
{                                                           2200
  PUBLIC:                          ← 2201
    // TOP OF THE TREE?
    VIRTUAL BOOL SUPERCOMPONENTCHECK() = 0;
                                     ← 2205
    // SET FOCUS
    VIRTUAL VOID ACTIVESUPERCOMPONENT( ISUPERCOMPONENT * ) = 0;

// SUB COMPONENT CHANGES MAY BREAK OUT INTO MANY METHODS
    // COVERING NAME CHANGES, PROPERTY NAME CHANGES, ETC.   ← 2210
    VIRTUAL VOID COMPONENTPROPERTYADD( IOBJECT *COMPONENTP, CHAR
*NAME, PROPID ID )
                                                        ← 2215
      = 0;
    VIRTUAL VOID COMPONENTPROPERTYDELETE( IOBJECT *COMPONENTP, PROPID
ID ) = 0;
    VIRTUAL VOID COMPONENTPROPERTYNAMEUPDATE( IOBJECT *COMPONENTP,
PROPID ID,
      CHAR *NAME ) = 0;                             ← 2220

// CONTAINMENT
    VIRTUAL VOID CONTAINERADD( IOBJECT *COMPONENTP ) = 0;      ← 2230
    VIRTUAL VOID CONTAINERDELETE( IOBJECT *COMPONENTP ) = 0;   ← 2235
    VIRTUAL VOID CONTAINEEADD( IOBJECT *COMPONENTP ) = 0;      ← 2240
    VIRTUAL VOID CONTAINEEDELETE( IOBJECT *COMPONENTP ) = 0;   ← 2245
};

//
// IOLYMPUSEVENTSINK INTERFACE
//
CLASS _ICLASS IOLYMPUSEVENTSINK {
  PUBLIC:
    VIRTUAL RETCODE EVENTNOTIFY( IOBJECT *SOURCE, BIID TYPE,
CAUTOVALUE *ARGS,
      INT ARGC ) = 0;
};
```

FIG. 22

```
CLASS VPSUPERCOMPONENT:
  PUBLIC SUPERCOMPONENT,                                    2300
  PUBLIC IVPWINDOWCLIENT
{                         2301
  PUBLIC:
    // CTOR/DTOR
    VPSUPERCOMPONENT( IOBJECT *SYSTEMP );    ← 2310

//
    // IOBJECT STUFF              2320
    //
    VIRTUAL RETCODE _IFUNC INTERFACEGET(PINTERFACE FAR *,BIID IID,OMID
OMID=OMIDBOM);                                              2325
    VIRTUAL LONG    _IFUNC REFCOUNT( LONG DELTA=0L);

// ACCESS TO LUCY PARTS
    OPERATOR SAUTOHANDLE *(){ RETURN THIS; }
    OPERATOR SAUTOFACTORY *(){ RETURN THIS; }

//
    // IAUTO METHODS          2330
    //
    VIRTUAL BOLEFOUND _IFUNC LOOKUP( PAUTOSYM SYM, WORD TYPE, LPCSTR NAME, BLCID
LOCALE);
    VIRTUAL BOLEFOUND _IFUNC LOOKUPID( PAUTOSYM SYM, BIID ID, OMID OMID, BLCID
LOCALE);
    VIRTUAL UINT    _IFUNC COUNT( PAUTOSYM SYM, AUTOSYMTYPE TYPE);
    VIRTUAL UINT    _IFUNC SCAN( PAUTOSYM SYM, PAUTOSYM TBL, AUTOSYMTYPE TYPE, BLCID
LOCALE);
    VIRTUAL RETCODE _IFUNC DISPATCH( BIID ID, PAUTOARG ARGS, UINT ARGC, AUTOSYMTYPE
TYPE);
    VIRTUAL UINT    _IFUNC PROPERTYREAD( PAUTOARG VALTBL, PAUTOSYM SYMTBL, UINT
COUNT);
    VIRTUAL UINT    _IFUNC PROPERTYWRITE( PAUTOARG VALTBL, PAUTOSYM SYMTBL, UINT
COUNT);
    VIRTUAL UINT    _IFUNC PROPERTYREAD( PAUTOARG VALTBL, PBIID IDTBL, UINT COUNT);
    VIRTUAL UINT    _IFUNC PROPERTYWRITE( PAUTOARG VALTBL, PBIID IDTBL, UINT COUNT);
    VIRTUAL BOLEHANDLERID _IFUNC ATTACH( PIOBJECT PHANDLER, BIID ON,BIID CALL);
    VIRTUAL VOID    _IFUNC DETACH( BOLEHANDLERID);
    VIRTUAL BOOL    _IFUNC HASHANDLER( BIID ON);

//..
    //                   2340
    // IOLYMPUSEVENTSINK
    //
    RETCODE EVENTNOTIFY( IOBJECT *SOURCE, BIID TYPE, CAUTOVALUE *ARGS, INT ARGC );
```

*FIG. 23A*

```
//
// SUPERCOMPONNENT OVERRIDES
//
VOID COMPONENTADD( IOBJECT *COMPONENTP );

//                                    ┌─ 2360
// ISUPERCOMPONENT
//
VOID OPEN();
VOID CLOSE() {};
VOID REPARENTED() {};
                                      ┌─ 2365
//
// ISUPERCOMPONENTOWNER
//
VOID COMPONENTPROPERTYADD( IOBJECT *COMPONENTP, CHAR *NAME, PROPID ID );
VOID COMPONENTPROPERTYDELETE( IOBJECT *COMPONENTP, PROPID ID );
VOID COMPONENTPROPERTYNAMEUPDATE( IOBJECT *COMPONENTP, PROPID ID, CHAR *NAME
);
                                      ┌─ 2370
//
// IVPWINDOWCLIENT
//
   VOID ACTIVATE( INT CLIENTID );
   VOID CLOSEREQUEST( INT CLIENTID );
   VOID COMPONENTNAMEUPDATE( INT CLIENTID, COMPID COMPONENTID, CHAR *NAME );
   VOID COMPONENTMOVE( INT CLIENTID, COMPID COMPONENTID, RECT &RECT );
   VOID COMPONENTPROPERTYMOVE( INT CLIENTID, COMPID COMPONENTID, PROPID
PROPERTYID, BOOL VISIBLE, POINT LOCATION );
   VOID COMPONENTSELECTREQUEST( INT CLIENTID, COMPID COMPONENTID );
   VOID COMPONENTDESELECTREQUEST( INT CLIENTID, COMPID COMPONENTID );
   VOID COMPONENTDESELECTALLREQUEST( INT CLIENTID );
   VOID COMPONENTDELETEREQUEST( INT CLIENTID, COMPID COMPONENTID );
   VOID CONNECTIONADD( INT CLIENTID, COMPID CFID, PROPID PFID, COMPID CTID, PROPID
PTID, CONNECTIONID &ID );
   VOID CONNECTIONDELETE( INT CLIENTID, CONNECTIONID ID );
   VOID PROPERTYADD( INT CLIENTID, CHAR *NAME, RECT &RECT, PROPID &ID );
   VOID PROPERTYDELETE( INT CLIENTID, PROPID ID );
   VOID PROPERTYNAMEUPDATE( INT CLIENTID, PROPID ID, CHAR *NAME );
   VOID PROPERTYMOVE( INT CLIENTID, PROPID ID, RECT &RECT );
   VOID WATCHADD( INT CLIENTID, RECT &RECT, COMPID COMPID, PROPID PROPID, WATCHID &ID
);
   VOID WATCHDELETE( INT CLIENTID, WATCHID ID );
   VOID WATCHMOVE( INT CLIENTID, WATCHID ID, RECT &RECT );
   VOID WATCHATTACH( INT CLIENTID, WATCHID ID, COMPID COMPID, PROPID PROPID );
   BOOL COMPONENTPROPERTYGET( COMPID COMPONENTID, PROPID PROPERTYID,
CAUTOVALUE &VALUE );
```

FIG. 23B

```
VOID COMPONENTOPEN( COMPID );

// DECLARE THE DATA NEEDED TO POST MESSAGES
MESSAGES_DECLARE()

PRIVATE:

LONG REFS;                        ← 2380

// SYSTEM DATA
  IOBJECT *SYSTEMP;

// OLYMPUS CLIENT DATA
  SHORT CLIENTID;
  IOLYMPUSSERVER *OLYMPUSSERVERP;

// DESKTOP DATA
  IDESKTOPMANAGER *DESKTOPMANAGERP;
  SHORT COMPONENTID;              ← 2382
  HWND PARENTWINDOWH;             ← 2383

// NAME                           ← 2381
  CHAR *NAME;
  CHAR *NAMEGET() { RETURN NAME; }
  VOID NAMESET( CHAR *NAME )
    {
      IF ( NAME )
        DELETE NAME;
      NAME = NEW CHAR[ STRLEN( NAME ) + 1 ];
      STRCPY( NAME, NAME );
    }
                                    ← 2385
  // COMPONENTS
  VPSCOMPONENTLIST COMPONENTS;
                                    ← 2387
  // PROPERTIES
  VPSPROPERTYLIST PROPERTIES;
  PROPID PROPERTYNAMEID;
                                    ← 2388
  // CONNECTIONS
  VPSCONNECTIONLIST CONNECTIONS;
  VOID CONNECTIONSDELETEALL( COMPID COMPONENTID, PROPID PROPERTYID );
  VOID CONNECTIONSDELETEALL( COMPID COMPONENTID );

// WATCHES                        ← 2389
  VPSWATCHLIST WATCHES;

VOID EVENTRAISE( PROPID PROPID );

// VPWINDOW                       ← 2390
  WINDOWLIST WINDOWS;
  IVPWINDOWSERVER *VPWINDOWP;

```
//
//
// VPSCONNECTION
//
// CONNECTION BETWEEN COMP.PROP OR PROP AND
COMP.PROP OR PROP. IS SAVED
// IN TWO PLACES IN THE MAIN CONNECTIONS LIST AND IN
THE FROM OBJECT'S
// CONNECTION LIST. WHEN A MESSAGE COMES IN TO AN
OBJECT, THE OBJECT IS
// SEARCHED FOR OUTGOING CONNECTIONS AND THE PATH
FOLLOWED DOWN.
//
//

CLASS VPSCONNECTION
{
 PUBLIC:
   VPSCONNECTION( CONNECTIONID ID, COMPID
COMPONENTIDFROM, PROPID PROPERTYIDFROM, COMPID
COMPONENTIDTO, PROPID PROPERTYIDTO )
     {
       ID = ID;
       COMPONENTIDFROM = COMPONENTIDFROM;
       PROPERTYIDFROM = PROPERTYIDFROM;
       COMPONENTIDTO = COMPONENTIDTO;
       PROPERTYIDTO = PROPERTYIDTO;
     }

// DATA
   CONNECTIONID ID;
   COMPID COMPONENTIDFROM;
   PROPID PROPERTYIDFROM;
   COMPID COMPONENTIDTO;
   PROPID PROPERTYIDTO;
};
```

FIG. 23D

```
CLASS VPSCOMPONENT                                              2400
{
 PUBLIC:
  // CONSTRUCTOR
  VPSCOMPONENT( IOBJECT *SYSTEMP, IOBJECT *VPMANAGERP,
ISUPERCOMPONENTOWNER *OWNERP, IOBJECT *ICOMPONENTOBJECTP )
    {
     COMPONENTP = ICOMPONENTOBJECTP;
     NAME = NULL;                                     ~— 2401
     NAMEID = 0;
     TYPE = NULL;
     ID = (COMPID)ICOMPONENTOBJECTP;
     BITMAPH = NULL;
     SUPERP = NULL;
     RECT.TOP = RECT.BOTTOM = RECT.LEFT = RECT.RIGHT = 0;

INIT( SYSTEMP, VPMANAGERP, OWNERP );
    }
   ~VPSCOMPONENT();

// METHODS
  VOID   INIT( IOBJECT *SYSTEMP, IOBJECT *VPMANAGERP,
ISUPERCOMPONENTOWNER *OWNERP );
  CHAR   *TYPEGET() { RETURN TYPE; }
  VOID   TYPESET( CHAR *TYPE ) { TYPE = TYPE; }
  CHAR   *NAMEGET() { RETURN NAME; }
  VOID   NAMESET( CHAR *NAME )
   {
    IF ( NAME )
      DELETE NAME;
     NAME = NEW CHAR[ STRLEN( NAME ) + 1 ];
     STRCPY( NAME, NAME );
   }
  VOID NAMEUPDATE( CHAR *NAME );
  BOOL   SUPERGET() { RETURN SUPERP != NULL; }
  HBITMAP BITMAPGET() { RETURN BITMAPH; }
  IAUTO *IAUTOGET() { RETURN IAUTOP; }
  COMPID IDGET() { RETURN ID; }
  BIID   NAMEIDGET() { RETURN NAMEID; }
  RECT   &RECTGET() { RETURN RECT; }
  VOID   RECTSET( RECT &RECT ) { RECT = RECT; }
                                                  ┌─ 2420
  // PROPERTY METHODS                              ↙       ┌─ 2425
  SHORT PROPERTYCOUNT() { RETURN PROPERTIES.SIZEGET(); }   ↙
  VOID  PROPERTYINFOGET( SHORT INDEX, PROPID &PROPERTYID, CHAR *&NAME );
  VOID  PROPERTYADD( CHAR *NAME, PROPID ID );    ←── 2410
  VOID  PROPERTYNAMEUPDATE( PROPID ID, CHAR *NAME );
  VOID  PROPERTYDELETE( PROPID ID );             ←────── 2415
  VOID  PROPERTYMOVE( PROPID PROPERTYID, BOOL VISIBLE, POINT LOCATION );
  VOID  PROPERTYWINDOWUPDATE( IVPWINDOWSERVER *SERVERP, COMPID
COMPONENTID );
```

FIG. 24A

```
// CONNECTION METHODS                         ╱─ 2430       ╱─ 2435
   VOID CONNECTIONADD( VPSCONNECTION *CONNECTIONP );
   VOID CONNECTIONDELETE( VPSCONNECTION *CONNECTIONP );
//   VOID CONNECTIONDELETEALL( COMPID COMPONENTID, PROPID PROPERTYID );
   BOOL CONNECTIONLOOKUP( SHORT &START, PROPID PROPERTYID, COMPID
&COMPONENTIDTO, PROPID &PROPERTYIDTO );

// WINDOW MANIPUALATION
VOID OPEN();

PRIVATE:
  // DATA
  IOBJECT *COMPONENTP;
  IAUTO *IAUTOP;

// NAME ETC.
  CHAR  *NAME;
  BIID   NAMEID;
  CHAR  *TYPE;
  HBITMAP BITMAPH;
  COMPID ID;
  RECT  RECT;

// SUPER COMPONENT
  ISUPERCOMPONENT *SUPERP;
                                   ╱─ 2440
  // PROPERTIES
  VPSCOMPONENTPROPERTYLIST PROPERTIES;

// CONNECTIONS
  VPSCONNECTIONLIST CONNECTIONS;
};
```

*FIG. 24B*

```
// IOLYMPUSEVENTSINK                                                    2500
//
RETCODE
VPSUPERCOMPONENT::EVENTNOTIFY( IOBJECT *SOURCE, BIID TYPE, CAUTOVALUE
*/* ARGS */, INT /* ARGC */ )
                                        ___ 2501
{
  VPSCOMPONENT *CP;
  // FIND THE ENTRY IN THE COMPONENT LIST THE CORRESPONDS TO THE
  COMPONENT WE ARE TOLD RAISED THE EVENT
  IF ( COMPONENTS.COMPONENTFIND( (COMPID)SOURCE, CP ) )
  {
    // WE FOUND ONE

// IF THE COMPONENT WAS TELLING US THAT IT'S CHANGED ITS NAME  WE
    NEED TO CHANGE THE NAME
    // WE RECORD IN THE COMPONENT STRUCTURE
    IF ( TYPE == CP>NAMEIDGET() )
    {                                   ___ 2502
      // GET THE NAME                                  ___ 2503
      CAUTOVALUE VALUE;
      IF ( CP>IAUTOGET()>DISPATCH( CP>NAMEIDGET(), &VALUE,
      PROPERTY_READ, TD_PROPERTY ) == RET_SUCCESS )
        WINDOWS.COMPONENTNAMEUPDATE( 1, (COMPID)SOURCE, VALUE );
    }

// WE NEED TO FLASH THE PORT ON THE SCREEN  WE CANT DO IT OURSELVES
    WE HAVE                                           ___ 2504
    // TO ASK THE LIST OF WINDOWS  VIEWERS TO DO IT
    WINDOWS.COMPONENTPROPERTYUPDATE( 1, (COMPID)SOURCE, (PROPID)TYPE );

// ITERATE THROUGH ALL THE CONNECTIONS THAT LEAD FROM THE SOURCE
    COMPONENT
      COMPID COMPONENTIDTO;                           ___ 2505
      PROPID PROPERTYIDTO;
      SHORT START = 0;
      WHILE ( CP>CONNECTIONLOOKUP( START, (PROPID)TYPE, COMPONENTIDTO, PROPERTYIDTO )
    )
    {
      // WE FOUND ONE
      IF ( COMPONENTIDTO )     ___ 2506
      {
        // LOOKUP THE DESTINATION                     ___ 2507
        VPSCOMPONENT *COMPONENTTOP;
        IF ( COMPONENTS.COMPONENTFIND( COMPONENTIDTO, COMPONENTTOP ) )
        {
          // NOW: WE HAVE A COMPONENT AND PROPERTY TO GET A VALUE FROM AND
          // A COMPONENT AND PROPERTY TO SET THE VALUE TO.

// OK! GET THE VALUE                        ___ 2508
          CAUTOVALUE VALUE;
          // IF THE GET (PROPERTY_READ) SUCCEEDS  DO THE PUT
          IF ( CP>IAUTOGET()>DISPATCH( TYPE, &VALUE, PROPERTY_READ, TD_PROPERTY ) ==
          RET_SUCCESS )
```

*FIG. 25A*

```
        // OK GOT A VALUE NOW SET IT (PROPERTY_WRITE)
        COMPONENTTOP>IAUTOGET()>DISPATCH( PROPERTYIDTO, &VALUE, PROPERTY_WRITE,
TD_PROPERTY );
    }
  }
  ELSE
  {
    // IT WASN'T A COMPONENT WE WERE CONNECTED TO  IT WAS A PROPERTY

// FLASH THE REPRESENTATION OF THE PROPERTY
    WINDOWS.COMPONENTPROPERTYUPDATE( 1, 0, PROPERTYIDTO );
    // TELL THE SYSTEM OUTSIDE
    EVENTRAISE( PROPERTYIDTO );
  }
 }
}

RETURN SUCCESS;
};
```

— 2509 (// OK GOT A VALUE NOW SET IT)
— 2510 (ELSE)
— 2511 (EVENTRAISE)

*FIG. 25B*

SYSTEM AND METHODS FOR VISUAL PROGRAMMING BASED ON A HIGH-LEVEL HIERARCHICAL DATA FLOW MODEL

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computers and, more particularly, to systems and methods for visually developing programs executable by computers.

Before a digital computer may accomplish a desired task, it must receive an appropriate set of instructions. Executed by the computer'microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. Most of the high-level languages currently used for program development exploit the concept of modularity whereby a commonly required set of operations can be encapsulated in a separately named subroutine, procedure, or function.

More recently, graphical or "visual" techniques have been employed to create programs. With the arrival of capable visual programming tools such as Visual Basic, "visual programming" has entered mainstream programming. Although there are many alternative approaches taken to visual programming, the basic goal is the same: to make programming easier for programmers and accessible to non-programmers. Some systems are used for rapid prototyping and rapid application development, while others are used for systems or application design. Whatever the approach or use, visual programming environments generally let users put more effort into solving their particular problem rather than learning about the computer or a particular programming language.

The best-known approach to visual programming is the interface builder, such as typified by Microsoft Visual Basic and Apple Computer's Hypercard. These environments provide a set of screen objects, such as buttons, scroll bars, menus, and the like. The user positions these "controls" on a form and "programs" their behavior through the use of a scripting language. Components, which can be quite complex, can be abstracted from one application and placed in another. In effect, these environments serve as visual environments for program construction. With these systems, users visualize the software design from the user interface perspective and then implement it.

Visual Basic and similar tools constrain the user to think of an application in terms of the user interface (UI), however. The resulting programs are very "UI-centric." Moreover, such systems lack the ability to extend predefined objects. The user can add new components, but only by resorting to conventional programming techniques, such as using the C programming language. While a user can visually assemble components on screen in Visual Basic, the user still has to resort to writing some traditional code to operate the interface and to provide the necessary logic driving the application.

The potential for performing actual programming tasks through visual means is still largely unrealized. Increasingly, users need to decouple an object from a particular interface and share it across other applications and systems.

SUMMARY OF THE INVENTION

A development system of the present invention comprises a visual programming environment based on a high level hierarchical data flow model. The system employs "components" for performing work in the system. Components communicate by sending and receiving "messages" on their "ports." Components can be constructed with a conventional programming language, such as C++ or Pascal, or constructed with Monet—the visual programming language of the system.

Various components are linked together by establishing "connections" between their ports. When a component sends a message out on a connected port, the message is received by the component(s) at the other end of the connection. In response to the message, the receiving component is activated. In this fashion, Monet programs are constructed entirely out of components which communicate via connections. Preferably, components do not communicate in any other manner, so that modular decomposition of program functionality is very explicit and very simple.

BRIEF DESCRIPTION OF THE DRAWINGS

FIGS. 10A–B comprise diagram illustrating construction of an Edit class of the present invention.

FIG. 11 is a diagram illustrating an lAuto class of the present invention.

FIG. 12 is a diagram illustrating an IControlServer class of the present invention.

FIG. 13 is a diagram illustrating a Symbols table of the present invention.

FIG. 14 is a diagram illustrating an IObject class of the present invention.

FIGS. 15 and 16 are diagrams illustrating a class constructor and destructor for the Edit class of the present invention.

FIGS. 17A–B comprise diagrams illustrating the Edit class'implementation of IControlServer methods of the present invention.

FIG. 18 is a diagram illustrating implementation of event notification methods of the Edit class of the present invention.

FIGS. 19A–E comprise diagram illustrating implementation of the remaining methods for the Edit class (for providing windowing support)

FIGS. 20A–B comprise diagram illustrating construction of a SuperComponent class of the present invention.

FIG. 21 is a diagram illustrating construction of an ISuperComponent class of the present invention.

FIG. 22 is a diagram illustrating construction of an ISuperComponentOwner class of the present invention.

FIGS. 23A–D comprise diagram illustrating construction of a VPSuperComponent class of the present invention.

FIGS. 24A–B comprise diagram illustrating construction of a VPSComponent class of the present invention.

FIG. 25A–B comprise diagram illustrating implementation of the EventNotify method by the VPSuperComponent class.

GLOSSARY

Annotation: Provides a means to annotate a component (with text, lines, circles, rectangles, etc.).

Component: Fundamental system unit. Does all processing; receives and sends messages. In an exemplary embodiment, "atomic" or "sub-components" will typically be created in a high level programming language, such as C++ or Pascal. "Composite" or "super components," on the other hand, will typically be created using visual programming or scripting techniques.

Implicit Components: Components created by the server transparently to the user. For example, copies, mergers, and type converters.

Library: A special component which contains the total set of components available to the system programmer. Arranged in groups for easy access.

Message: Unit of communication passed between components in the system: can be NULL, a single bit, a primitive type, an array or a composite type made up of any or all of these.

Port or Property: Provides the mechanism for communication of messages to code outside the present component. In an exemplary embodiment, ports are not directional (i.e., they are bi-directional). In an alternative embodiment, ports may be made directional (i.e., made uni-directional).

Project: A project is equivalent to a running application. It is the largest unit of system code. The system can manipulate several projects at once.

Representation: Provides an expandable mechanism for build-time program configuration. Uses of this mechanism include Graphical User Interface (GUI) construction, Report Generation, etc.

Socket: An object which allows the dynamic creation and deletion of components and there provides a mechanism for lazy instantiation, recursion, and multiple instantiation. It has its own ports and those of its embedded component.

Watch (or Value Marker): Logic view object which displays values on a port or on a connection.

DETAILED DESCRIPTION OF A PREFERRED EMBODIMENT

General Architecture

A. General

Figure 1:
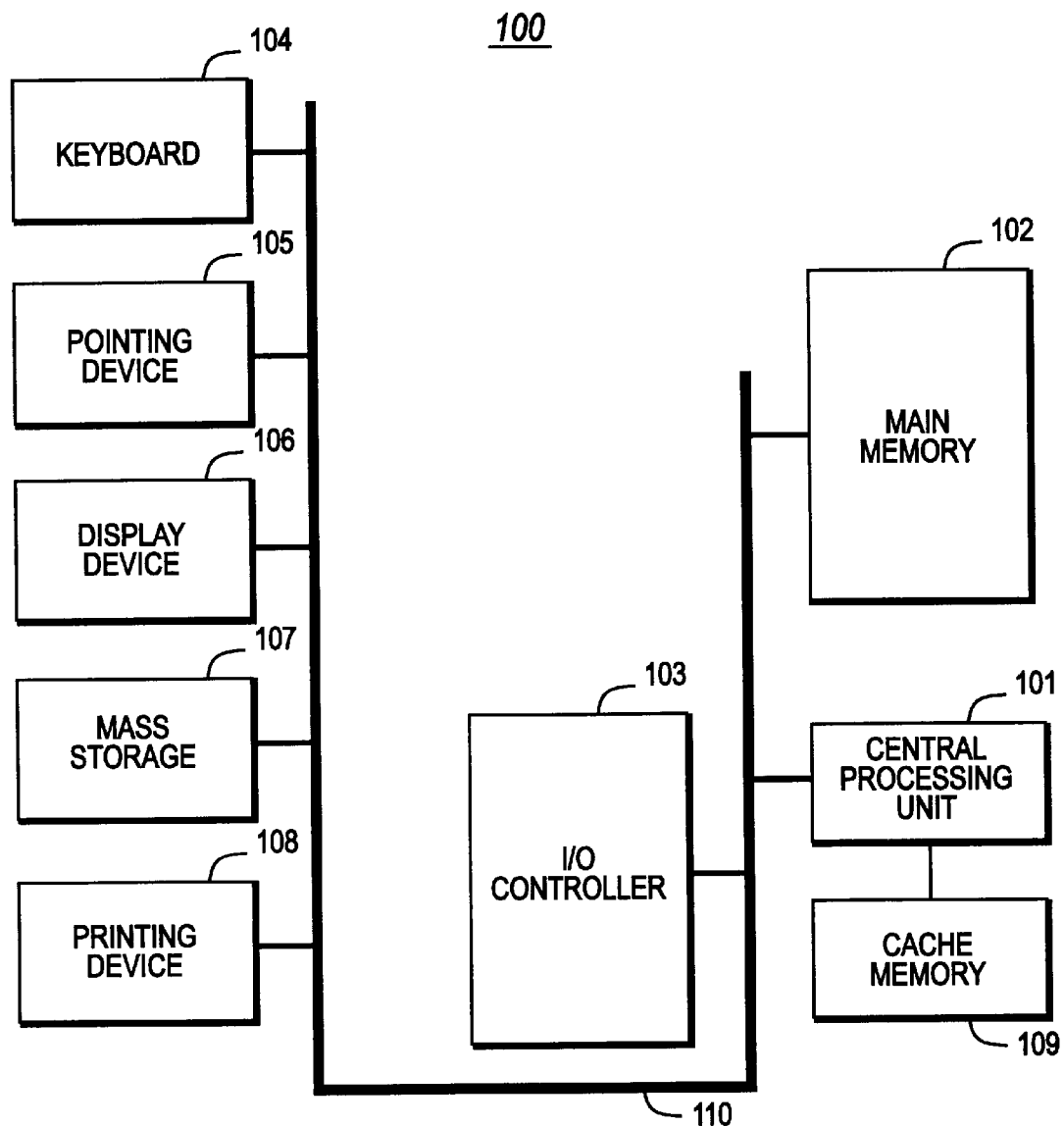
FIG. 1 is a block diagram of a computer system in which the present invention may be embodied.

The present invention may be embodied on a computer system such as the system 100 of FIG. 1, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 2A:
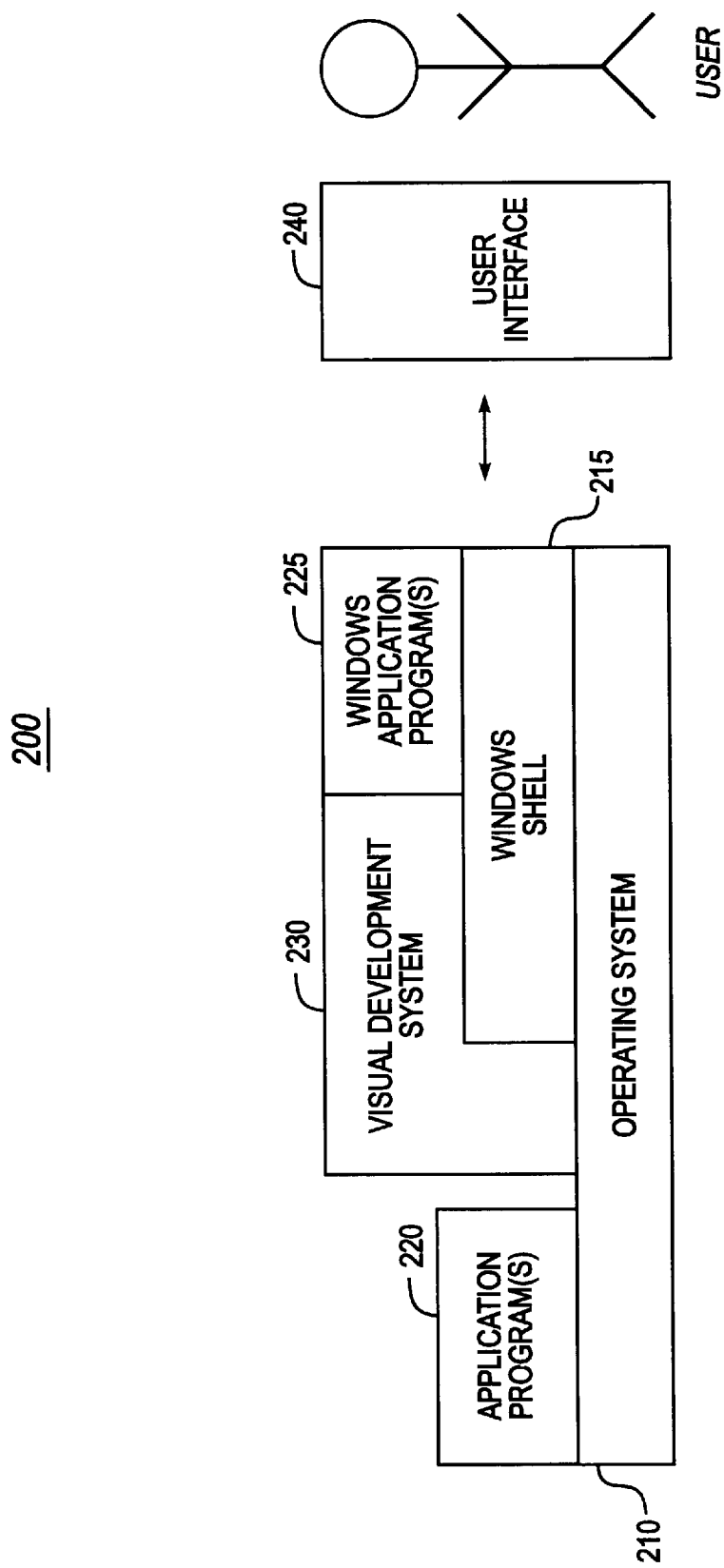
FIG. 2A is a block diagram of a software system for controlling the operation of the computer of FIG. 1.

Illustrated in FIG. 2A, a computer software system 200 is provided for directing the operation of the computer system 100. Software system 200, which is stored in system memory 102 and on disk memory 107, includes a kernel or operating system (OS) 210 and a windows shell 215. One or more application programs, such as application software 220 or windows application software 225, may be "loaded" (i.e., transferred from storage 107 into memory 102) for execution by the system 100.

System 200 includes a user interface (UI) 240, preferably a graphical user interface (GUI), for receiving user commands and data. These inputs, in turn, may be acted upon by the system 100 in accordance with instructions from operating module 210, Windows 215, and/or application modules 220, 225. The UI 240 also serves to display the results of an operation, whereupon the user may supply additional inputs or terminate the session. Although shown conceptually as a separate module, the UI is typically provided by applications 220, 225 and Windows shell 215, operating under OS 210. In a preferred embodiment, OS 210 is MS-DOS and Windows 215 is Microsoft® Windows; both are available from Microsoft Corporation of Redmond, Wash.

System 200 also includes a Visual Development System 230 of the present invention for aiding users in the task of creating software programs. As shown, the system 230 interfaces with the system 100 through Windows shell 215, as well as interfacing directly through OS 210.

B. Graphical User (Windowing) Interface

Figure 2B:
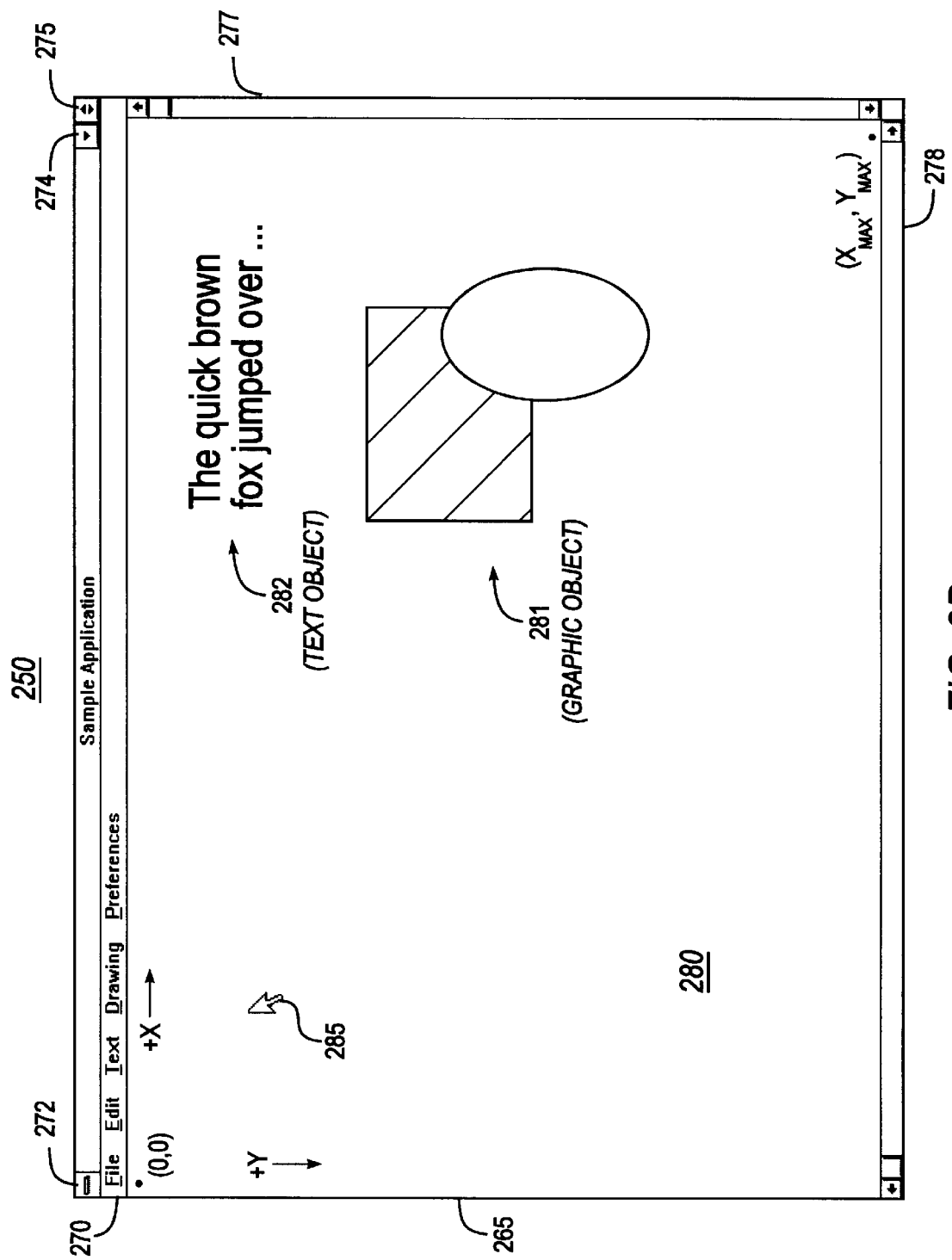
FIG. 2B is a screen shot illustrating a graphical user interface for the software system of FIG. 2A.

As shown in FIG. 2B, the system 100 typically presents UI 240 as a windowing interface or workspace 250 having one or more windows 265. Window 265 is a rectangular, graphical user interface (GUI) for display on screen 106; additional windowing elements may be displayed in various sizes and formats (e.g., tiled or cascaded), as desired. At the top of the window is a menu bar 270 with a plurality of user-command choices, each of which may invoke additional submenus and software tools for use with application objects. Window 265 includes a client area 280 for displaying and manipulating screen objects, such as graphic object 281 and text object 282. In essence, the client area is a workspace or viewport for the user to interact with data objects which reside within the computer system 100.

The Windowing interface includes a screen cursor or pointer 285 for selecting and otherwise invoking screen objects of interest. In response to user movement signals from the pointing device 105, the cursor 285 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 265 may be closed, resized, or scrolled by "clicking on" (selecting) screen components 272, 274/5, and 277/8, respectively. Keystroke equivalents, including keyboard accelerators or "hot keys", are provided for performing these and other user operations through keyboard 104.

Visual Development System

A. Overview

The development system 230 of the present invention comprises a visual programming environment based on a high level hierarchical data flow model. The system employs "components" for performing work in the system. Components communicate by sending and receiving "messages" on their "ports." Components can be constructed with a conventional programming language, such as C++ or Pascal, or constructed with Monet—the visual programming language of the system. For purposes of the following, components constructed in a conventional programming language are referred to as "atomic." Components constructed in the Monet programming language, on the other hand, are called "composite."

Various components are linked together by establishing "connections" between their ports. When a component sends a message out on a connected port, the message is received by the component(s) at the other end of the connection. In response to the message, the receiving component is activated. In this fashion, Monet programs are constructed entirely out of components which communicate via connections. Preferably, components do not communicate in any other manner, so that modular decomposition of program functionality is very explicit and very simple.

In a preferred embodiment, the syntax and programming constructs of Monet are kept simple. These comprise the following:

| | |
|---|---|
| Message | Unit of communication in Monet. |
| Component | Does all the computation in Monet: receives and send messages. |
| Connection | Defines the data flow in a program by connection Components, Ports and Sockets. |
| Port or Property | Provides the mechanism for passing messages to and from a Component. |
| Watch (or Value Marker) | Allows messages to be inspected at connections and ports. |
| Socket | Allows creation and deletion of components under program control for late loading, recursion, and multiple instantiation. |
| Annotation | Provides "comments" in a component. Primitives include: formatted text, lines, ellipses, and rectangles. |

B. Components

Figure 3A:
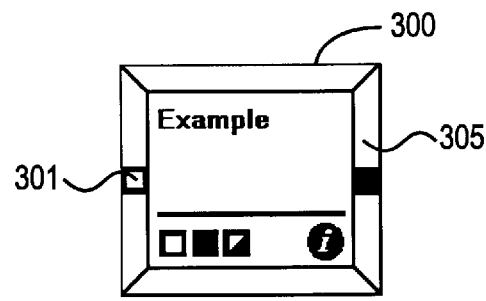
FIG. 3A is a bitmap of a simple component, "example."

At the level of the user interface, users work with components which are displayed on screen. Component 300, named "Example," is depicted in FIG. 3A. The component includes two Ports 301, 305 which are available for connection. Moreover, the component 300 is a "Composite Component"—that is, it itself is comprised of sub-components.

Figure 3B:
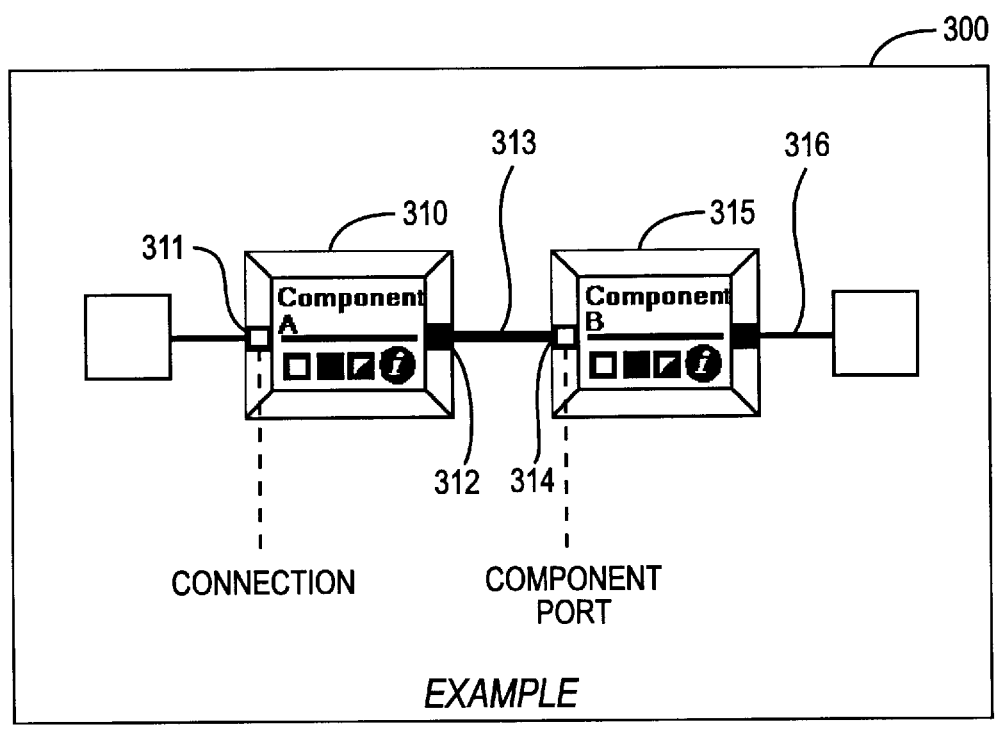
FIG. 3B is a bitmap illustrating the establishing of a connection between two components, via component ports.

FIG. 3B shows what is inside the Composite Component 300. Specifically, the component contains two sub-components, Component A 310 and Component B 315. The sub-components contain two external ports—Port A 311 and Port B 316—which correspond to the ports available for connection on the outside of the object. The sub-components themselves are connected together by a Connection 313, which connects Port 312 to Port 314.

Messages arriving at Port 301 of "Example" are sent to the Port of Component A (i.e., Port 311). If during processing of the message Component A generates a new message, that new message is sent to Component B via Connection 313. Any messages generated by Component B are sent out on Port B (i.e., Port 316) where they are forwarded to whatever object is connected to the port.

C. Program Development

The system provides as an interface a Visual Development Environment (VDE) for creating an application program. The VDE provides tools for manipulating and navigating the diagrammatic representation of a program. Techniques for programming in the VDE will be illustrated employing both "top-down" and "bottom-up" programming methodology.

Top-down programming involves breaking a main task down into a handful of more manageable sub-tasks. These sub-tasks are then themselves broken down into sub-sub-tasks and so on until the task being defined are single operations. Generally, top-down programming style leads to solid program structure. Using the VDE, the user can create programs using top-down methodology very simply.

Figure 4A:
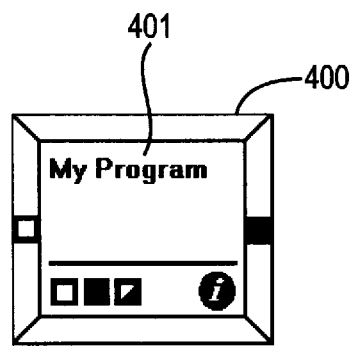
FIGS. 4A–G are bitmap screen shots illustrating the task of creating a component which includes nested components or "sub-components."

Referring now to FIGS. 4A–G the overall process will be described. As shown in FIG. 4A, the user first creates a Blank Composite Component 400. The user assigns the component a Name 401, such as "My Program"; the Name serves as the name for the entire program.

Figure 4B:
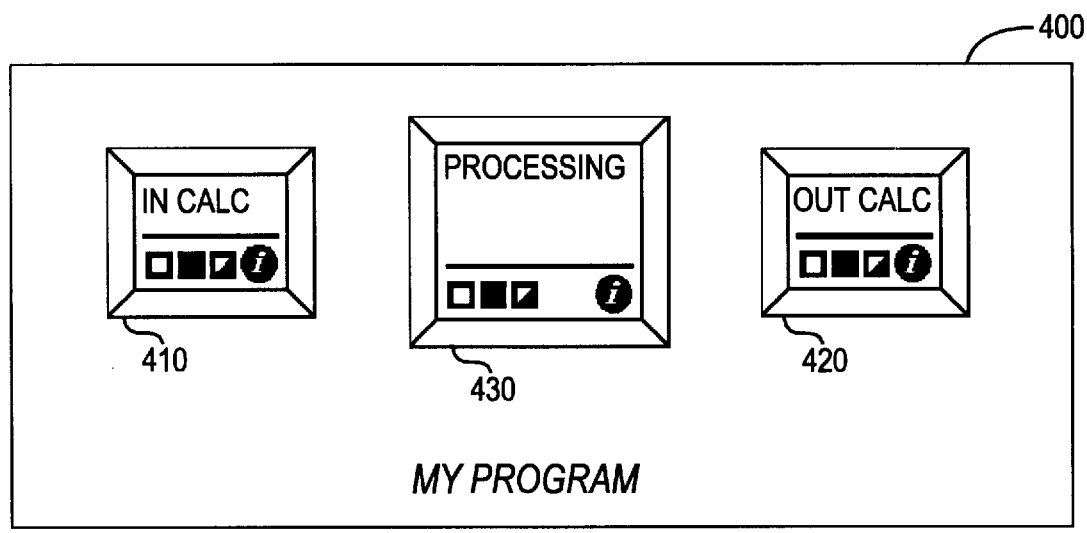

The user then proceeds to select (e.g., double-click) on the Component 400 to "jump inside" the component for creating sub-components. As shown in FIG. 4B, for instance, upon the user double-clicking the Component 400, the following sub-components are displayed: In Calc sub-component 410, Processing sub-component 430, and Out Calc sub-component 420. These sub-components correspond to the main functional areas of this sample program. The user may then proceed to choose one of the newly created sub-components (e.g., Processing). The user can then "jump into" the sub-component by double-clicking on it.

Figure 4C:
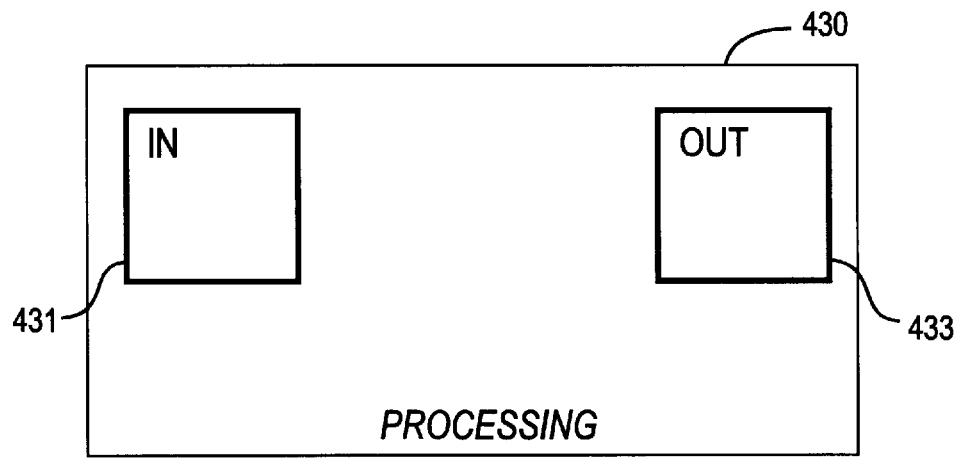
Figure 4D:
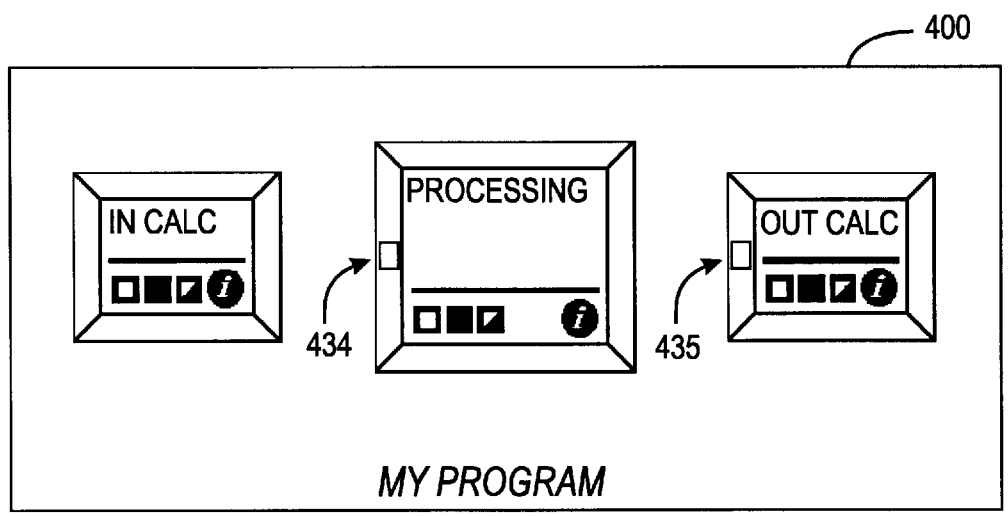
Figure 4E:
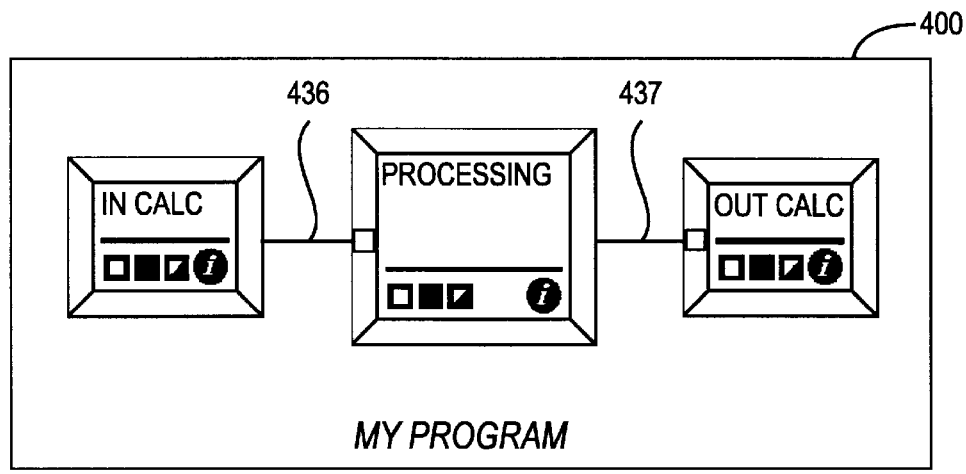

As shown in FIG. 4C, the Processing Component 430 has a Port 431 and a Port 433, each represented by a port icon. As shown in FIG. 4D, the user may proceed to create ports for connecting the components, using the port icons 434, 435. With the various ports established, the user may proceed to interconnect the components, as shown by the connections 436, 437 in FIG. 4E. The top level of the program is now completely defined: data will flow from In Calc to Processing, and then from there on to Out Calc. Refinement of the program proceeds by populating each of the internal Composite Components, as will be described next.

Figure 4F:
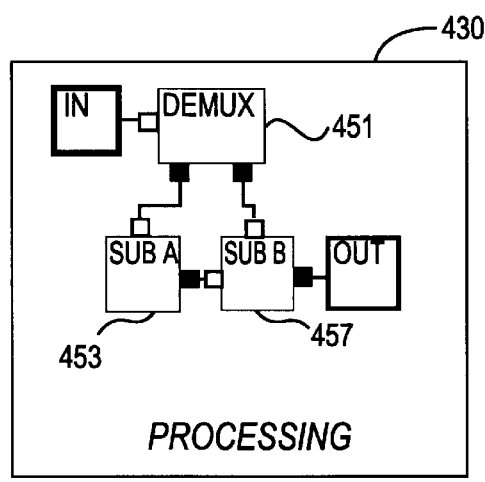
Figure 4G:
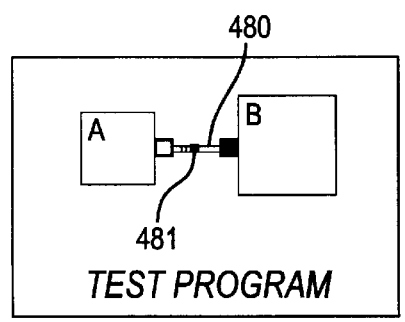

Continuing with the example of "My Program," the user adds two more Composite Components, Sub A 453 and Sub B 457, to the Processing component 430, as shown in FIG. 4F. Additionally, the user has added a pre-defined (atomic) Demultiplexor Component 451, by dragging it from a standard library of the system. Sub-Components A and B have been further refined to the point where they now include ports, as shown. The user has proceeded to connect together the ports of all of the sub-components in the Processing component. Data flow and functionality can now be tested and debugged, as desired.

D. Debugging

Since data flow is actually represented on screen to the user, the task of debugging is straightforward. While a program is executing, a user-selectable menu option may be set to cause all of the connections in a component to become "hollow", shown in FIG. 4G at 480. In this state, the system depicts all messages traveling from one component to another as small squares, shown at 481. Dedicated viewers, such as bitmap viewers, may be added as desired.

E. Two separate hierarchies for components

Some components have more than one type of behavior and may reside in more than one hierarchy of objects. Conventional graphical user interface elements, such as screen buttons and the like, appear as simple, static rectangles in a "Logic View" of the program. In a "User Interface View," on the other hand, objects are shown having a more complex appearance (e.g., a push button or a spread sheet). The hierarchical location of controls in a window (i.e., inside child windows and group boxes) may have little or no bearing on their location in the Logic View. State diagrams may be constructed where the states and events correspond to components in the Logic View. The hierarchical structure of events and states in a state diagram do not necessarily appear in the same way in the Logic View.

F. Language Objects

Language objects comprise components, ports, value markers, connections, annotations, and sockets. Each will be described in further detail.

Components perform the work or computation in a Monet program. The details of their inner workings are hidden from the rest of the program, with ports being the only means of communicating with them. Based on their inner workings, components can be divided into two types: atomic and composite. Atomic components contain high level language constructs, such as C++ or Pascal classes. Composite Components, on the other hand, contain Monet constructs—that is, components, ports, connections, annotations, and the like. Preferably, the two types of components will be presented to a user with slightly different appearance. Functionally, however, they are indistinguishable from the user's perspective. Thus, the user need not know what type of component he or she is invoking.

Applications in Monet typically comprise Composite Components that contain lower-level Composite Components, and so on until at the lowest level atomic components are used. In this fashion, programs can be built to exhibit excellent modular decomposition.

In an exemplary embodiment, the system provides a large set of general purpose components for use in user programs. These components are similar to standard library functions and conventional programming languages (e.g., standard C library). However, the components are more powerful than their conventional counterparts in that they can be encapsulated into a Composite Component, giving additional functionality. The resultant component can then be reinserted into the library for reuse.

All components execute whenever they receive a message on a port. However, messages are not "consumed" by components; a connection is not blocked because of an unprocessed message still occupying it. This approach avoids deadlock and demand-flow problems.

A component may have representations other than its functional appearance. For example a push button component will have a user interface view (i.e., it will appear like a button on a screen), in addition to its component representation in the Logic View of a program. All objects which appear on screen, therefore, have a second representation. This approach permits the construction of program objects which do not necessarily share the same hierarchical structure as the program (such as user interfaces, state diagrams, and the like).

Frequently, a component is developed as part of a larger program and will be used several times throughout that program. A problem occurs when several copies of a component reside in the same program and the definition of all of the components needs to be changed. One approach to the problem is to save a master copy into a library so that when changes are required only the library version is rewritten. Next time the program is loaded, the new definition of the component is used in all cases. A second approach is to provide a mechanism that specifies that one of the components is the original, and all others are copies. When the original is changed, all copies are changed as well.

Ports provide a mechanism for Monet programs to communicate with code inside other components. Each atomic component of a particular Type has the same set of ports, defined by the component writer. The Composite Component writer defines the ports found on the outside of the component by placing port objects within it.

In an exemplary embodiment, ports are bi-directional—that is, they can send or receive data in either direction. Alternatively, ports may be designed with direction, such as providing "In" and "Out" directional ports. Ports can retain default values, so that when a port remains unconnected it adopts the default value. When a port is connected, its Value is changed when a message is received. Property inspection (described below) may also be used to change the default Value of a port.

All ports have an associated Type. Typically, these types are simple strings, but may include Type variables as well. The system enforces Type matching of ports, so that ports whose Types do not match cannot be connected. In this manner, a port will not receive a message of an unexpected Type.

A Value marker or Watch is a static representation of a "last Value" at a particular location in the program. It is provided so that a user can see Values (e.g., text, numbers, records, bitmaps, and the like) in the context of their programs. Selecting (double-clicking) on a Value marker linked to a port invokes a property inspector for that port.

Connections provide the mechanism by which objects are connected together. Connections pass messages between and among components, sockets, and ports. Connections are permitted only if both the source and destination ports are currently unattached; the source and destination ports are of compatible directions; and the source and destination are of matching port Types. Connections can have two types of priority: normal and immediate. Messages delivered on immediate connections are sent directly to their destinations, making this sort of connection appropriate for time-critical functions. Messages sent via normal connections, on the other hand, are queued up to be sent as soon as possible.

Annotations are a user-provided comment. In addition to text, diagrams and graphics may be added by the user to a component to document its function. Annotations do not affect processing and functionality at all. Basic drawing tools are provided to allow users to add annotations.

Working Interface and Exemplary User Session

Figure 5A:
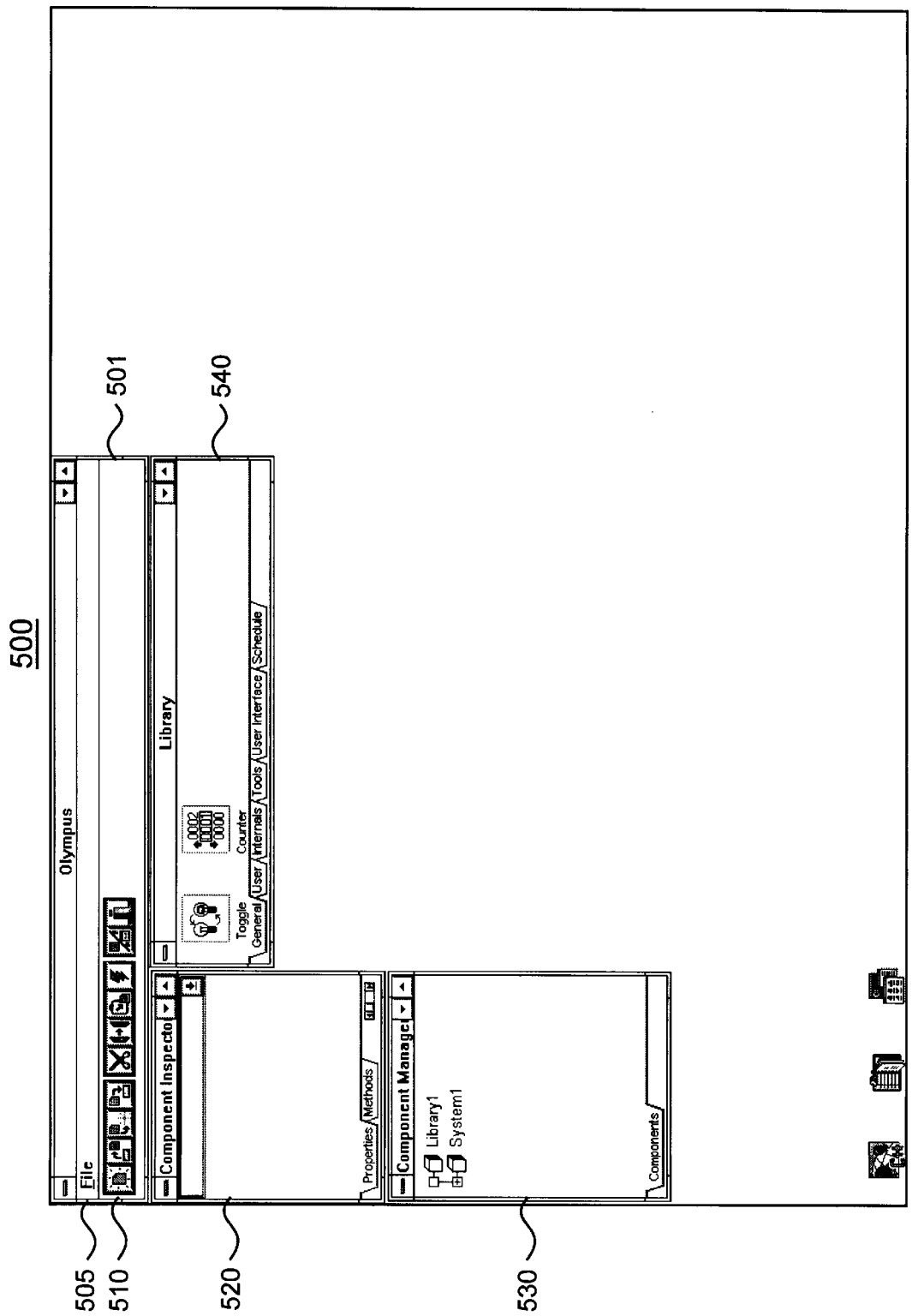
FIGS. 5A–C are bitmap screen shots illustrating an exemplary interface of the visual development environment (VDE) of the present invention, which includes a component inspector, a component manager, and a library.

As illustrated in FIG. 5A, the Visual Development System 230 of the present invention includes a development interface or work surface 500. The work surface 500, in turn, includes a main window 501, a Component Inspector Window 520, a Component Manager Window 530, and a Library Window 540. The main window 501 includes a menu bar 505 and a tool bar 510. Menu bar 505 includes user-selectable menu choices for invoking operations of the system. Tool bar 510 includes an array of screen buttons for one-click access to system commands. Other windows on the work surface 500 (e.g., window 540) may register their own tools with the tool bar or palette 510, for providing users with access to those tools from the main window 501.

Component Inspector Window 520 provides specific information about a component. In particular, when a component is selected by the user, the Component Inspector displays information about the specific properties and methods of that selected component. The Component Manager Window 530 displays in outline view the current components present on the work surface 500. As shown, for instance, a default Library ("Library1") component and default system ("System1") component are present. Finally, the Library window 540 displays a tabbed palette of Library components which the user may "drag-and-drop" into his or her program application.

Figure 5B:
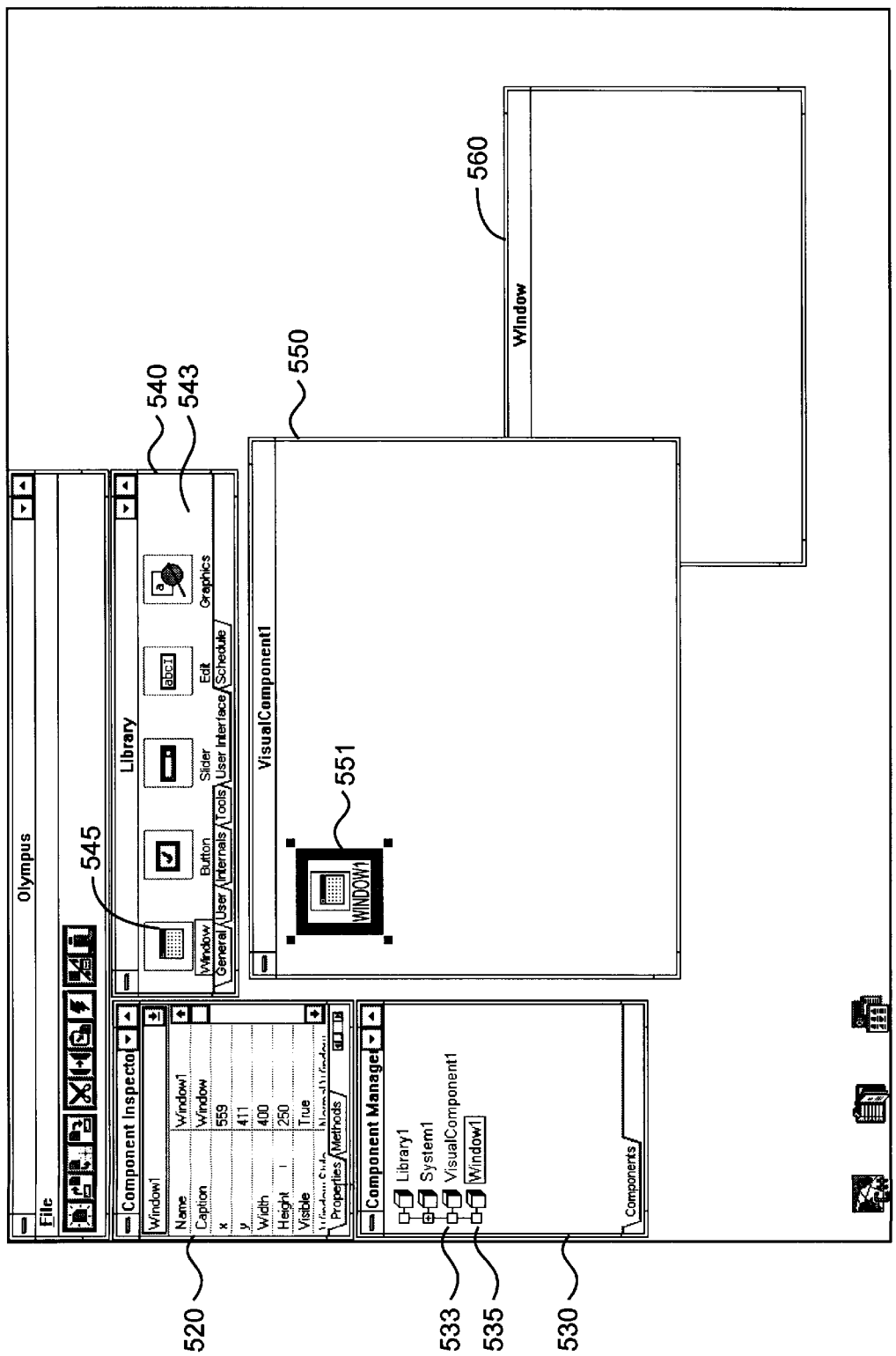
Figure 5C:
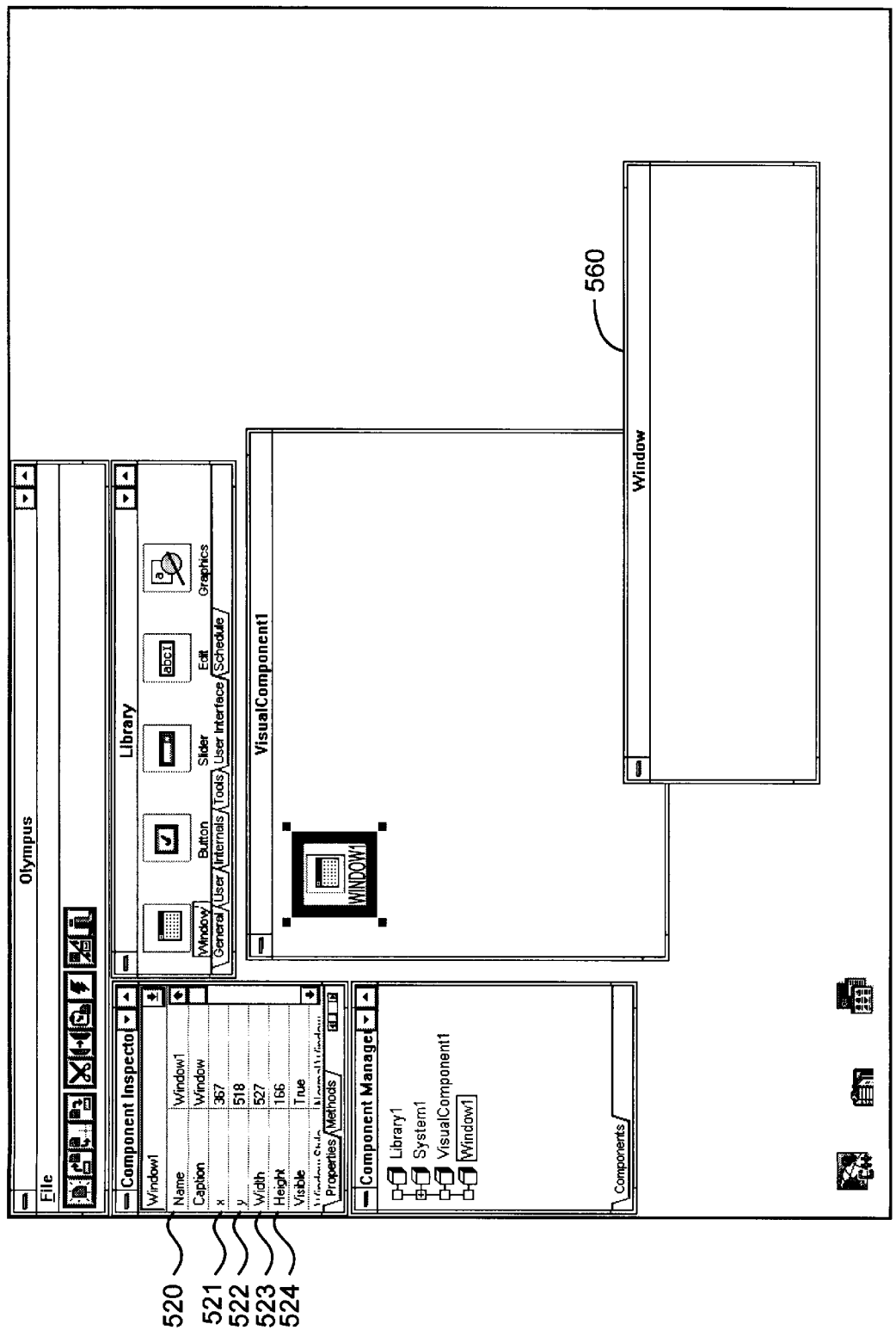

Referring now to FIGS. 5B–C, operation of the system will be illustrated by way of example. As shown in FIG. 5B, the user begins by creating a Visual Component (e.g., Visual Component Window 550). This is done by selecting "VisualComponent" from the Library Window 540. The user may then proceed to create Window 551 by selecting Window Component 545 (e.g., double-clicking it) from the "User Interface" Palette 543 of Library Window 540. The Visual Component Window 550 displays graphically the window component, "Window1" 551. A side effect of this action is the creation of the window for Window Component 545— that is, window 560.

Window 550 is a visual programming editor or "viewer." The editor serves as a container for visual components—a central representation for the program under development. Thus as shown, the viewer 550 includes the Window Component 551 which corresponds to the Window object 560 (which is a window to appear in the application being developed by the user).

Throughout the user session, the work surface 500 is always "live." For instance, the Component Inspector Window 520 is updated to display specific information about the currently selected component (i.e., Window Component 551). In particular, the Component Inspector displays information about the component's Name, Caption, Position, Height, and the like. The user can easily modify a property by clicking on the desired property (e.g., "Caption" field) and entering in a new Value. Since the work space is always live, the component whose property has changed is immediately updated to reflect the newly entered Value. Any modifications made directly to the component (e.g., resizing window 560) are, in turn, immediately reflected by the Component Inspector 520; also shown, the Component Manager Window 530 is updated to display the new component, shown at 533. Since the system is always live, there is no "compile/link" cycle. Instead, properties and methods of components remain active at all times so that changes occurring in components take effect immediately.

The Component Manager Window 530 provides a list of all components currently running in the system. When the user selected the "Visual Component" object from the library 540, VisualComponent1 was created; similarly, when the user selected the "Window" component from the library 540, Window1 was created. Accordingly, the Component Manager Window 530 displays a VisualComponent1 node 533 and a Window1 node 535.

The Component Manager is also synchronized so that the node for the currently selected component is always highlighted. FIG. 5C illustrates this synchronization. As shown, window 560 has been resized and repositioned (e.g., using conventional mouse/pointing device techniques). Simultaneous with this action, the Component Inspector Window 520 updates the x and y properties, shown at 521, 522, and the Width and Height properties, shown at 523, 524.

Figure 6A:
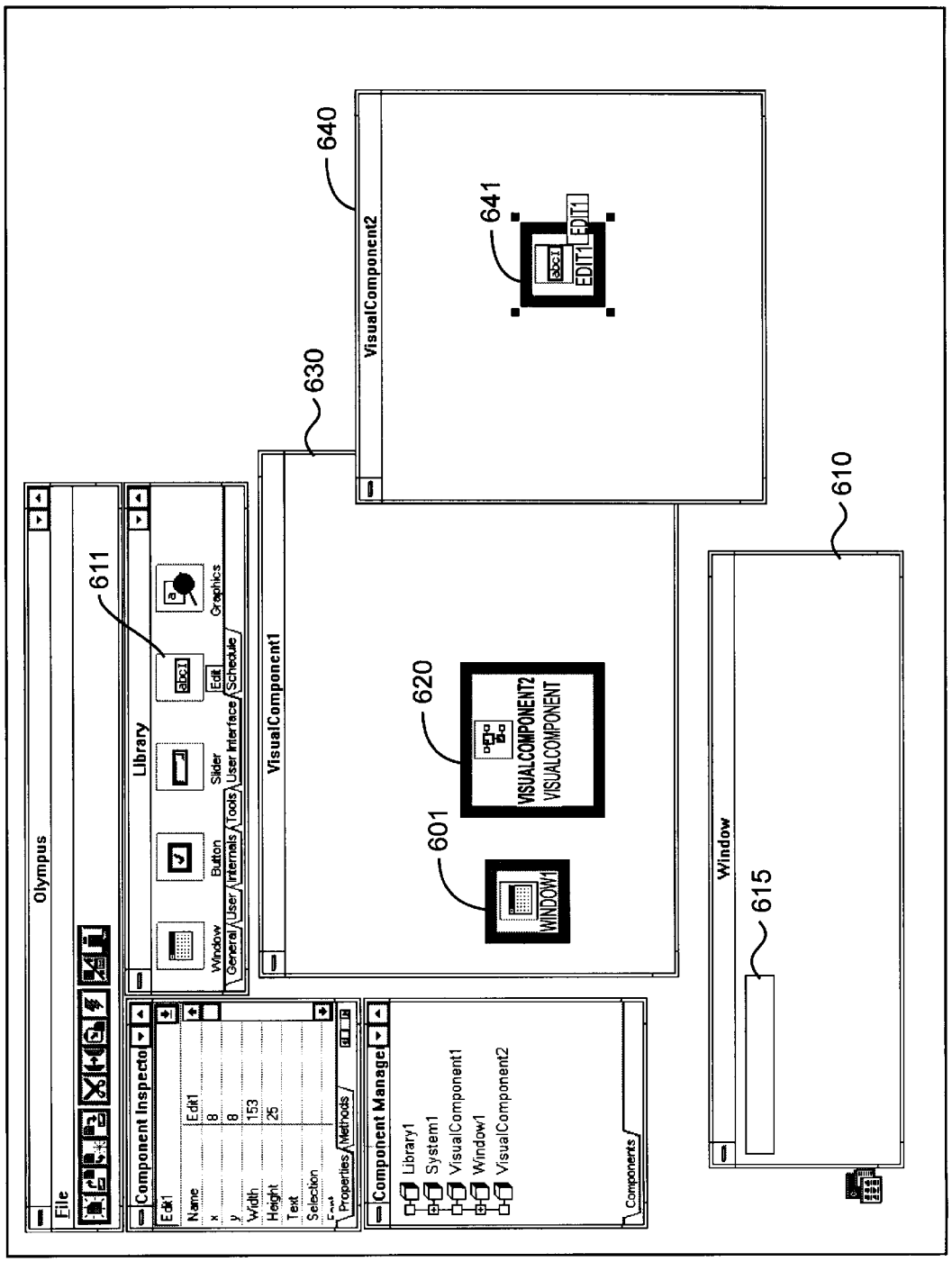
FIGS. 6A–F are bitmap screen shots illustrating the operation of this system for creating one or more sub-components (i.e., components which are nested within other components).

Components are nestable to an arbitrary depth within the visual programming editor. Any component which contains other components is known as a "SuperComponent"; a component which is contained is a "sub-component." Nesting is illustrated in FIG. 6A. As previously described, Window1 (shown at 601) is manifested by Window object 610, at the level of the user interface. An additional element, such as an Edit box or Scroll bar, can be added to the window 610. For instance, a new component— VisualComponent2 shown at 620—may be placed within the first Visual Component, VisualComponent1. In a manner similar to before, the user can then proceed to create Edit Field 615, by selecting Edit Component 611 from the Library Palette. The act of creating Edit Field 615 causes the Edit Field to appear within the window 610. Thus, VisualComponent2 is a "sub-component" of VisualComponent1— that is, it is a component nested within VisualComponent1. Moreover, the act of creating VisualComponent2 within the VisualComponent1 window causes it (i.e., the Edit Field) to represent itself within the Window object 610, which is the visual component corresponding to Window1 601. Thus as shown, Edit Field 615 appears within the boundaries of Window 610.

Thus as previously described, the system maintains two hierarchies. The first hierarchy is the one which represents the decomposition of logic of the program, such as shown by the visual programming editor 630. In the instant example, the visual programming editor contains VisualComponent1 which has a sub-component VisualComponent2. This relationship forms a hierarchy. Continuing in this manner, a user may build on the hierarchy by adding additional nested components to an arbitrary depth, building for instance a tree hierarchy.

A second hierarchy in the system is that of the user interface. In the user interface for the program being constructed in the present example, an element from inside VisualComponent2, Edit Field 615, is now placed on the Window 610. The window itself, in turn, is from VisualComponent1.

By selecting VisualComponent2 620 from the editor 630, for instance by double-clicking on it, the user can instruct the system to display a viewer for the component. For instance, selecting VisualComponent2 causes the system to display VisualComponent2 viewer 640. As shown, the viewer 640 contains an Edit component 641.

Figure 6B:
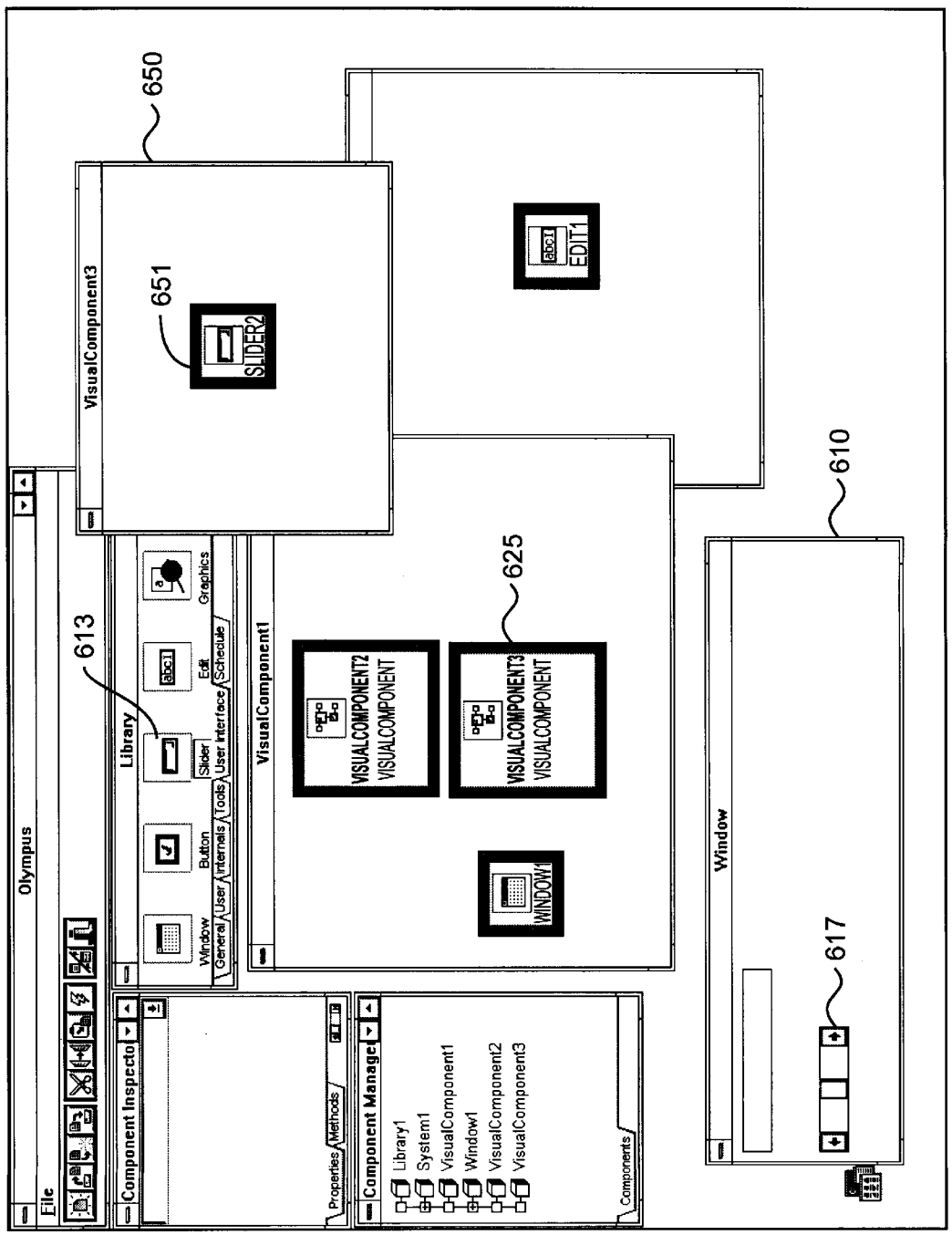

The example continues with placement of another nested visual component. As shown in FIG. 6B, the user may select a Slider component 613 from the Library Palette and place the component within the VisualComponent1, as shown at 625. Simultaneous with this action the user interface manifestation of this component—Scroll bar 617—appears in the Window object 610. By selecting the VisualComponent3 625, such as double-clicking, the user can instruct the system to display a visual editor 650 for the VisualComponent3. In a manner similar to that shown for the VisualComponent2 editor 640, the VisualComponent3 editor 650 displays a graphic representation of its object, Slider2 651.

Figure 6C:
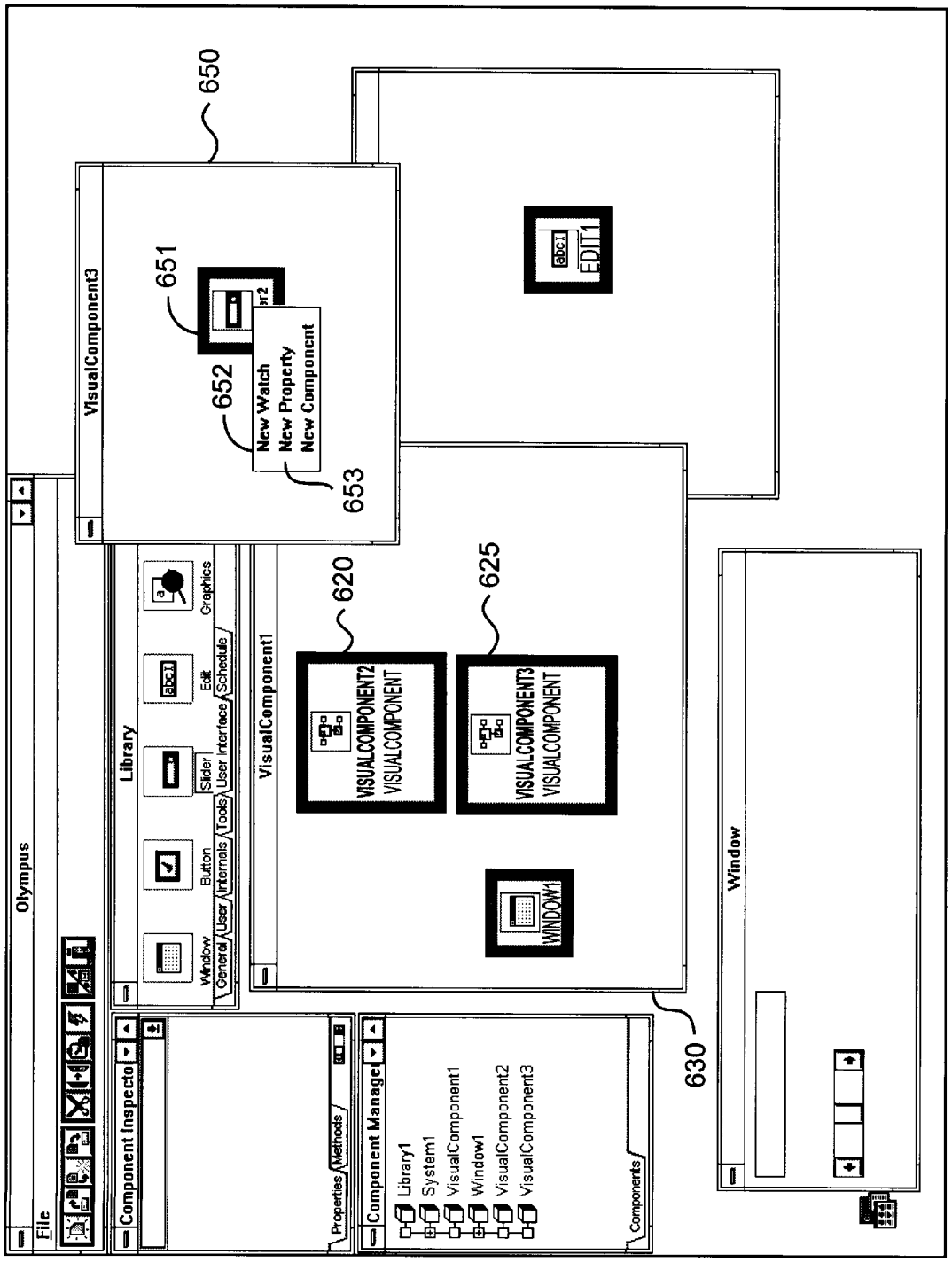

The example will continue with an illustration of how the user connects one component to another, such as connecting the Scroll bar 617 to the Edit Field (so that movement of the Slider causes information to appear in the Edit Field). As VisualComponent2 620 and VisualComponent3 625 appear in VisualComponent1 630, as shown in FIG. 6C, it is not evident exactly what is inside either one of the two components (i.e., the VisualComponent2 and the VisualComponent3 nested components). In other words, at this point the system has encapsulated the complexity of the nested components so that they do not manifest properties at this particular instance.

Figure 6D:
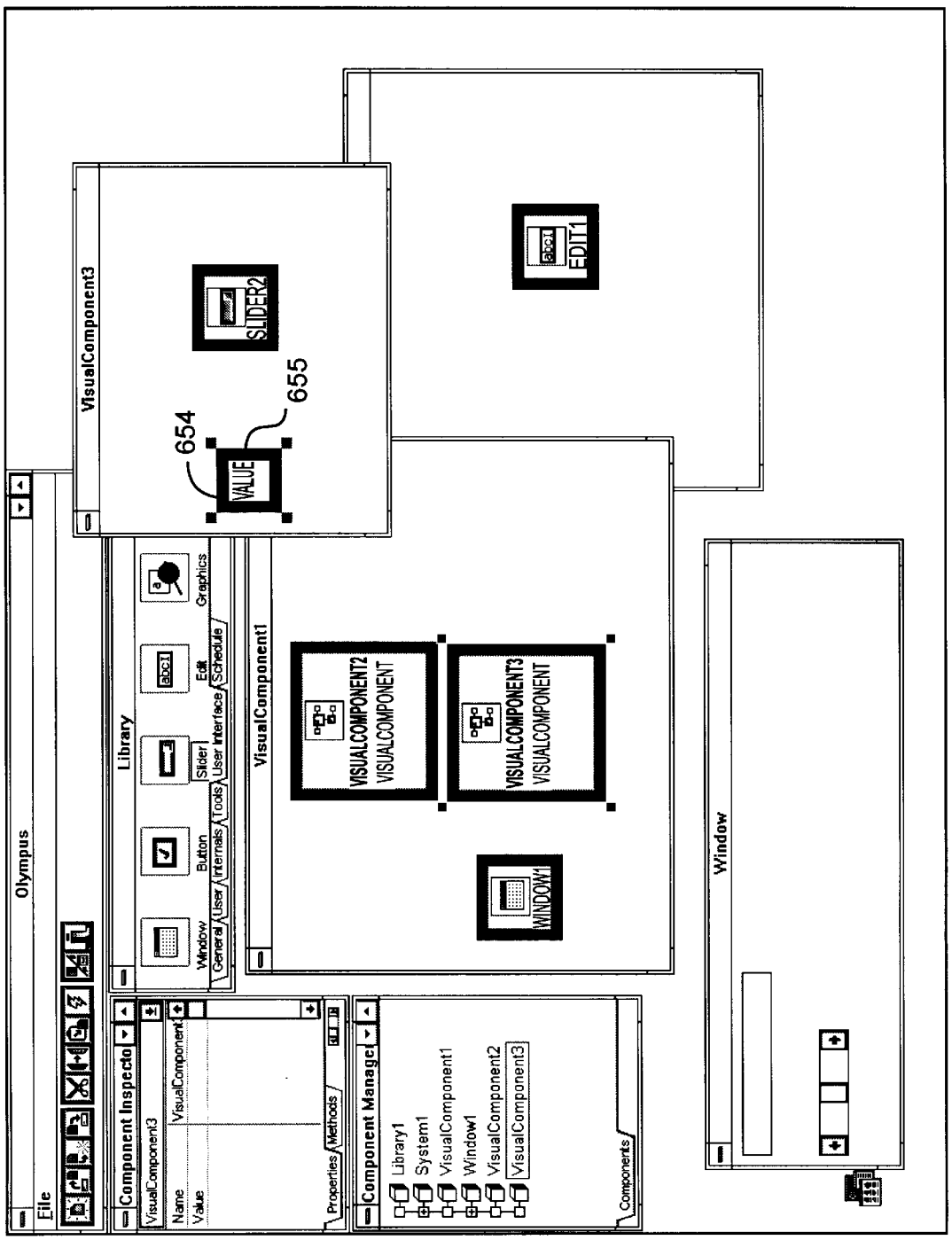

The user accesses the VisualComponent3 (i.e., access to its internal properties) by adding a new property to the component, as shown in FIG. 6C. The user requests property inspection of the Slider 651 which appears in the visual editor 650 (e.g., by right-clicking on it with a mouse cursor). In response, the system displays pop-up menu 652. The user may instruct the system to create a new property by selecting "New Property" menu choice 653. The system, in response, displays a Property Object 654, as shown in FIG. 6D. Here, the user can type in a New Property, such as "Value" 655. Now, Value 655 is a property which may be accessed from outside the component.

Figure 6E:
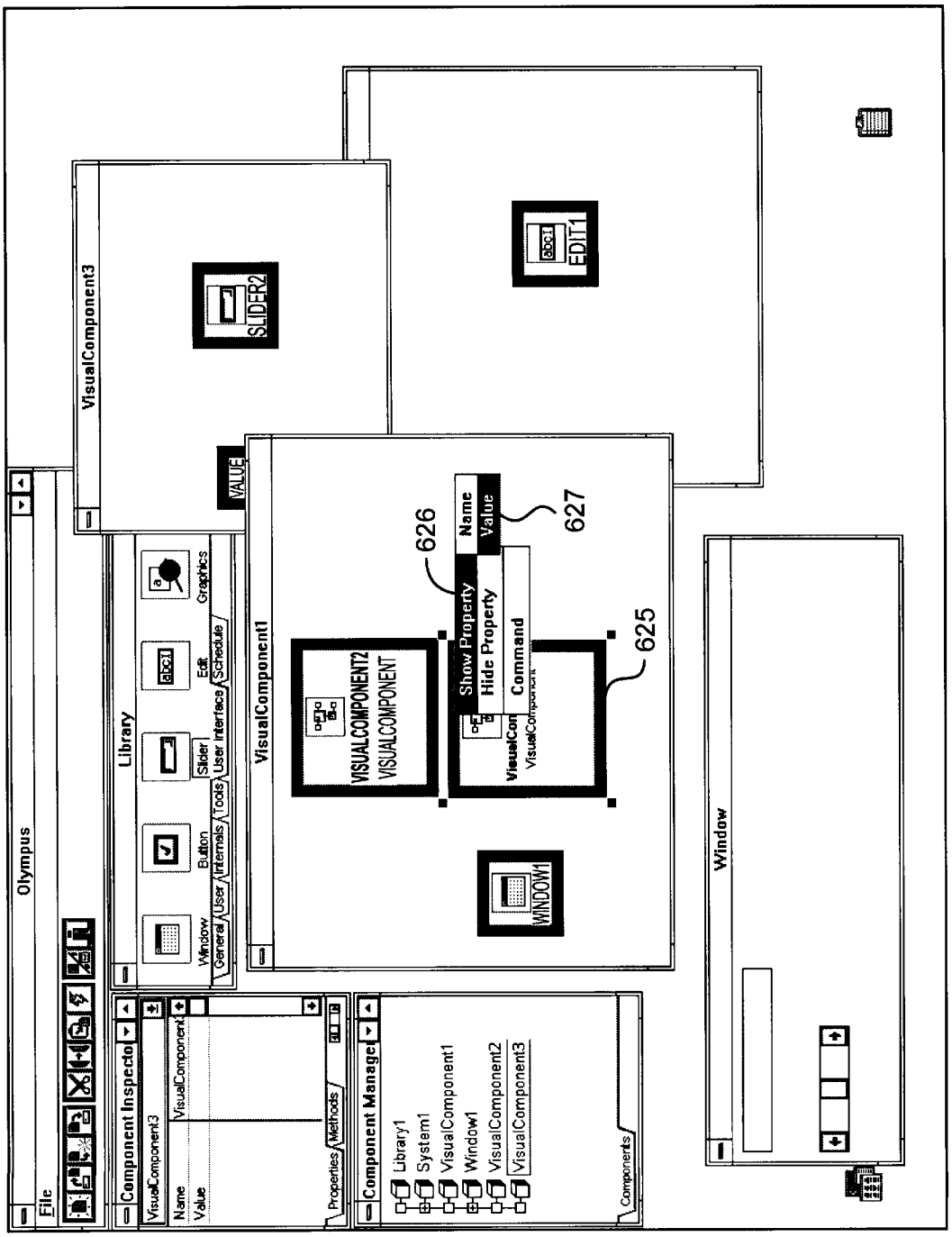
Figure 6F:
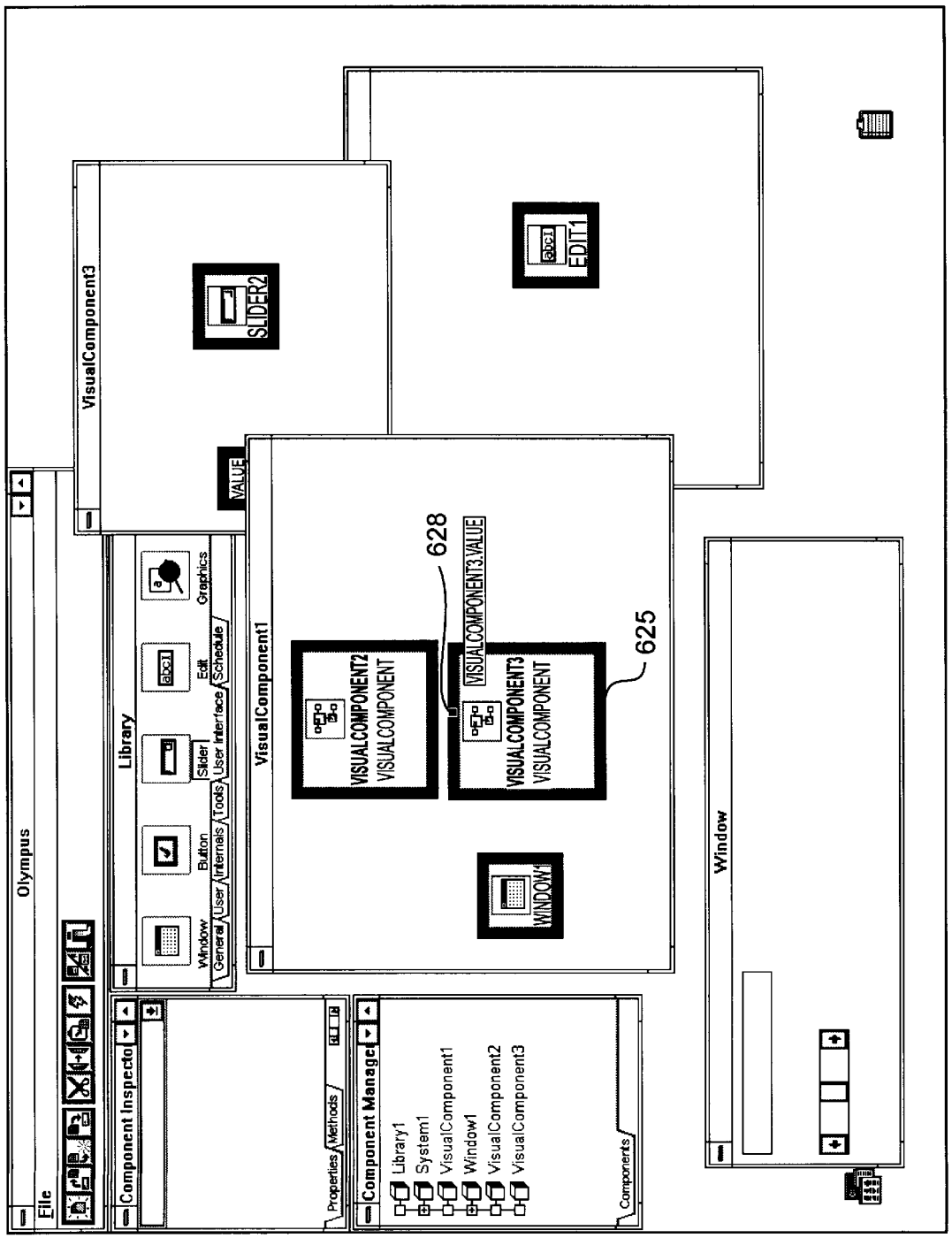

As shown in FIG. 6E, for instance, by selecting VisualComponent3 625 and requesting property inspection, such as "right-clicking" it, the system displays pop-up menu 626. As shown, the pop-up menu 626 includes a "Show Property" selection which brings up a sub-menu having a "Value" choice 627 (which corresponds to Value property 655). As shown in FIG. 6F, VisualComponent3 625 includes Value box 628—a visual representation of the "Value" property of VisualComponent3. At this instance in the example, the Value property of VisualComponent3 is not "connected" to anything; it is essentially "free floating." Next, the steps for connecting the Value property will be described in detail.

Figure 7A:
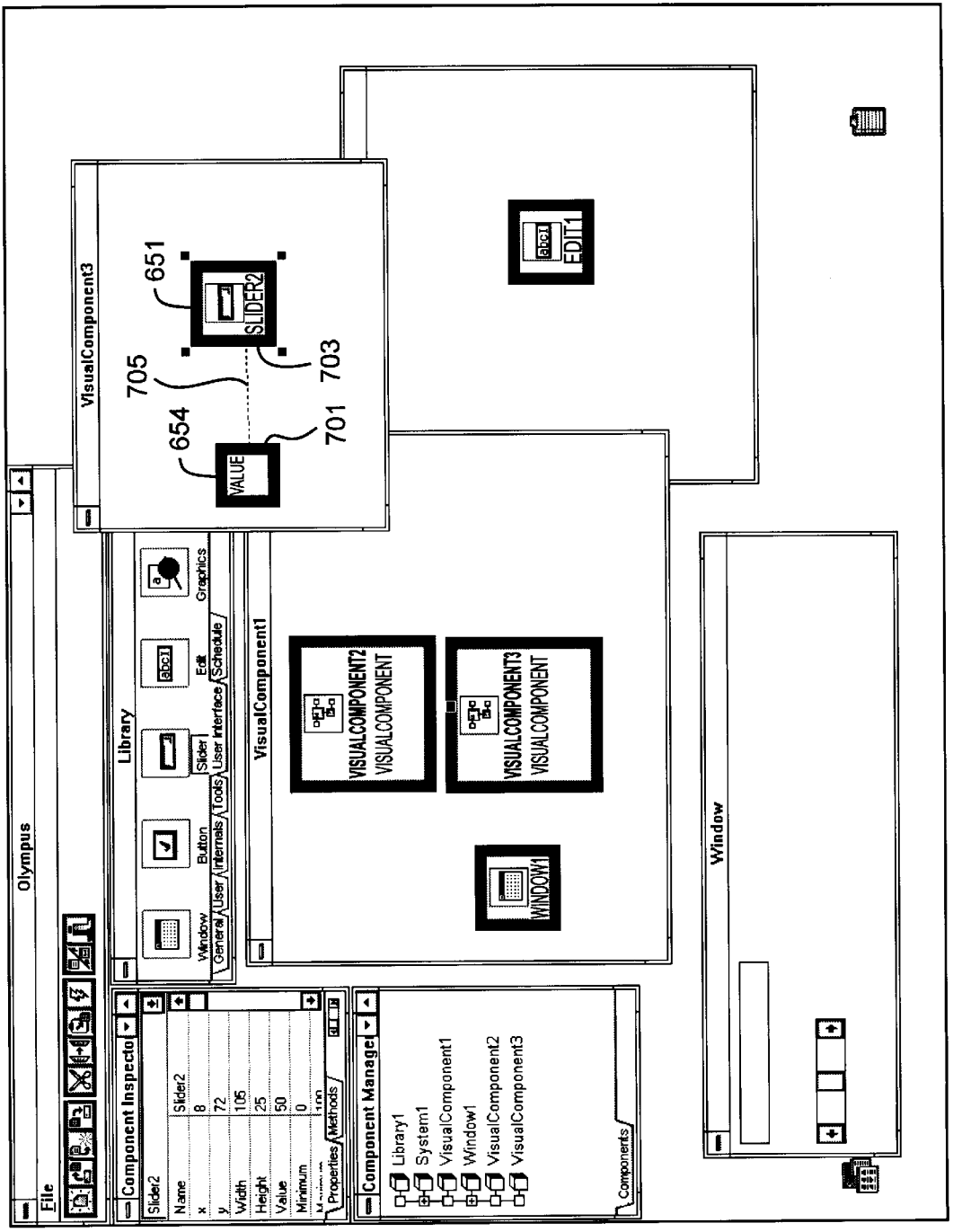
FIGS. 7A–C are bitmap screen shots illustrating operation of the system for surfacing a property of a component and connecting it to other components.
Figure 7B:
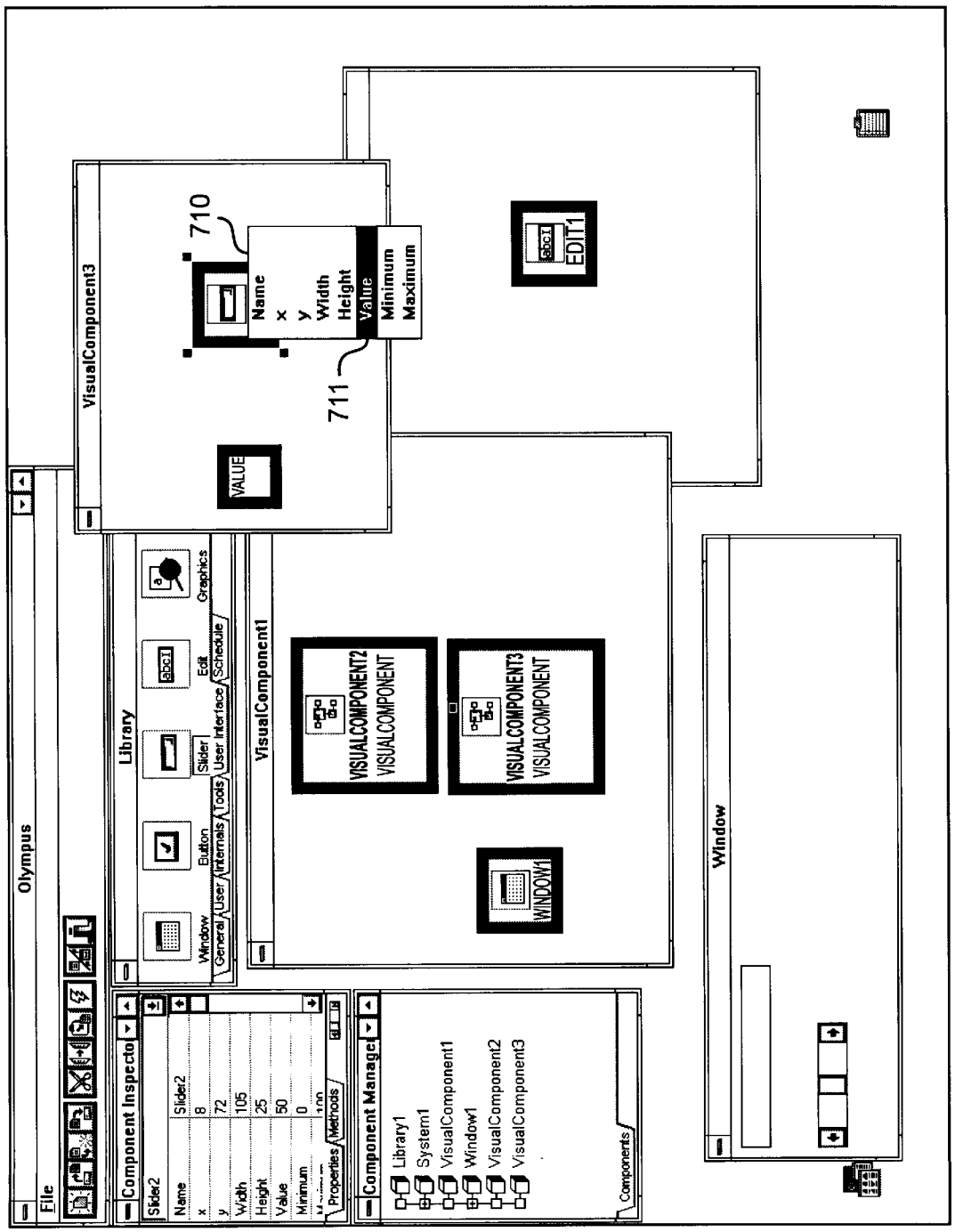

FIG. 7A illustrates the task of connecting the "Value" property (shown at 654) to Slider2 (shown at 651). The user selects the "Value" property with a mouse cursor, for example from point 701, and drags the cursor towards the Slider2, for example to point 703. The system responds by displaying a line 705 as feedback to the user for indicating this action. Upon completion of the drag operation by the user (e.g., when the user releases a depressed mouse button), the system displays a local pop-up menu 710, shown in FIG. 7B. The menu 710 presents a list of properties for the component which the user may establish connections.

Figure 7C:
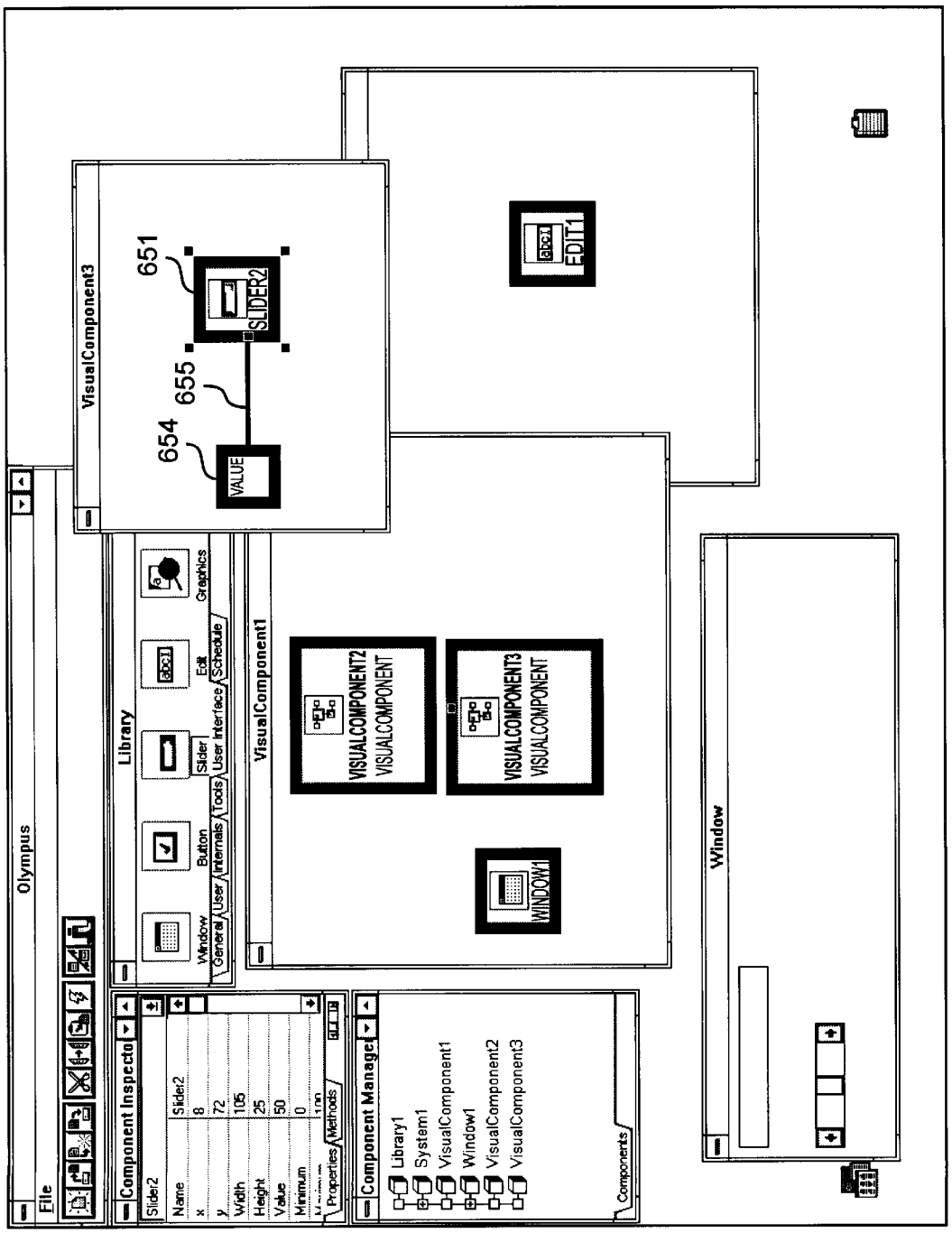
Figure 7D:
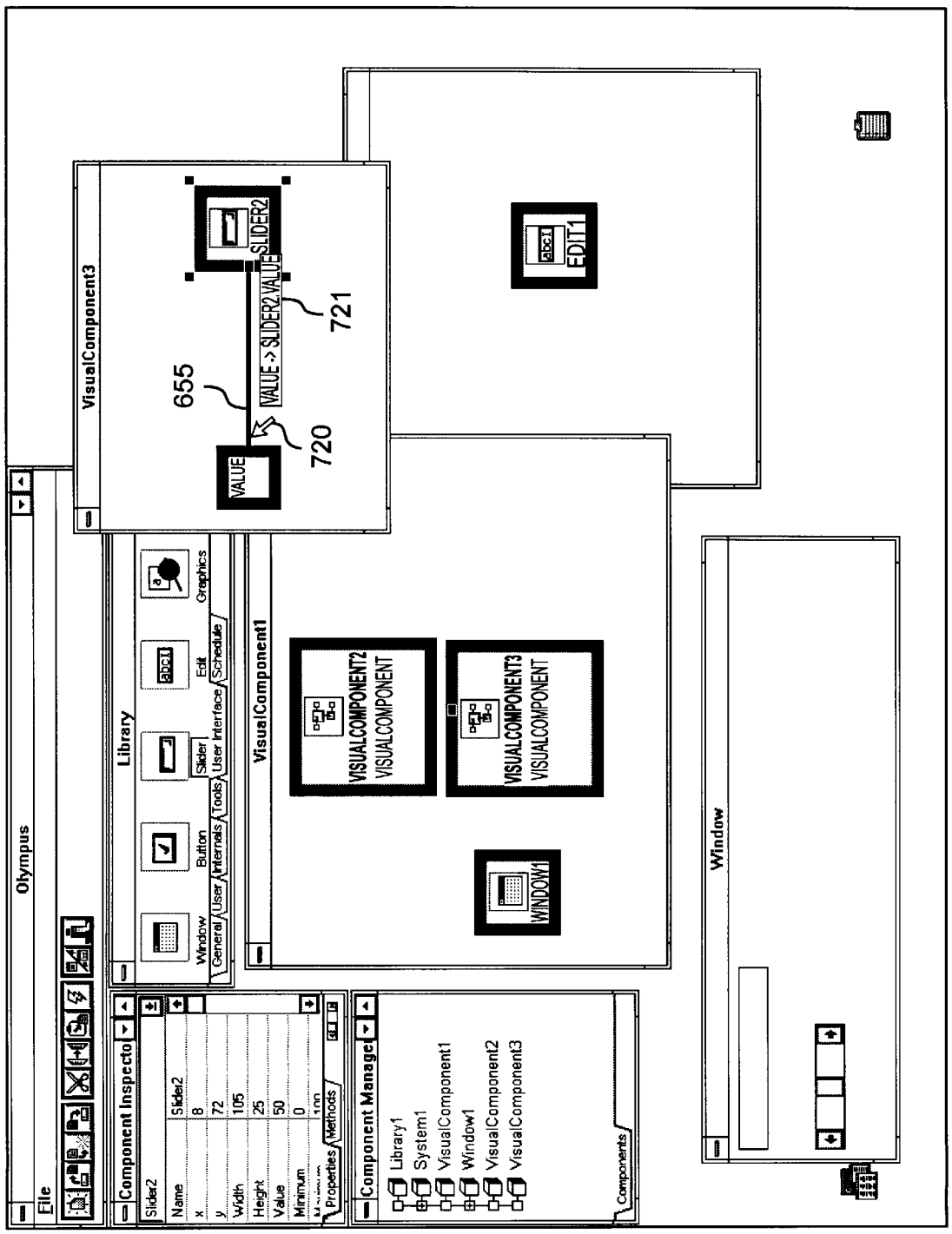
FIGS. 7D–E are bitmap screen shots illustrating connection of a "Value" property of a component to a port of a sub-component.
Figure 7E:
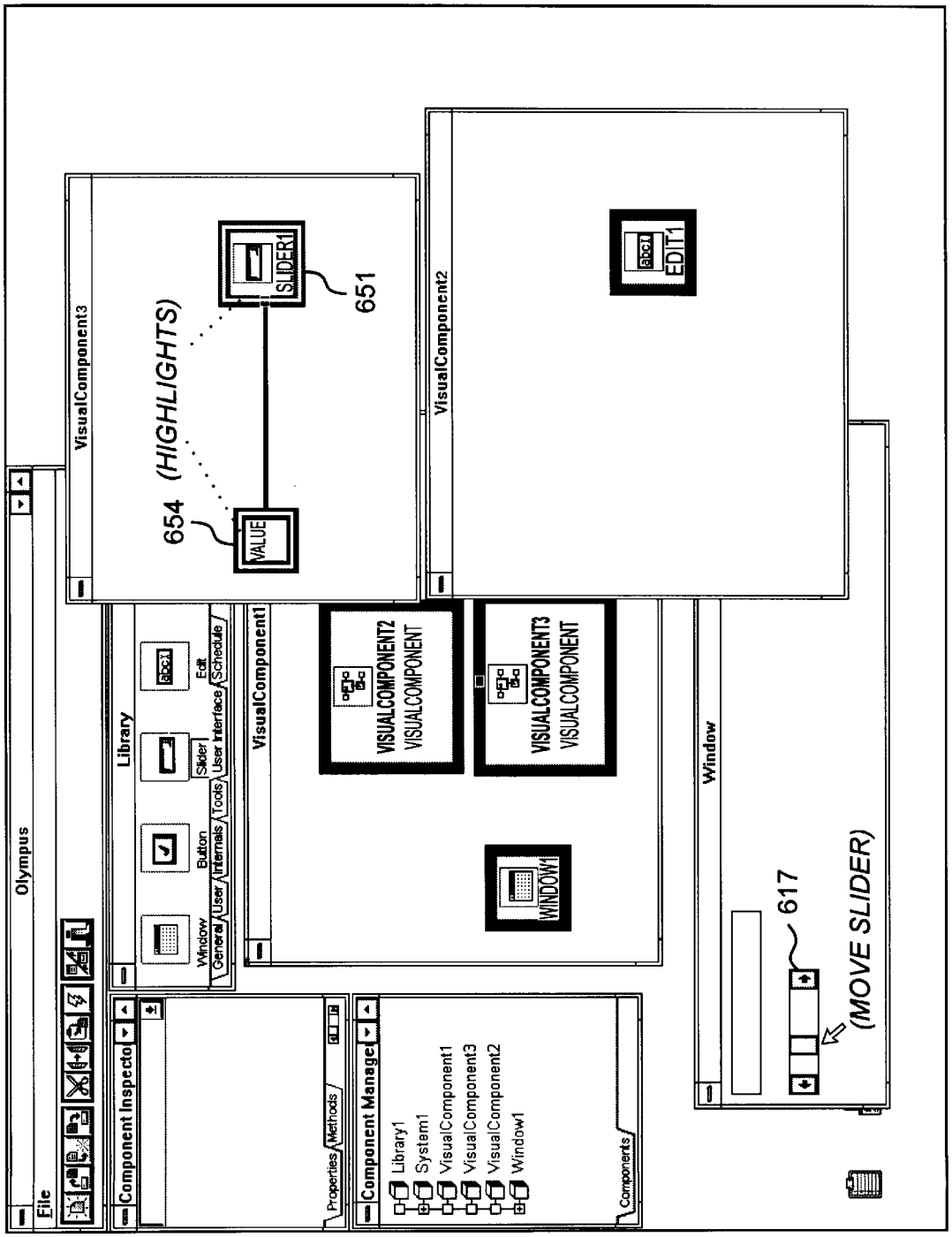

Upon the user selecting one of the properties (e.g., "Value" 711), the system completes the connection. FIG. 7C illustrates the completed connection. The property in VisualComponent3 called "Value" (i.e., Value 654) is bound to the property of the Slider2 651, called "Value." This linkage is indicated to the user via connection line 655. As shown in FIG. 7D, the user can position the mouse cursor (e.g., cursor 720) over the linkage line 655 to see hint 721, which indicates the nature of the linkage (i.e., Value→Slider2.Value). Now, when the user moves the Scroll bar 617, Value 654 and Slider1 651 "light up" as feedback, as shown in FIG. 7E. This feedback indicates to the user that a correspondence exists between a user interface object (e.g., Scroll bar 617) and corresponding visual components and their properties (e.g., Slider1 651 and Value 654).

Figure 8A:
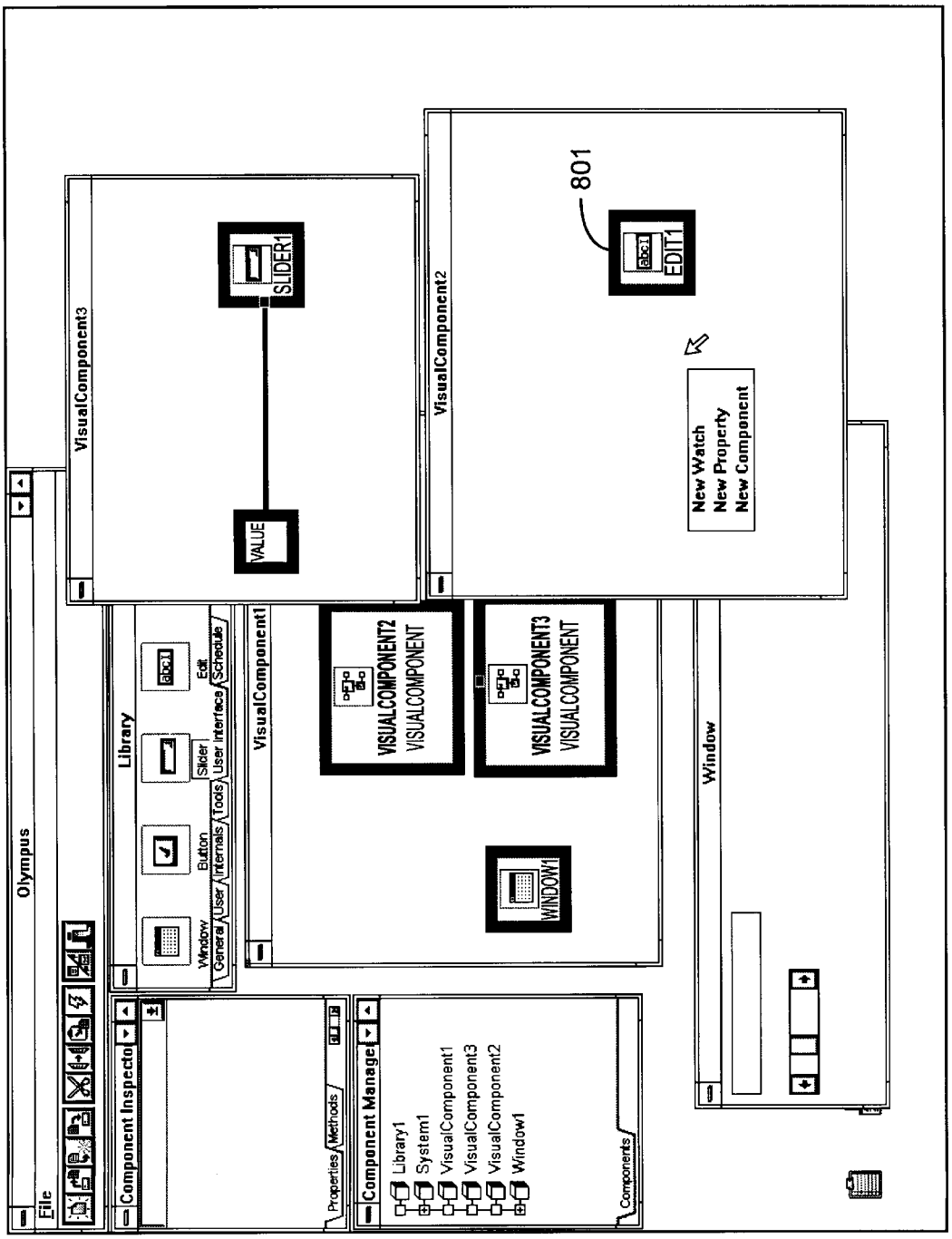
FIGS. 8A–F are bitmap screen shots which illustrate the addition of yet another sub-component to the component being greated (for the example of FIGS. 7A–E).
Figure 8B:
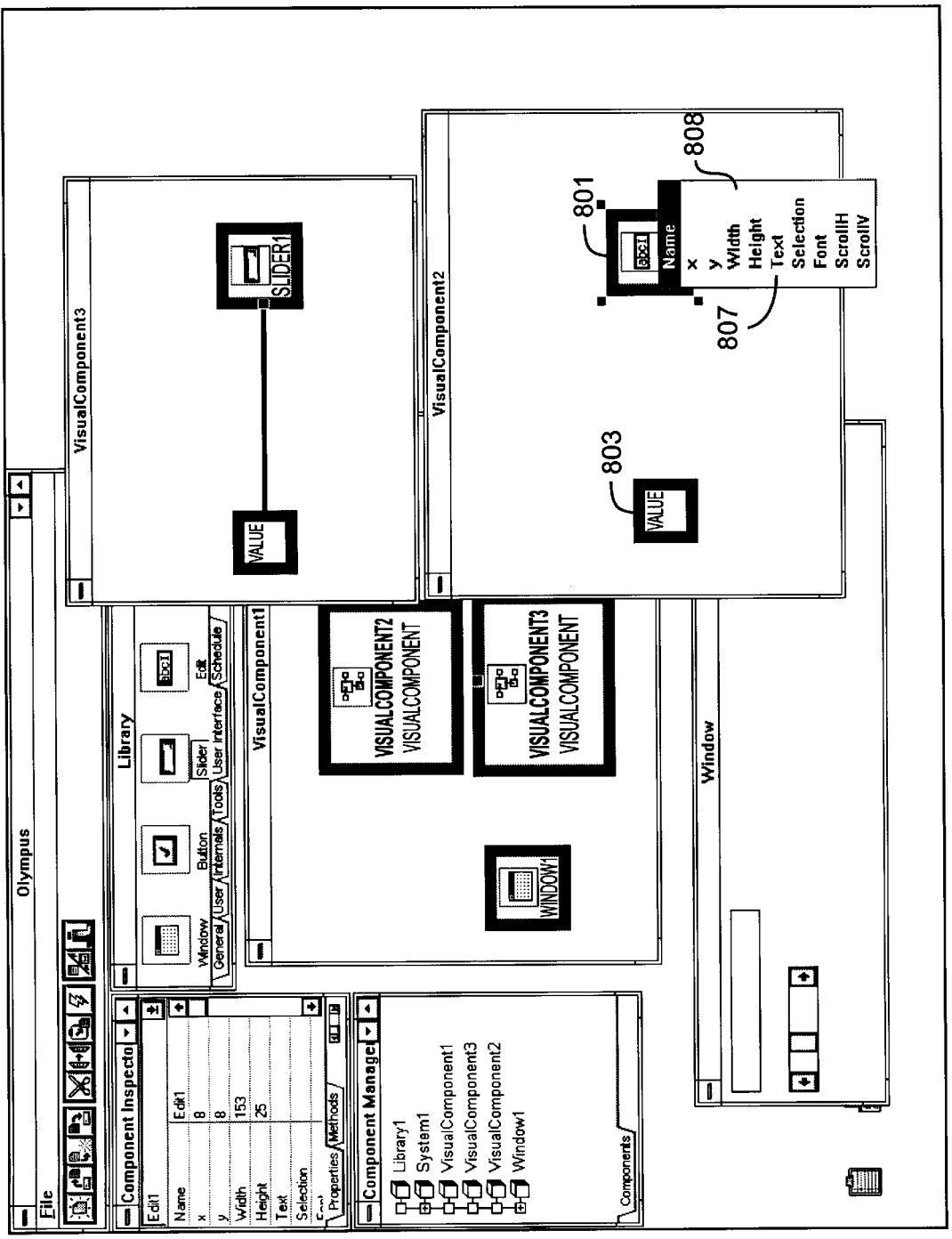
Figure 8C:
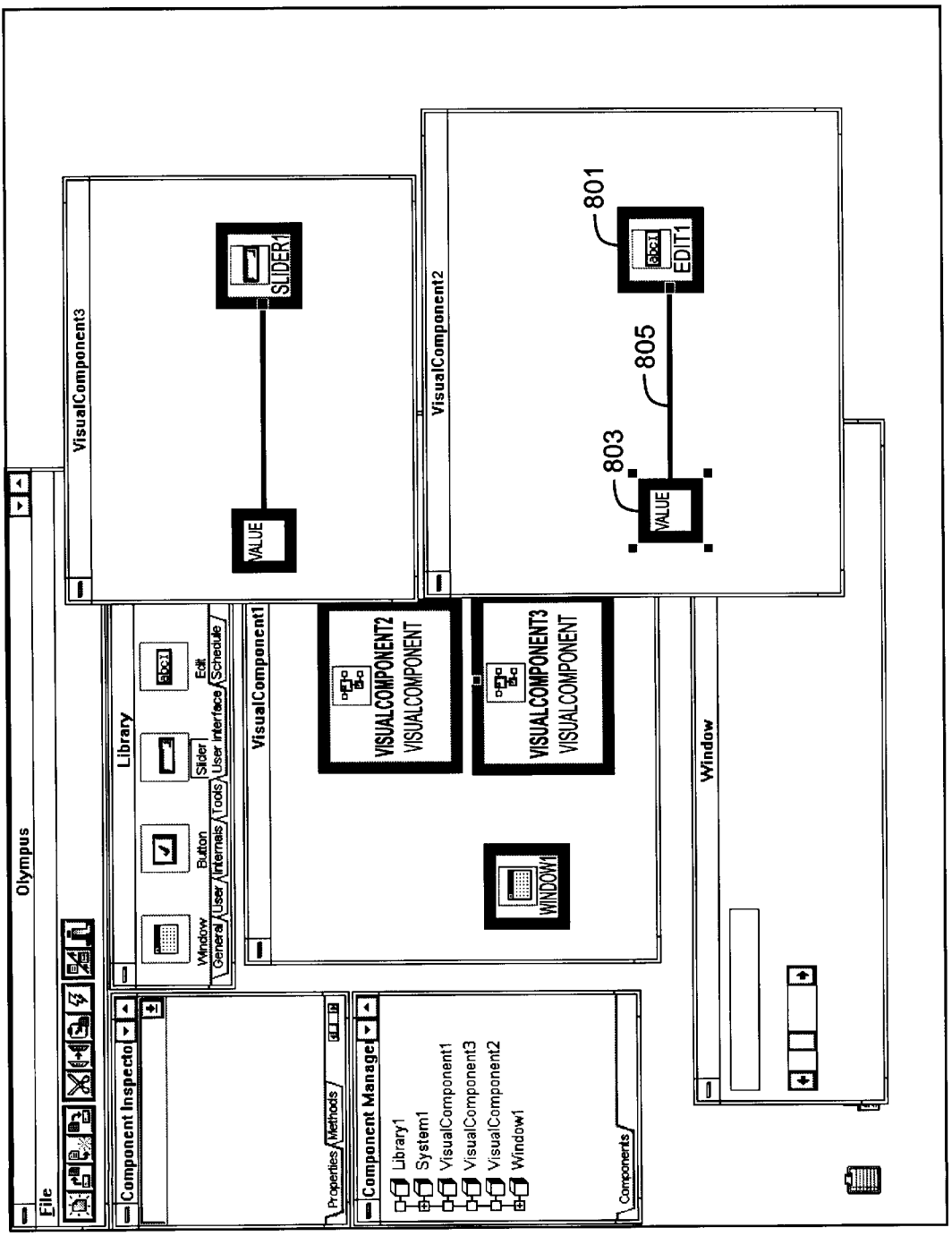

FIG. 8A continues the current example by setting a property of Edit1, shown at 801 in FIG. 8A. In a manner similar to that described for Slider1, a new property (again, "Value") is added to Edit1 801. As shown in the transition from FIG. 8A to FIG. 8C, Value 803 is created and then connected to Edit1 801 via linkage 805. For this example, it is desired that the Value go into the Edit box. Thus, "Text" menu selection 807, shown in FIG. 8B, is selected from pop-up menu 808. At this point in the example, as shown at FIG. 8C, a connection has been made from the Value property 803 into the Edit box, Edit1 801.

Figure 8D:
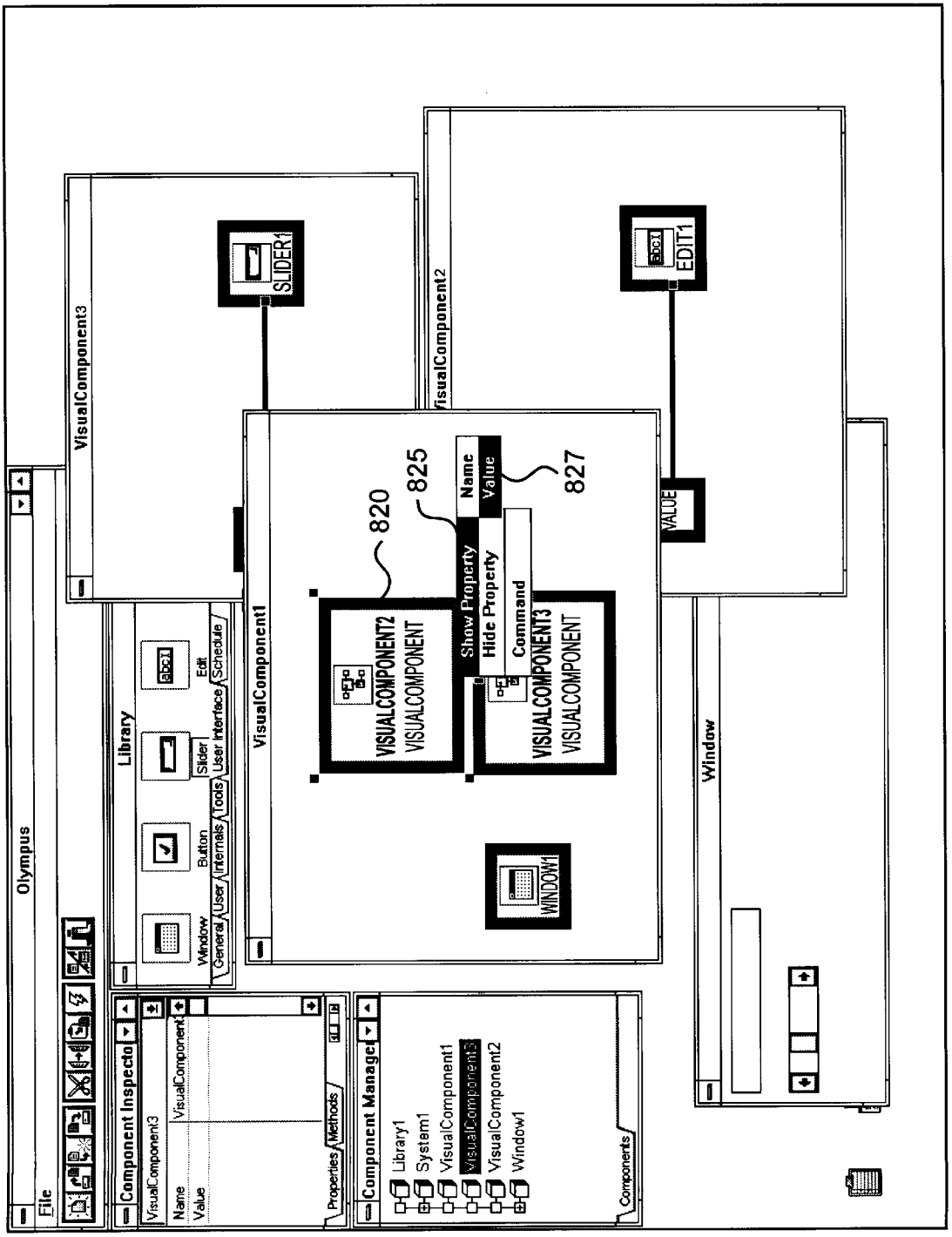
Figure 8E:
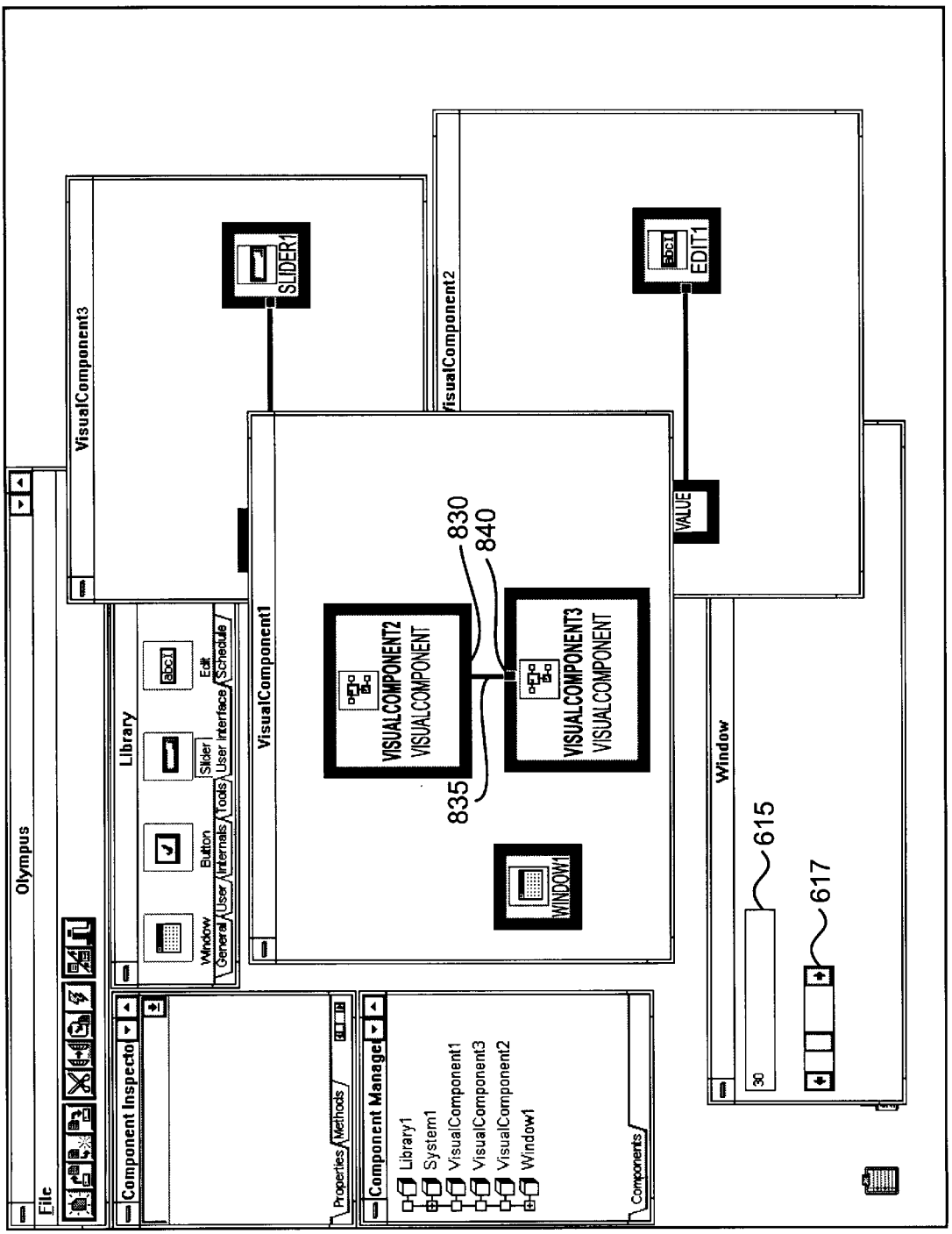

As before, the property is "surfaced" on the visual component. The property is exposed by inspecting the component, shown at 820 in FIG. 8D, to gain access to its local property menu, shown at 825. "Value" 827 is selected by the user, whereupon that property appears on the surface of the visual component, for access by other components. All that remains at this point is to simply connect up the two components. As shown in FIG. 8E, this can be done simply by dragging (with a mouse pointer) from one component (e.g., at point 830) to the other component (e.g., at point 840). In response to this user action, the system makes the connection between the two components and displays a connection linkage 835. Since the system is at all times "live," the Edit Field 615 immediately assumes the current Value of the Scroll bar 617 (i.e., the numeric Value of 30). Moreover, whenever the user moves the Slider on the Scroll bar 617 the above-described connection linkages "light up" for indicating their participation in the process. Each change of Value of the Slider is immediately propagated to the Edit box.

Figure 8F:
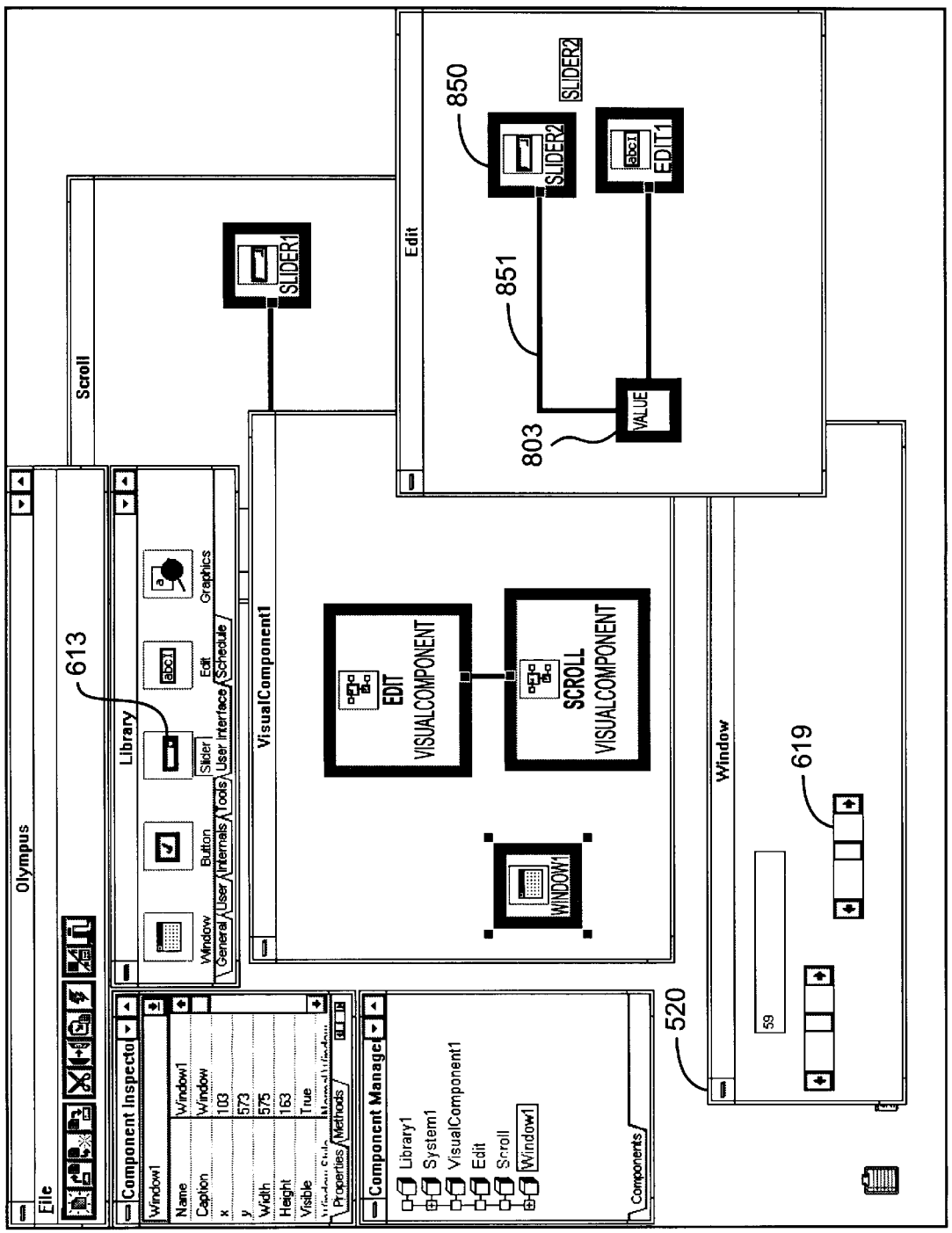

With the basic program logic in place, the user may now refine the model by renaming the components to user-supplied names. VisualComponent2, for instance, may be renamed to "Edit"; likewise, the other visual component may be renamed to "Scroll", as shown in FIG. 8F. Other visual components may be added by the user using "drag-and-drop" technique. For instance, the user may again select Slider 613 from the Library, for placing a new visual component, Slider2 850, as shown. In a manner similar to that previously described, the Slider2 visual component 850 can be connected to the Value property 803, via a new connection linkage 851. As the system is live, the corresponding user interface component, Scroll bar 619, appears in window 520 and assumes whatever Value is expressed by Value 803.

The whole functionality of the Edit box and the two Scroll bars is contained within a single visual component, VisualComponent1. Now, the component may be reused in other applications, as desired. The actual complexity of the internal workings of the component remains hidden within the confines of VisualComponent1, unless the user chooses to surface these complexities. In typical system use, sub-components will be constructed by programmers and placed in various libraries. Then users, of varying degrees of ability, will take the prefabricated components and connect them up, for creating a fully-functional application. For instance, a programmer could create a component for accessing a SQL database, joining two tables of the database, and then presenting the results to the user at the port of the component. The user, for his or her part, need not have any understanding of the internal workings of the component. Instead, the user interacts with the component through properties which have been surfaced.

The system allows multiple viewers to be opened on each component, with the system maintaining synchronization between the component and the various views. This is helpful in a multi-client environment, so that the program may be simultaneously edited from various machines. At all times, the end result of the work in progress appears on the screen of all clients.

Figure 9A:
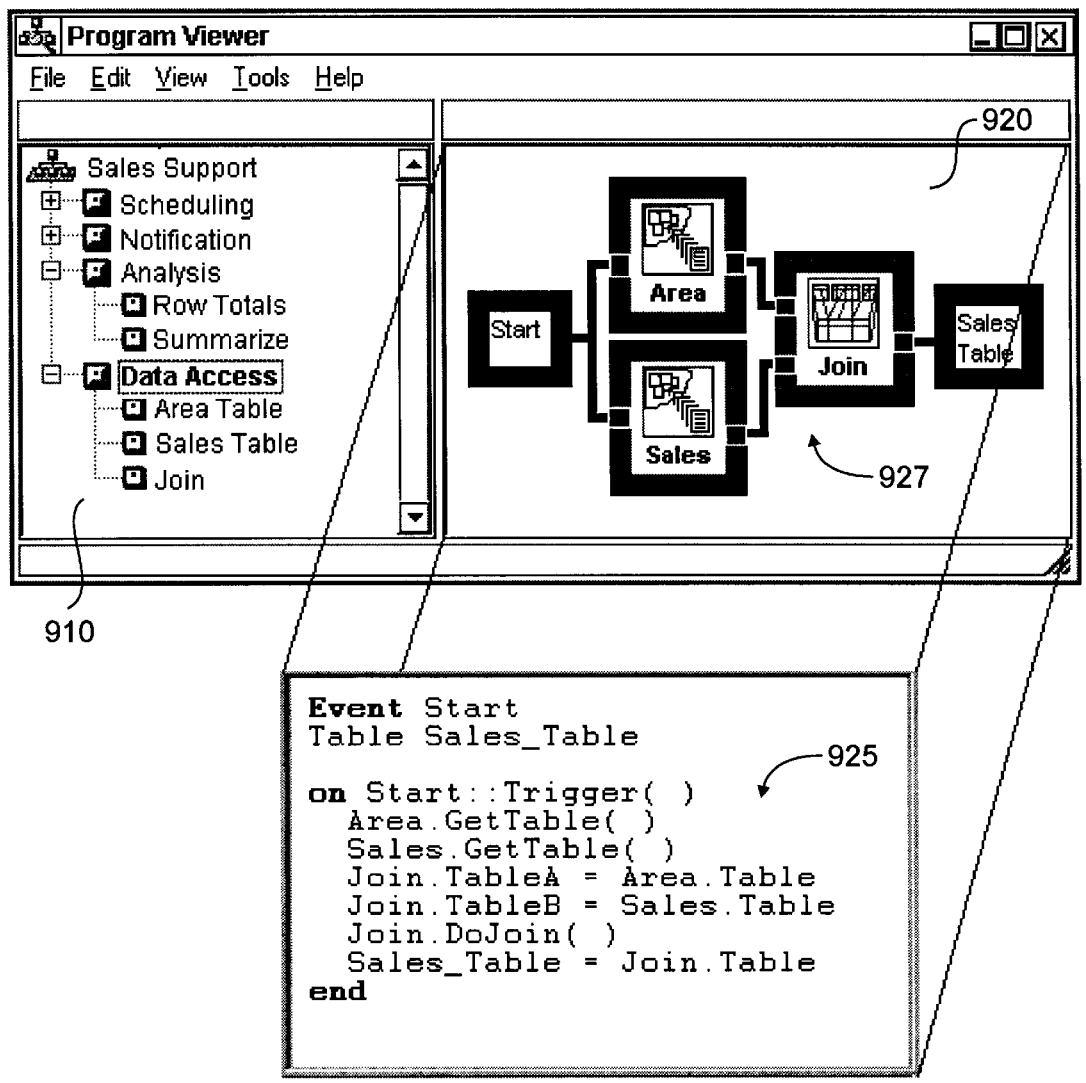
FIG. 9A is a bitmap screen shot illustrating a Program Viewer of the present invention.
Figure 9B:
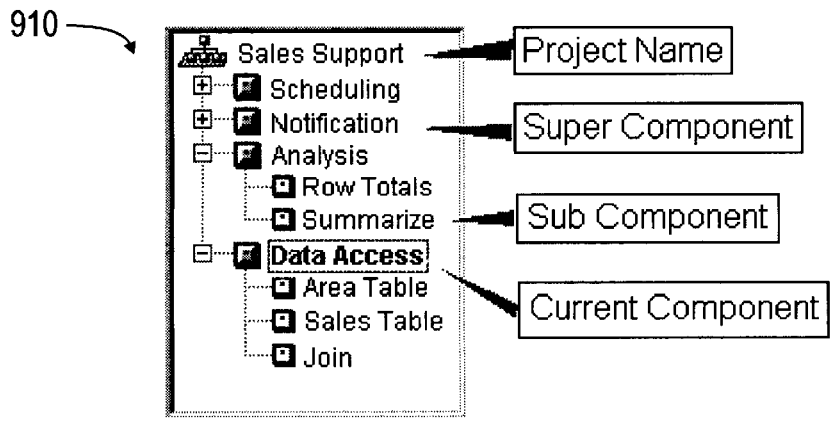
FIG. 9B is a bitmap screen shot showing a detailed view of a first region, the "structure pane," from the Program Viewer of FIG. 9A.

Referring now to FIGS. 9A–B, a Program Viewer of the present invention will be described. Super components are the system's controllers. They support program viewers, such as the program viewer 900 shown in FIG. 9A, as the main viewers of the system. The Program Viewer 900 provides facilities for editing programs, either in script or graphical (visual) programming format. The Viewer 900 has two principal regions: a structure pane 910 and a programming pane 920. All program viewers share the structure pane, which provides a representation of the structure of the project being edited. The programming pane, on the other hand, contains the program itself, either in script (shown at 925) or visual programming (shown at 927) representation.

FIG. 9B shows the structure pane in further detail. As illustrated, the pane lists a project name and one or more super components. Each super component, in turn, may include one or more sub-components. This relationship between a super component and its sub-components is represented visually, using outline format. Finally, the current component (i.e., the one currently selected by the user) is highlighted. In this manner, the structure pane permits the user to always see "where in the program" he or she is. Thus, the user can easily "drill-down" into the level of detail desired for the task at hand.

Internal operation
A. Class "Interfaces"

In a preferred embodiment, "interfaces" are employed between objects of different classes. Interfaces are a way of talking to an object of a class, but without having to include the entire class definition for that object. To understand this approach, it is instructive to first review conventional methodology for interclass object communication. Using conventional methodology, one object (caller) can talk to objects of another class (callees) by "including" the (entire) class definition for the latter in the source file of the former. A pointer of type class is declared in the source of the former (which at runtime will point to a particular object instance). The class pointer may be used to access various public data members and methods of the class.

The foregoing approach is entirely unsatisfactory, however, when dealing with classes of even modest complexity. Using the foregoing approach, for example, to call up just a single method in a large class, one would have to "include" the entire class definition for that class (despite the fact that only a single method is desired to be accessed). Worse yet, by "including" the header information for that class, other modules (which that class is dependent upon) may be "included" as well, and so forth and so on. Moreover, a small change to that class may propagate to several different modules, as each of those modules may need to adjust its v-table (virtual table) pointers, accordingly, as specified by the new class definition.

Class "interfaces" solve this problem by breaking out a portion of the class definition as a separate class "interface." The interface broken out is one chosen such that it rarely, if ever, changes. Typically, an interface will comprise a small subset of the method for a class (which itself may be a very huge class). Several modules may standardize on the interface, regardless of changes to the under1 ying class definition. Objects of other classes can inherit the interface and access the desired data members and methods, all without worrying about changes to the class definition of the underlying (i.e., non-interface) class. This simplifies the task of providing, for instance, a standard interface for changing font, parenting a window, or the like.

The underlying (target) class itself inherits the class interface to get that information into the class. The interface class defines the methods as pure virtual functions (i.e., not-yet implemented functions); the underlying class will, in turn, provide functionality for the interface methods (i.e., will override the functions, for implementing functionality).

The foregoing class interface approach may be employed for object "negotiation." An object in the system can, in effect, ask any other object in the system, "Do you have this interface?" In other words, presented with an arbitrary object, program code in the system can ask the object whether it can perform certain functionality, such as saving itself. If the object responds in the affirmative, it will return the interface, whereupon the methods defined by the interface may be called.

This negotiation scheme may also be used for determining what kind of object an object is. Presented with an unknown object, the system may query the object for determining its capabilities. To determine whether an object can be presented in a window, for instance, the system could query the object for its IWindow interface. If the object responds with an appropriate IWindow interface, corresponding methods may be called for presenting the object in a window.

B. Exemplary component construction

The internal operation of the system is perhaps best described by examining construction and operation of a particular component, such as the Edit component demonstrated above (at the user interface of the system). The following will decompose the Edit component—working backwards through the underlying class hierarchy.

All components contain a core data structure, Symbols, which lists the methods and properties on the component. Recall from the demonstration of instantiating an Edit control at the level of the user interface, the user could property inspect the control for obtaining a list of properties (e.g., Name, X location, Y location, and the like) associated with that particular control. Symbols is a means for telling the system that those properties exist.

The Edit control is an object instantiated from an Edit class, illustrated in FIGS. 10A–B (using the C++ programming language). As shown, Edit is a class which is derived from two other classes, HelperAuto and IControlServer. The HelperAuto class actually implements the interface that this component provides for doing automation work.

The automation that is being provided presents the properties shown in the above-described Symbols structure. In other words, it is responsible for presenting these properties to the outside world (through the automation interface). The automation interface (IAuto) is a class interface, such as those previously described. IAuto provides an interface so that the system may query what Type of properties an object has.

In a preferred embodiment, the IAuto class is constructed as shown in FIG. 11. As shown, the IAuto class 1100, having only pure virtual methods defined, is an exemplary interface class. As is known in the art, "pure virtual" functions, which are easily recognized by the "virtual" keyword and "=0", do not implement functionality for the defined methods. Instead, a child or derived class (i.e., one which inherits from the IAuto class) will need to override these "pure virtual" definitions for providing specific functionality (i.e., steps) for the methods.

HelperAuto actually implements the interface of IAuto—that is, HelperAuto is derived from IAuto and provides appropriate implementation for the pure virtual functions of the IAuto class. For instance, IAuto's first interface method, called Lookup, provides a structure for a passed-in string. For a passed-in Name, for example, Lookup will return a structure which will contain an ID. If the Name is to be changed, the system would invoke the Dispatch interface method (the fifth method), passing the ID and a new Value (to which Name is to be set). Therefore, for an Edit component, when the Lookup interface method is invoked, HelperAuto will traverse the Symbols table until it finds "Name." Upon locating the symbol (i.e., "Name"), HelperAuto retrieves the corresponding Type and ID from the Symbols table and presents them to the outside world. Similarly, when the Scan interface method (the fourth method) is invoked, HelperAuto will traverse the Symbols table for enumerating all of the properties of the component available through the interface. For an Edit control, for instance, this would return Name, X, Y, Height, Width, and the like.

The interface methods of IAuto, when implemented by a derived class, will provide the following functionality. The Lookup method returns a Symbol (Sym) structure for a given Name and Locale. The Symbol structure contains an ID which may be employed as a handle to that property. Thus, the method relates a Name to an ID. The LookupID method does essentially the reverse. It takes an ID and returns a Name and Locale. The Count method returns a count of how many properties exists for a given Symbol Type (e.g., properties, methods, or the like)—that is, how many are there. This assists with "scanning" for a method, so that appropriate memory may be allocated for the structure returned by a Scan. Collectively, these methods are the "browsing" methods of the interface.

The next set of methods are the invocation methods. The browsing methods allow the interface caller to know the symbol and its properties. Once this relationship is known, the interface caller uses the invocation methods for effecting operations on the properties. The Dispatch method, the first of the invocation methods, will be explained by way of example. Suppose, for instance, that the Edit component had a "Copy" method. From invoking the Lookup method, the interface caller knows the parameters that Copy expects (as this information is passed back by Lookup via the returned Symbol structure). Accordingly, it can be invoked by calling Dispatch and passing the ID (returned by Lookup) and any expected parameters (the description of which was returned by Lookup). Dispatch will then proceed to invoke the Copy method. The remaining invocation functions, PropertyRead and PropertyWrite, are employed for reading and writing properties. Two versions of each are supplied: one accepting a Symbol structure, the other accepting an ID.

Returning to the Edit class of FIGS. 10A–B, the class definition includes a constructor and destructor 1010, in a conventional manner. Following these are IControlServer methods 1020. The IControlServer class itself may be constructed as shown in FIG. 12. In a manner similar to the other interface classes, IControlServer 1200 comprises a collection of pure virtual functions. The Edit class will implement these methods directly (as opposed to the IAuto methods which were implemented indirectly, via HelperAuto).

As shown in the Edit class, the HelperAuto method GetSymbols 1025 is implemented; it simply returns the above-described Symbols, which is literally a pointer to an array of type Symbol. Recall from the discussion above that HelperAuto needs to ask a class what its Symbols are. Accordingly, the Edit class includes a definition of its Symbols and the method GetSymbols for returning a pointer to those Symbols. All of HelperAuto'sis performed based on those Symbols.

The Edit class implements the IControlServer methods 1020: ClientSet, ParentWindow, CreatedSet, VisibleSet, DesigningSet, DimensionSet, DimensionGet, and StateGet. These methods provide functionality typically associated with a screen control such as an Edit field. Their names describe their functionality. For instance, DimensionSet sets the dimensions for an Edit control, based on passed-in Values for starting Location (x, y), Width (dx) and Height (dy). Similarly, VisibleSet specifies whether the control is currently visible in the user interface (at runtime). This is the interface through which the parent window (i.e., container) interacts with the control, for example, creating it, turning its visibility on or off, sets its dimensions, or the like. When the user re-sizes the Edit control during design, the parent window in turn makes one or more DimensionSet calls.

For the Edit class, a particular array of Symbols (i.e., Symbols) may be created as illustrated in FIG. 13. As shown, Symbols 1300 includes an Interface C++ template 1310 which describes and names the interfaces which this class has (i.e., "IAuto" and "IControlServer"). Recall that in an interface implementation, a negotiation process entails asking an object, "Do you have so and so?" The HelperAuto class implements an InterfaceGet method. The Symbols data structure, on the other hand, includes the Interface templates 1310 which set forth the interfaces supported by this component (i.e., an object of class Edit). The Interface templates allow HelperAuto to do InterfaceGet negotiations. So when an object of another class asks the Edit control, "Do you support IControlServer," the HelperAuto class can respond in the affirmative and casts the class into the IControlServer class.

Following the Interface templates is a ClassSignature C++ template 1320. It takes (like the other templates) the class definition (i.e., "Edit"). This is the class name, not the instance Name. So even though a particular instance may be named Edit1, Edit2, Edit3, or the like, the class name will still remain "Edit".

The next set of templates, PropertyReflex 1330, are all properties of the object. All of these have the same characteristics. In the template parameter, they first name the class of the object that is being referred to (i.e., "Edit"). They also name the Type of the object as well. The "Name" property, for instance, is a string (i.e., pointer to Type character). As shown by the constructor portion of the template, the Name of the property is passed-in (e.g., "Name" for this first property). Other Edit control properties include, for example, x, y, Width, Height, Text, Selection, Font, and the like.

The next parameter to the template is a list of the methods passed-in which would allow one to Get and Set that property. Thus for the "Name" property, methods passed-in include NameGet and NameSet. In IAuto, for example, when an object obtains the IAuto interface for the Edit control and dispatches (i.e., calls the Dispatch method) on the ID that corresponds to the property of Name for writing that property, the NameGet method gets called. Similarly, the Get and Set methods for the other properties are specified as shown. As also shown, each property nominates a method to call, EventRaise, when its property is set (by an external caller).

Each PropertyReflex template 1330 nominates a method to be called—EventRaise—in the case of another object (or process) externally setting the respective property. Consider, for example, a property inspector listing properties for an Edit control. If a property of the control, such as Name or Location, changes, the property inspector needs to receive notification of this change so that it may update itself accordingly.

EventRaise is a mechanism by which this may be dealt with automatically. In particular, HelperAuto includes methods for notifying anything (e.g., object, process, or the like) interested in the property of a change. Recall from the illustration of the user interface above, when a property, such as Name, changes, that change is propagated to all interested parties; this is because an event is being "raised" to anything that was "listening" to the property.

The basic mechanism may be summarized as follows. When a connection is made between two components, a communication link is established which notifies one component of a PropertyChange in another component (via EventRaise). Further, the mechanism allows the first or subscribing component (i.e., the one listening for a change) to retrieve the current Value for the newly-changed property.

When a property changes in a component that change may trigger other properties to change in that component as well. For instance, when Text changes in an Edit control (i.e., the Text property is set to a new Value), the "Selection" will change (i.e., the Selection property of the Edit control will change). In such an instance, not only has the Text property changed but, as a side effect, the Selection property has also changed.

In a preferred embodiment, it is desirable that not only subscribers to the Text property be notified of a change, but also subscribers of the Selection property should be notified as well. A PropertyChange method is provided for carrying out this notification. The PropertyChange method is employed for notifying subscribers of a property that that property has changed as a side effect of a change in another property. Therefore, the PropertyChange method generates the same effect as EventRaise method, except that the PropertyChange method operates as a result of internal changes to properties (i.e., side effects), as opposed to externally mandated changes.

With an understanding of the base classes, the reader may now return to further study of the Edit class of FIGS. 10A–B. As shown, the constructor for the Edit class sets up the default Values for properties of the Edit control, such as Location, Size, Font, and the like. Also shown, the Edit constructor is passed a pointer of Type IObject. IObject is a class interface which allows any object to query another object as to whether it supports a particular interface. Thus in an exemplary embodiment, every object has at least an IObject interface. IObject includes a method, GetInterface, which numerates whether a particular interface is supported (by the object being queried).

IObject 1400, whose class definition is shown in FIG. 14, provides an interface for the system and allows the Edit control to determine system services supported. When an event is raised, for instance, the Edit control, using IObject for the system, can ask the system to return IEvent—the interface for the event (for that system). This interface can be considered the "main" interface, as it is one which every object in the system is guaranteed to have. Working from this interface, objects may enumerate other interfaces which they support.

As shown, InterfaceGet 1401 is passed a pointer to an interface and an ID for an interface to get. The function, in turn, sets the pointer based on the ID. In the instance of the pointer being successfully set, the querying object may use the pointer to invoke methods of the object, all without having to inherit from that object (but instead just inheriting a simple interface to that object).

With interfaces, a mechanism is needed to ensure that an object is not deleted while one or more interface pointers to that object are outstanding (i.e., still active). Thus, a Ref-Count method 1405 is provided for maintaining a reference count to the object whose interface has been sought. Only when the reference count for the object reaches zero is permission given for deleting the object from memory.

Implementation of the Edit class constructor 1500 is illustrated in FIG. 15. As shown, a system pointer of type IObject is being passed to the constructor. The Edit class destructor's implementation is illustrated in FIG. 16. As shown, the destructor 1600 destroys the window for the Edit class if a valid window handle exists. For a Microsoft Windows implementation, for instance, this step would result in DestroyWindow Windows API call being invoked for destroying the Edit control (which is a type of window). Also shown, the destructor decrements the reference count for a font object, and it frees up any memory which may have been allocated for horizontal or vertical Scroll bars.

Edit class' implementation of the IControlServer methods 1700 is illustrated in FIGS. 17A–B. ClientSet 1701 sets the Instance and Parent—standard Windows housekeeping data structures. Also, the control ID is set to that of the ID passed in.

Actual creation of the Edit control (i.e., Edit window) is carried out by a CreatedSet method 1705. As shown, the method simply calls WindowCreate, in the event that the Edit window has not already been created. The WindowCreate method, in turn, implements window creation for the platform; in a Microsoft Windows embodiment, for instance, the method would call Windows CreateWindow API function. Similarly, VisibleSet 1710 is a method for setting the private data member Visible. When this data member is set to True, the Edit control window is visible on screen. In a like manner, a DesigningSet method 1715 simply sets the Designing protected data member to the passed-in boolean.

DimensionsSet 1720, DimensionsGet 1725, and StateGet 1730 are methods for carrying out activities suggested by their names. For instance, DimensionsSet sets new dimensions for an Edit control. As shown, this actually carries out the functionality of redrawing the Edit control (by calling InvalidateRect, UpdateWindow, and MoveWindow Windows API calls). Moreover, the method calls the PropertyChange method (described above) for notifying others that the x, y, dx (Width), and dy (Height) properties for the object have been changed. DimensionsGet, on the other hand, gets the dimensions for the control; that is, it will return (via pointers) Values for the x, y, dx, and dy protected data members. StateGet, functioning in a similar manner, also returns (via pointers) Values for the Created, Visible, and Designing data members.

With reference to FIG. 18, implementation of Event Notification methods 1800 for the Edit class will be described. PropertyChange 1801, previously mentioned, takes a variable argument list of properties. As shown, the Name of each property is looked up (i.e., called the Lookup method) for returning the symbol (from the Symbols table).

The symbol, in turn, is passed to the EventRaise method 1802, for raising the event for this property as well (which has changed as a result of a side effect). As shown, the method simply takes an ID. The method then simply asks the system for its event manager interface (IOlympusEventManager). If the EventRaise method succeeds in getting the event manager interface for this ID, then the method proceeds to call the EventFire method for the ID, through the manager interface.

With reference to FIGS. 19A–E, the remaining methods 1900 for the Edit class implement windowing support, in a conventional manner. For instance, EditWndProc 1910 is a windows procedure which provides message processing for the Edit control. Similarly, the other methods, such as WindowCreate 1920, WindowDestroy 1930, and the like, implement the functionality described by their names, using conventional Windows API function calls.

C. SuperComponent

A "super component" (SuperComponent) is a component that is a container—that is, it contains other components. Accordingly, it requires functionality for handling its containees. The SuperComponent class may be defined as illustrated in FIGS. 20A–B. As shown, the Supercomponent class 2000 inherits from several previously-described classes, such as IAuto, IObject, and IOlympusClient. Moreover, SuperComponent inherits from ISuperComponent, which implements functionality for containing other components (e.g., ownership, editing, containment, navigation, and the like). It also inherits from ISuperComponentOwner because it is a container which can contain other SuperComponents. Still further, it inherits from IOlympusEventSink, since it can receive events (i.e., serve as an EventSink) from the system. SuperComponent may be thought of as the program decomposition building block. Although SuperComponents are further specialized (e.g., C++, Script, Visual Programming, or the like), they all share SuperComponent functionality, such as a structure pane (shown in the ComponentInspector).

Interfaces for the SuperComponent are implemented by ISuperComponent, ISuperComponentOwner, and IOlympusEventSink. ISuperComponent 2100 itself may be implemented as illustrated in FIG. 21. As shown, ownership methods include OwnerSet 2101 and Reparented 2105. The Ownerset method, which is a public method, allows a nested component to establish an ownership relationship with its SuperComponent, by passing in a pointer of type ISuperComponentOwner class. In this manner, a given component is told who its owner is. Recall the illustration in the user interface of double-clicking on a component. That action created the component and passed its IObject interface into the SuperComponent. In the case of the Edit control, for instance, the SuperComponent is the visual container for the control; double-clicking on the Edit control component causes the IObject interface for that control to be passed to the visual container.

Recall further, as demonstrated in the user interface, that a newly created super component, at the outset, does not surface its implementation. Instead, the component must first be "opened." Accordingly, ISuperComponent includes an Open method and a Close method, for opening and closing the component respectively.

ISuperComponentOwner 2200, shown in FIG. 22, is an interface that a SuperComponent gives to its children (containees). The ISuperComponentOwner interface allows a containee to communicate with its container. SuperComponentCheck method 2201 allows the component to determine whether its SuperComponent is the topmost SuperComponent or, instead, contained by yet another SuperComponent. ActiveSuperComponent 2205 is a method whereby a component can tell its container that it got focus from the operating system.

Next, the class includes methods for sub-component changes. These are methods which allow a component to communicate a property change to its container. ComponentPropertyAdd method 2210 is employed to notify the container that the component has added a property. Likewise, ComponentPropertyDelete 2215 is a method used to notify the container that a component has deleted a property. Finally, ComponentPropertyNameUpdate 2220 is a method for notifying the container of a change in Name of a property for a component.

The remaining methods of ISuperComponentOwner are directed to containment. ContainerAdd 2230 and ContainerDelete 2235 are methods for adding and deleting a container, respectively. Similarly, ContaineeAdd 2240 and ContaineeDelete 2245 support the addition and deletion of containees to the container.

Working through the methods of the SuperComponent class 2000, the SuperComponent constructor 2001 is invoked with a pointer to an interface object (IObject) for the system, in a manner similar to that previously described. Next, the SuperComponent implements functionality for IObject methods, InterfaceGet 2010 and RefCount 2015, which have been previously described.

The class next implements methods 2020 which were inherited from IAuto, which have been previously described. It does not suffice at this point to merely rely on HelperAuto to implement these methods, since a fixed symbol table does not exist for SuperComponent objects. In particular, the actual properties that are visible on a SuperComponent are defined in a program at runtime. Therefore, there is no way to determine in advance what particular properties will be visible.

Next, SuperComponent implements the sole method for IOlympusEventSink, EventNotify 2030. If an object wants to be notified of occurrence of an event, that object implements EventNotify so that it will be called back upon occurrence of the event. The event manager—the module that actually raises the event—need not inherit any part of the SuperComponent class; instead, the event manager simply calls IOlympusEventSink.

Finally, the SuperComponent class includes methods implementing ISuperComponent methods 2040 and ISuperComponentOwner methods 2050. These have been previously described.

D. VPSuperComponent

A "visual programming super component," VPSuperComponent, is a component which looks like a normal component to the rest of the system. It has properties and implements standard component interfaces. A user of VPSuperComponent can instantiate it and treat it just like any other component.

Inside the component, however, it contains a dataflow engine, with a list of components and their interconnections. In addition to the data needed to actually perform the functions of the component, it also acts as a repository for the appearance of the visual program (e.g., component locations, viewers, and the like), which it can then distribute to windows which can edit the program. Each window enters into a dialog with the SuperComponent. Each action performed on the program by a visual programming window (VPWindow) is communicated to the SuperComponent, which in turn communicates the information to all other windows and to parent SuperComponents if necessary.

In an exemplary embodiment, a VPSuperComponent class may be defined as illustrated in FIGS. 23A–D. As shown, VPSuperComponent 2300 inherits from SuperComponent, shown at 2301. Thus, VPSuperComponent is a SuperComponent; it inherits all of the methods of SuperComponent. Also shown, the class has a single constructor 2310 which is called with a pointer to the IObject interface for the system (which was previously described). Next, the class implements methods for inherited IObject methods, InterfaceGet 2320 and RefCount 2325 (both which have been previously described). Following this, the class implements methods for the IAuto inherited methods 2330 and IOlympusEventSink inherited method 2340. Functionality of these methods has been previously described.

Next, the VPSuperComponent class implements a ComponentAdd method 2350. This method is passed a pointer to the IObject interface for the component, whereupon it adds the component to the VPSuperComponent. The VPSuperComponent class also implements methods inherited from ISuperComponent at 2360 and ISuperComponentOwner at 2365, which have been previously described.

The on-screen functionality illustrated at the user interface (above) derives from two different components. On the one hand, there is a component for communicating with the user (via the user interface); on the other hand, there is a component that implements the underlying engine. This design was chosen to facilitate multi-user access to a component. In particular, one engine will exist on the system, yet multiple users may be viewing a given component (i.e., a many-to-one relationship between viewers and a component).

IVPWindowClient is an interface inherited by VPSuperComponent; its inherited methods are shown at 2370. It is the interface which allows a viewer to communicate with a component. In essence, this is how the user interface communicates with a component (e.g., communicating resizing of a component, changing its Name, adding a new watch, or the like). Therefore, the IVPWindowClient methods 2370 are methods that the user interface can call to communicate changes to a component.

Since the communication is bi-directional (i.e., from user interface to engine and from engine to user interface), there is a "flip side" to the interface. Suppose that two users, situated at separate workstations, are viewing the same component. When one user changes a property on the component at the user interface, that user's user interface communicates the change through IVPWindowClient to the underlying component. However, the other user needs to be apprised of the change. Therefore, the engine, again through IVPWindowClient, calls out to the user interface of the other user for communicating the newly-changed property. This later call is actually performed through IVPWindowServer, which comprises methods analogous to those shown for IVPWindowClient, but are adapted to handle changes which come about from external sources.

The private section 2380 of the VPSuperComponent class definition includes private data members, such as "Name" 2381 (as each visual programming SuperComponent has a Name), as well as a ComponentID 2382 and ParentWindowH 2383 window handle to a parent window. Moreover, the private section includes a visual programming SuperComponent list, VPSComponentList 2385, which is a list (at the engine level) of all the components currently owned by this container (SuperComponent). The list comprises a list of IObjects. This is followed by a list of properties 2387, which is a list of objects containing the Name of property. These are followed by a list of connections, VPSConnectionList 2388. This lists all the connections set in the system for this SuperComponent. Similarly, there is a list of watches, VPSWatchList 2389. This is a list of watch points set in the system for the SuperComponent. Components, properties, connections, and watches are all items which can appear on the window of a program viewer. Finally, the class includes a WindowList 2390 which is a list of program viewers for that SuperComponent.

E. Connections

Recall that each component, when instantiated, gets an ID. In an exemplary embodiment, connections are maintained by tracking IDs of the "from" component and the "to" component, together with property IDs from the "from" property and the "to" property. Therefore, for the examples shown in the user interface of drawing a connection from VisualComponent2 to VisualComponent3, establishing a connection consists of filling out the appropriate identifiers for these components and their properties.

As shown for the class definition for VPSuperComponent, the system maintains a list of components 2385 owned by a SuperComponent. The VPSComponent class 2400, shown in FIGS. 24A–B, handles the task of tracking a component item contained within a SuperComponent. The constructor for the class, shown at 2401, simply initializes data members for the class, such as Name, ID, Type, and the like.

Methods are defined for handling properties of the component. Recall that each component must notify its SuperComponent if its properties have changed. The property methods are the means by which this communication is effected. For instance, PropertyAdd 2410 is used to add a property to the component, while PropertyDelete 2415 is used to delete a property from a component. In a like manner, a count of properties for a component is handled by PropertyCount 2420; and information about a property is returned by PropertyInfoGet 2425.

This is followed by methods for adding and deleting connections on a particular component, such as ConnectionAdd 2430 and ConnectionDelete 2435, respectively. Moreover, the components themselves maintain a list of connections, that is a VPSConnectionList 2440. Therefore, not only is there a list of connections for the entire super component, the components themselves also maintain a list of connections.

This approach simplifies design as follows. When a component asserts that it is interested in a particular set of events, it passes out its IOlympusEventSink interface. Whenever any of those events are raised, that component will be called. This is demonstrated by VPSuperComponent's implementation of the EventNotify 2500, shown in FIGS. 25A–B. Upon occurrence of an event, the event manager will call EventNotiffy, passing in the identity of the source giving rise to the event and its Type.

The steps of the EventNotify method 2500 are as follows. At step 2501, the method attempts to locate an entry in its component list that corresponds to the component which raised the event; therefore, for a given source ID, the ComponentFind method in step 2501 returns the corresponding component. If the method finds the component, then it proceeds as follows. If the type of event occurring was a change to Name, tested at 2502, then at 2503 the method gets the new Name (Value). At step 2504, the method "flashes" the port on screen, for indicating a change to Value. This is done by calling the ComponentPropertyUpdate method which is defined for the viewers (list of windows) which contain the user interface manifestation of the component. At step 2505, the method iterates through all the connections that lead from the source component. If a connection is found, then at 2506 the method looks up the destination of the connection. If one is found (at 2507), then the method has determined a component and property to get a Value from and a component and property to set the Value to. At step 2508, the method gets the Value for the property. Then at step 2509, the method sets the property (i.e., "property write").

Step 2510 handles instances where the destination for the connection is not a component, but instead is a property. The property, in turn, must be propagated upwards. This is illustrated in the user interface by the connection of the Edit field to a property (i.e., the Value property of a Slider). Thus at this point, the method flashes the representation of the property and itself raises the event, by calling EventRaise at 2511.

Advantages

Each time the user creates a new visual component, the system may decide where in the user interface to place the component, such as on the most-recently active window. In practice, however, the results of this approach are less than satisfactory. In a preferred embodiment, therefore, the user is given the ability to specify a destination Location in the user interface, for the component being created.

Unlike prior art systems, however, the system of the present invention does not force the user to "group" user interface components together. In Microsoft Visual Basic, for instance, the user must group components together according to the user interface. Such an approach rapidly breaks down in a multi-window application, where some elements may come from "the same place" in the application, yet appear in different locations throughout the user interface. Consider, for instance, an "OK" button. Selection of the OK button by the user will typically bring up a part of the program far removed from where in the program the OK button was created.

The system of the present invention overcomes this problem by providing simultaneous views of two different hierarchies. Specifically, the system provides a hierarchical view of the program, on the one hand, and the user interface on the other. Since the functionality of a component is separated out from the user interface, a component may be nested within another component at the program level yet appear nested within still yet another component at the user interface level. Without this separation of user interface from program logic, prior art visual programming systems require the programmer to lay out a user interface and program within one hierarchy (i.e., one box), leading to less than satisfactory results.

Moreover, the system of the present invention employs a pure data flow model. When a Value monitored by a component changes, the component simply broadcasts that change to other components which have established connections. This model does not depict a complicated inheritance relationship which users must master. Nor is it depicting a demand flow, where one component is requesting or polling the Value of another component. Instead, the system adopts a simple, intuitive model—one easily mastered by users.

Attached herewith are Appendices A and B providing further description of the present invention.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a computer system, a method for creating an application program using graphical user interface technique, the method comprising:
   (a) displaying a form for presenting screen objects on a screen display;
   (b) displaying a plurality of prefabricated program components, some of said prefabricated program components corresponding to said screen objects;
   (c) receiving first user input for creating a first program component from said plurality of prefabricated program components;
   (d) receiving second user input for creating at least one second program component from said plurality of prefabricated program components; and
   (e) receiving third user input for visually creating program logic of the application program by graphically connecting a user-created port of one program component with a user-created port of another program component, said step comprising:
      (i) for each of said first and said second program components:
         using graphical user interface technique, selecting the program component, said program component having a plurality of properties,
         using graphical user interface technique, selecting one or more of said plurality of properties of the selected program component, for surfacing the selected one or more properties as one or more user-defined port connections,
         displaying a port icon on said selected program component for each surfaced property, for indicating availability of said each surfaced property of said selected program component to other program components, and
      (ii) using graphical user interface technique, connecting said first and second program components together by connecting together at least port of one component to at least port of the other component.

2. The method of claim 1, wherein step (b) comprise:
   displaying a library palette of prefabricated program components, said prefabricated program components being divided into subgroups of similar prefabricated program components.

3. The method of claim 2, wherein said groups of similar prefabricated program components includes user interface and non-user interface subgroups of prefabricated program components.

4. The method of claim 1, wherein said prefabricated program components corresponding to said screen objects include selected ones of screen buttons, scroll bars, edit fields, and windows.

5. The method of claim 1, wherein step (c) includes:
   positioning a screen cursor over an icon associated with said first program component; and
   generating a selection signal for selecting the program component associated with said icon.

6. The method of claim 1, wherein step (c) further comprises:
   displaying a visual editor for said first program component, said visual editor displaying a logical view of any visual and non-visual sub-components contained by said first program.

7. The method of claim 6, wherein step (d) includes:

receiving user input for selecting said at least one second program component and placing it within said visual editor for the first program component, so that said at least one second program component becomes nested within said first program component.

8. The method of claim 1, wherein step (e) includes:

displaying, for each said at least one program connection, a linkage line between program components of said each at least one program connection.

9. The method of claim 1, wherein a change in value of a property of one program component causes notification to all other program components connected to said at least one program component.

10. The method of claim 9, wherein said notification comprises a message sent through said at least one connection from said one program component to all other program components which are connected.

11. The method of claim 9, further comprising:

attaching a watch to said linkage line, for monitoring said change in value of a property.

12. The method of claim 11, wherein said attaching a watch includes:

receiving user input for selecting said linkage line; and displaying a property viewer at said selected linkage line, for showing the current value of the property being monitored.

13. The method of claim 12, wherein said property viewer is a selected one of a text viewer and a graphic viewer.

14. In a computer system, a method for creating a computer program, the method comprising:

(a) displaying a palette of preconstructed program components;

(b) receiving user input for selecting a first program component from said plurality of preconstructed program components;

(c) displaying a graphic representation of said first program component for providing a logical view of the component based on functionality of the component in the application program;

(d) simultaneous with step (c), displaying a user interface representation of said first program component for providing a user interface view of the component based on appearance of the component in the application program;

(e) receiving user input for selecting a second program component from said plurality of preconstructed program components;

(f) displaying a graphic representation of said second program component for providing a logical view of the component based on functionality of the component in the application program;

(g) simultaneous with step (f), displaying a user interface representation of said second program component for providing a user interface view of the component based on appearance of the component in the application program; and (h) receiving user input for visually creating program logic of the application program by connecting together program components, said step including using graphical user interface technique for dragging a screen cursor from the graphic representation of one program component to the graphic representation of the other program component, for specifying that a connection exists between said first and second program components.

15. The method of claim 14, wherein said first program component is a window object and wherein said second program component is a child window object nested within said window object.

16. The method of claim 15, wherein said child window object is a selected one of a scroll bar object, an edit field object, and a text object.

17. The method of claim 14, wherein said preconstructed program components comprise:

at least one super component having at least one sub-component.

18. The method of claim 17, wherein said at least one sub-component comprises an atomic program component, said atomic program component having program logic constructed with a high-level programming language.

19. The method of claim 17, wherein said at least one sub-component has itself at least one sub-component, so that said super component includes a plurality of sub-components nested to an arbitrary depth.

20. The method of claim 17, wherein step (c) includes:

hiding implementation of said first program component by hiding all sub-components of said first program component from view of a user.

* * * * *